United States Patent
Dahitule et al.

(10) Patent No.: US 12,531,290 B2
(45) Date of Patent: *Jan. 20, 2026

(54) BATTERY SYSTEM HAVING A BATTERY MODULE

(71) Applicant: LG Energy Solution, Ltd., Seoul (KR)

(72) Inventors: Atish Bharat Dahitule, Troy, MI (US); Daniel Barnes, Troy, MI (US); Heekook Yang, Sterling Heights, MI (US); Sanjeev Porchelvan, Shelby Township, MI (US); Edward Yankoski, West Branch, MI (US); Yoonhee Lee, Troy, MI (US)

(73) Assignee: LG Energy Solution, Ltd., Seoul (KR)

( * ) Notice: Subject to any disclaimer, the term of this patent is extended or adjusted under 35 U.S.C. 154(b) by 62 days.

This patent is subject to a terminal disclaimer.

(21) Appl. No.: 18/239,175

(22) Filed: Aug. 29, 2023

(65) Prior Publication Data

US 2023/0402673 A1 Dec. 14, 2023

Related U.S. Application Data

(63) Continuation of application No. 17/349,284, filed on Jun. 16, 2021, now Pat. No. 11,784,364.

(51) Int. Cl.
| | |
|---|---|
| *H01M 10/643* | (2014.01) |
| *H01M 10/613* | (2014.01) |
| *H01M 10/6556* | (2014.01) |
| *H01M 10/6568* | (2014.01) |
| *H01M 50/202* | (2021.01) |

(52) U.S. Cl.
CPC ....... *H01M 10/643* (2015.04); *H01M 10/613* (2015.04); *H01M 10/6556* (2015.04); *H01M 10/6568* (2015.04); *H01M 50/202* (2021.01)

(58) Field of Classification Search
CPC ............. H01M 10/643; H01M 10/613; H01M 10/6556; H01M 10/6568
See application file for complete search history.

(56) References Cited

U.S. PATENT DOCUMENTS

| | | |
|---|---|---|
| 4,325,429 A | 4/1982 | Bevan et al. |
| 2010/0279153 A1 | 11/2010 | Payne |
| 2011/0104532 A1 | 5/2011 | Buck et al. |
| 2012/0028099 A1 | 2/2012 | Aoki |

(Continued)

FOREIGN PATENT DOCUMENTS

| | | |
|---|---|---|
| CN | 207217634 U | 4/2018 |
| JP | 2011523168 A | 8/2011 |

(Continued)

*Primary Examiner* — James Lee
(74) *Attorney, Agent, or Firm* — Bookoff McAndrews, PLLC

(57) ABSTRACT

A battery system includes a battery module that utilizes the first and second retention housings to hold a battery cell retention frame therein that can be either air cooled or fluid cooled. In particular, the first and second retention housings have an inlet port and an outlet port, respectively, for routing fluid through the battery cell retention frame for cooling cylindrical battery cells thereon. Alternately, the battery cell retention frame can be air cooled for cooling the cylindrical battery cells. Also, the first and second retention housings provide improved structural integrity to the battery module.

16 Claims, 38 Drawing Sheets

(56) References Cited

U.S. PATENT DOCUMENTS

| | | | |
|---|---|---|---|
| 2012/0121946 A1* | 5/2012 | Eckstein | ................ B60R 16/04 |
| | | | 429/120 |
| 2013/0207459 A1 | 8/2013 | Schröder et al. | |
| 2018/0205045 A1 | 7/2018 | Schröder et al. | |
| 2018/0316072 A1 | 11/2018 | Xiao et al. | |
| 2019/0181405 A1 | 6/2019 | Kim et al. | |
| 2019/0288353 A1 | 9/2019 | Harris et al. | |
| 2021/0013565 A1 | 1/2021 | Pucher et al. | |
| 2021/0135176 A1 | 5/2021 | An et al. | |

FOREIGN PATENT DOCUMENTS

| | | | |
|---|---|---|---|
| JP | 2012530330 A | 11/2012 | |
| JP | 2019046578 A | 3/2019 | |
| JP | 2021518647 A | 8/2021 | |
| KR | 20140109982 A | 9/2014 | |
| KR | 20180120587 A | 11/2018 | |
| KR | 20190069873 A | 6/2019 | |
| KR | 20190112572 A | 10/2019 | |
| KR | 20200111353 A | 9/2020 | |
| KR | 20200130677 A | 11/2020 | |
| KR | 20200132923 A | 11/2020 | |
| KR | 20200143976 A | 12/2020 | |
| KR | 20210053054 A | 5/2021 | |
| KR | 20210061829 A | 5/2021 | |

\* cited by examiner

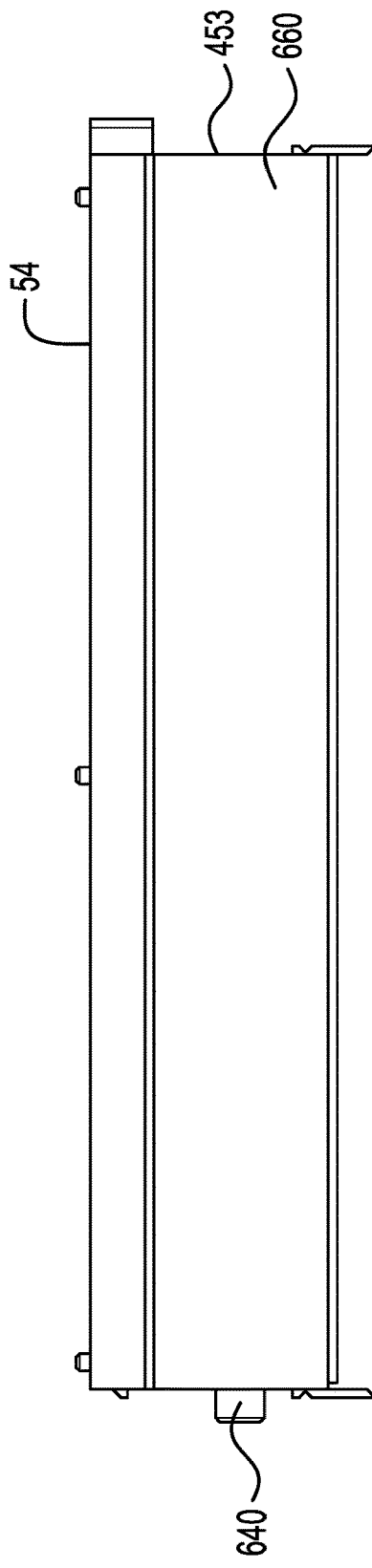
FIG. 27
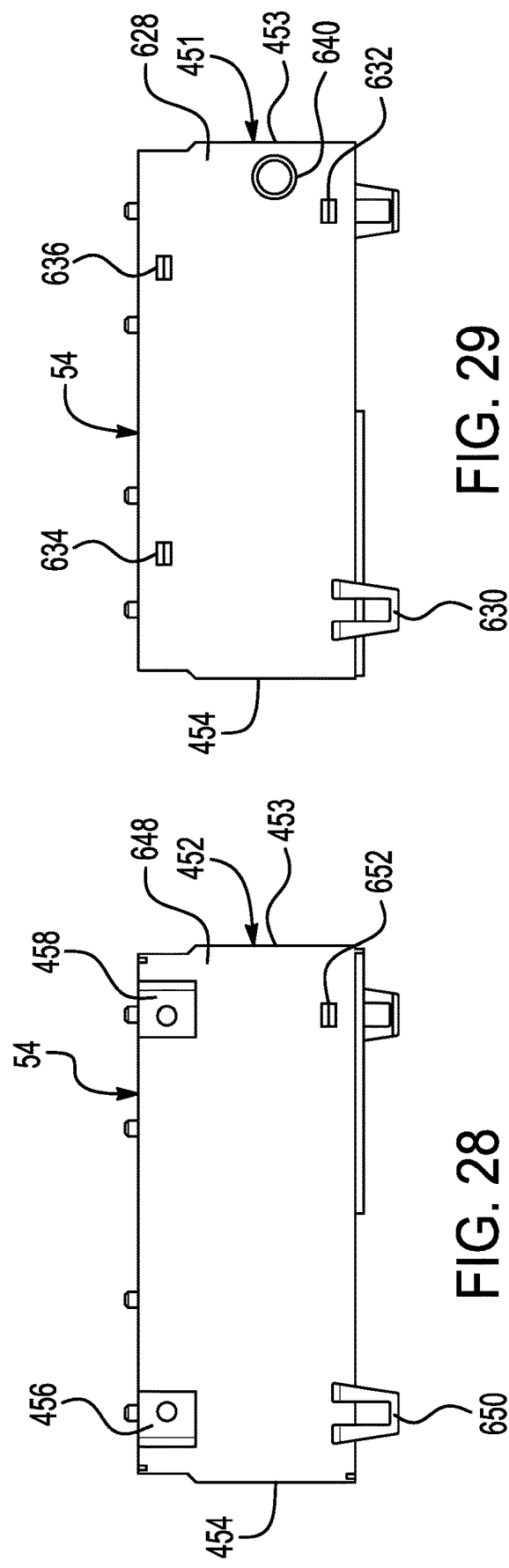
FIG. 29
FIG. 28

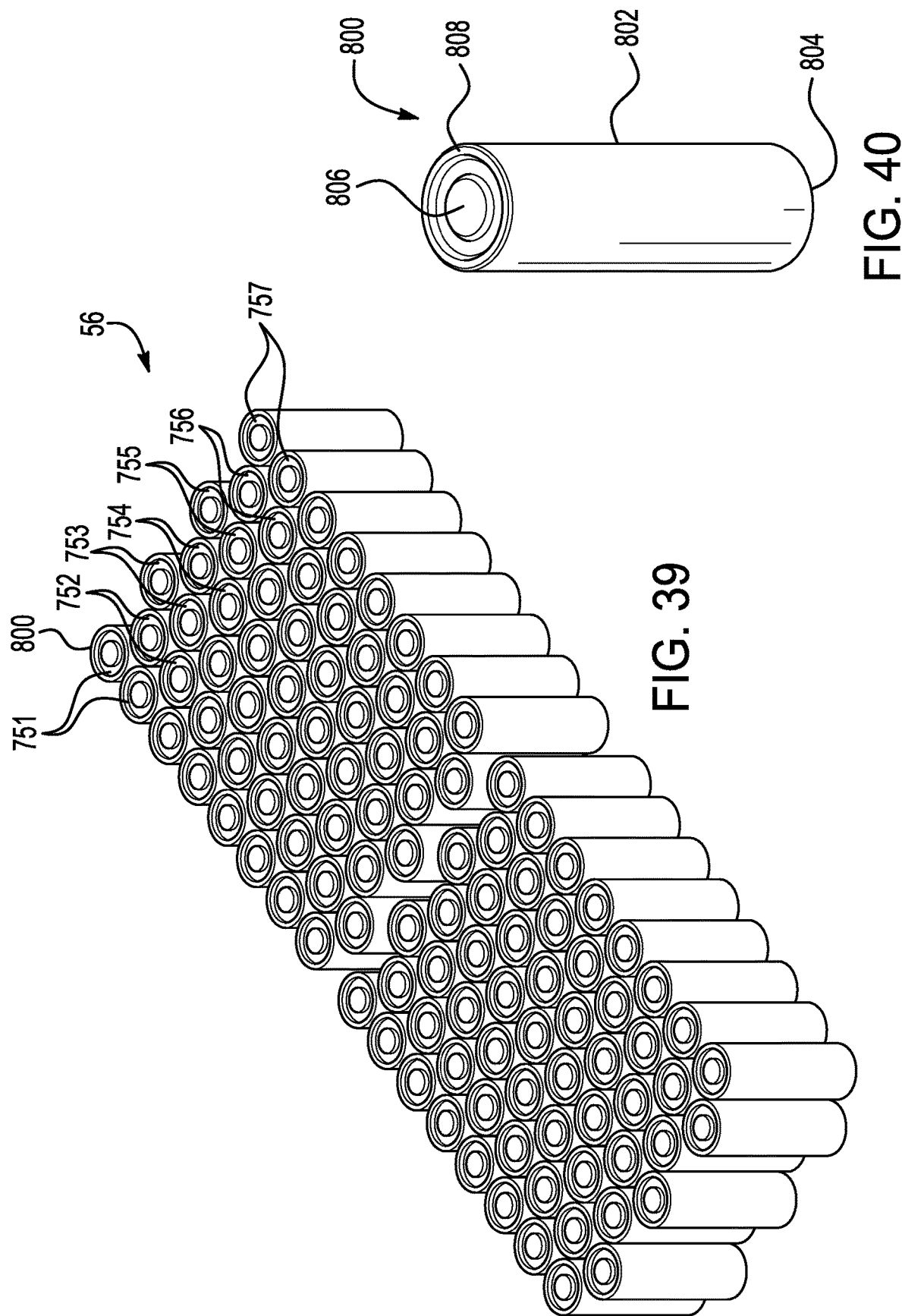

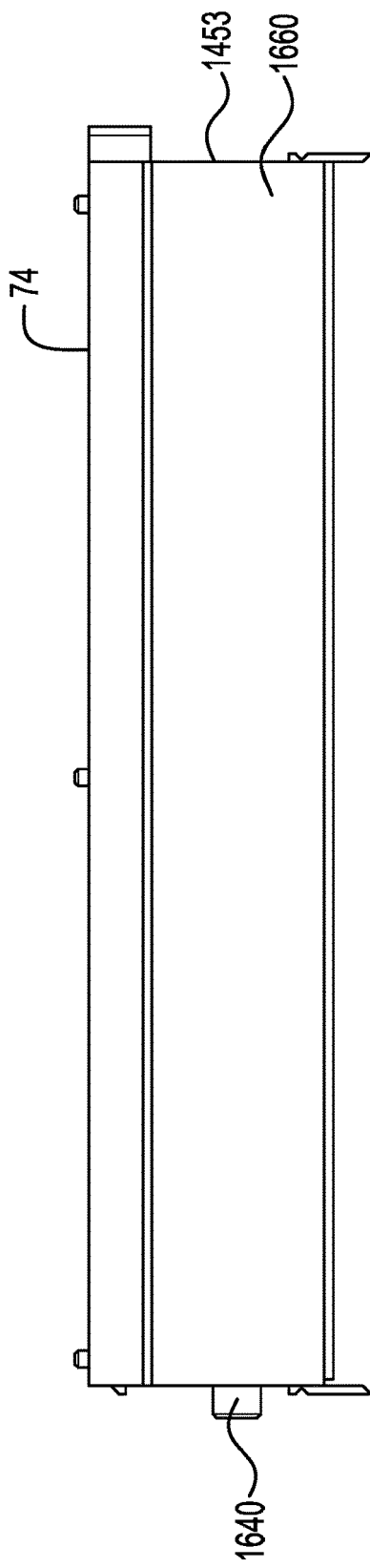
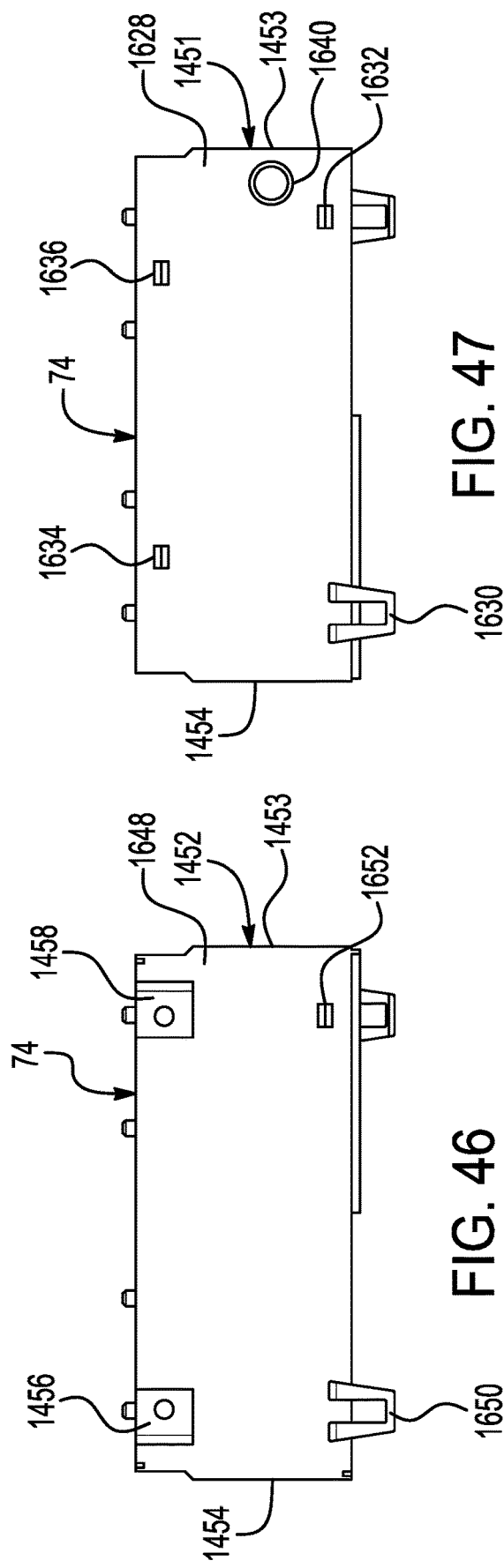
FIG. 45
FIG. 46
FIG. 47

BATTERY SYSTEM HAVING A BATTERY MODULE

CROSS-REFERENCE TO RELATED APPLICATION

This application is a continuation of U.S. patent application Ser. No. 17/349,284 filed on Jun. 16, 2021, the entire contents of which are hereby incorporated by reference herein.

BACKGROUND

Battery modules with cylindrical battery cells are being utilized in numerous applications. Since it is desirable that the battery modules have a high energy/power output, the battery modules need effective and efficient cooling systems for optimal performance. In order to achieve the desired cooling efficiency, other cooling systems have utilized complex tooling/assembly and components, which substantially increase the overall cost. Further, known battery modules can either be air cooled or fluid cooled but do not have the flexibility to be both air cooled and fluid cooled.

The inventors herein have recognized a need for a battery system that utilizes a battery module having first and second retention housings that hold a battery cell retention frame therein that can be either air cooled or fluid cooled. In particular, the first and second retention housings have an inlet port and an outlet port, respectively, for routing fluid through the battery cell retention frame for cooling cylindrical battery cells thereon. Alternately, the battery cell retention frame can be air cooled to cool the cylindrical battery cells. Also, the first and second retention housings provide improved structural integrity to the battery module.

SUMMARY

A battery system in accordance with an exemplary embodiment is provided. The battery system includes a battery module having a battery cell retention frame, a first retention housing, and a second retention housing. The battery cell retention frame has a central cooling plate member, and first and second exterior plates. The central cooling plate member has first and second manifold portions and first and second intermediate walls disposed between and coupled to the first and second manifold portions. The first and second intermediate walls define an internal cooling channel therebetween that fluidly communicates with the first and second manifold portions. The first and second exterior plates are coupled to the first and second manifold portions, respectively, and extend perpendicular to the central cooling plate member. The first retention housing is disposed within a region defined by the first intermediate wall and the first and second exterior plates. The first retention housing has an end wall and first, second, third, and fourth side walls defining a first interior region. The first, second, third, and fourth side walls of the first retention housing are coupled to the end wall thereof and define a first open end. The first retention housing holds a first plurality of cylindrical battery cells therein that thermally communicate with the first intermediate wall. The first side wall of the first retention housing has an inlet port that fluidly communicates with the first manifold portion. The second retention housing is disposed within a region defined by the second intermediate wall and the first and second exterior plates. The second retention housing has an end wall and first, second, third, and fourth side walls defining a second interior region. The first, second, third, and fourth side walls of the second retention housing are coupled to the end wall thereof and define a second open end. The second retention housing holds a second plurality of cylindrical battery cells therein that thermally communicate with the second intermediate wall. The first side wall of the second retention housing has an outlet port that fluidly communicates with the second manifold portion. The battery system further includes a fluid supply system that is fluidly coupled to inlet port and the outlet port, the fluid supply system supplying a fluid to the inlet port such the fluid flows through the first manifold portion of the battery cell retention frame and the internal cooling channel of the battery cell retention frame, and the second manifold portion of the battery cell retention frame and out of the outlet port to extract heat energy from the first and second plurality of battery cells A battery module in accordance with an exemplary embodiment is provided. The battery module includes a battery cell retention frame having a central cooling plate member, and first and second exterior plates. The central cooling plate member has first and second manifold portions and first and second intermediate walls disposed between and coupled to the first and second manifold portions. The first and second intermediate walls define an internal cooling channel therebetween that fluidly communicates with the first and second manifold portions. The first and second exterior plates are coupled to the first and second manifold portions, respectively, and extend perpendicular to the central cooling plate member. The battery module further includes a first retention housing that is disposed within a region defined by the first intermediate wall and the first and second exterior plates. The first retention housing has an end wall and first, second, third, and fourth side walls defining a first interior region. The first, second, third, and fourth side walls of the first retention housing are coupled to the end wall thereof and define a first open end. The first retention housing holds a first plurality of cylindrical battery cells therein that thermally communicate with the first intermediate wall. The first side wall of the first retention housing has an inlet port that fluidly communicates with the first manifold portion. The battery module includes a second retention housing that is disposed within a region defined by the second intermediate wall and the first and second exterior plates. The second retention housing having an end wall and first, second, third, and fourth side walls defining a second interior region. The first, second, third, and fourth side walls of the second retention housing are coupled to the end wall thereof and define a second open end. The second retention housing holds a second plurality of cylindrical battery cells therein that thermally communicate with the second intermediate wall. The first side wall of the second retention housing has an outlet port that fluidly communicates with the second manifold portion.

BRIEF DESCRIPTION OF THE DRAWINGS

FIG. 27 is a side view of the first retention housing of FIG. 23;

FIG. 28 is another side view of the first retention housing of FIG. 23;

FIG. 29 is another side view of the first retention housing of FIG. 23;

FIG. 39 is schematic of a first plurality of cylindrical battery cells utilized in the battery module of FIG. 1;

FIG. 40 is an enlarged view of a cylindrical battery cell of the first plurality of cylindrical battery cells of FIG. 39;

FIG. 45 is a side view of the second retention housing of FIG. 41;

FIG. 46 is another side view of the second retention housing of FIG. 41;

FIG. 47 is another side view of the second retention housing of FIG. 41;

DETAILED DESCRIPTION

Figure 1:
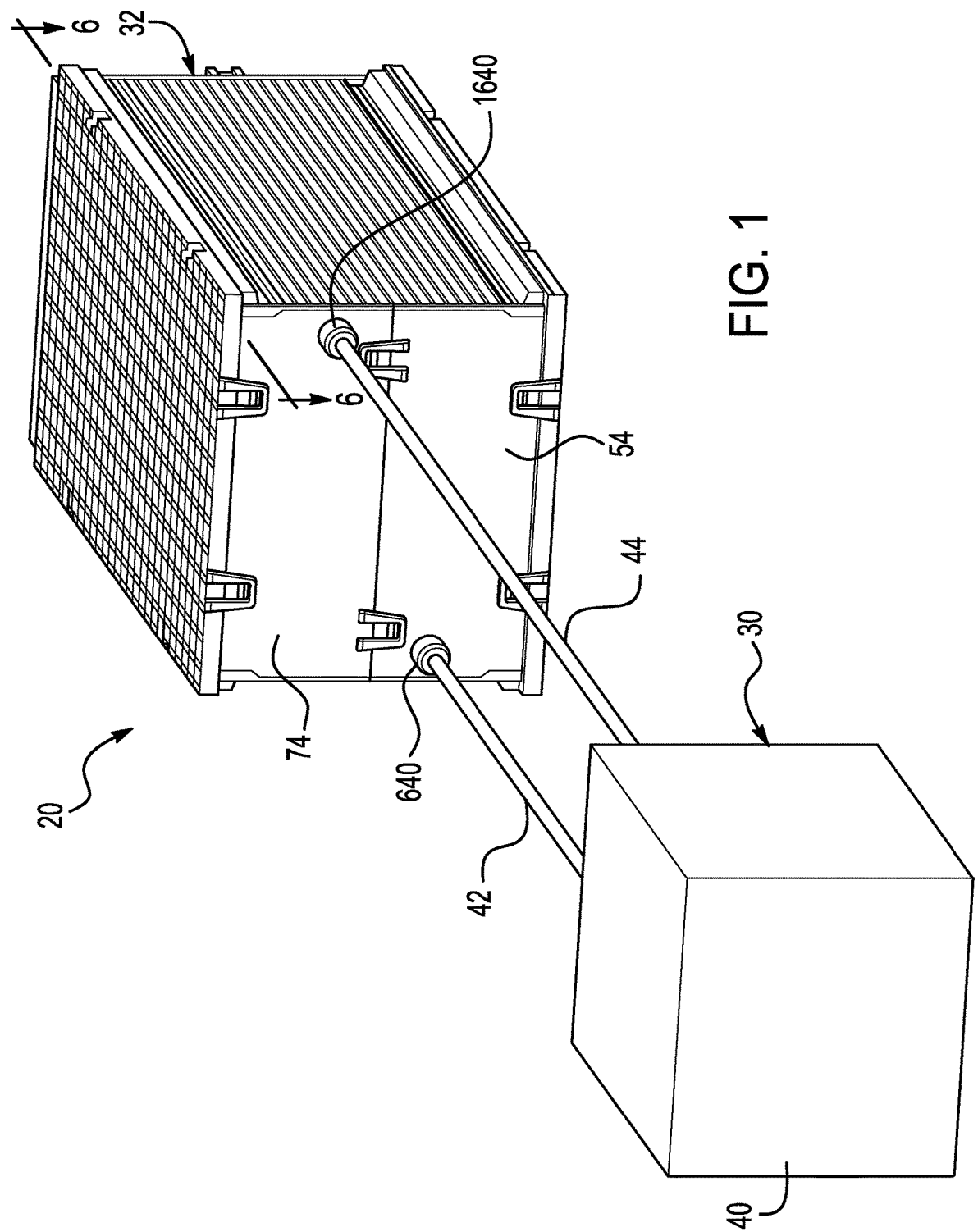
FIG. 1 is a schematic of a battery system having a battery module and a fluid supply system in accordance with an exemplary embodiment.
Figure 2:
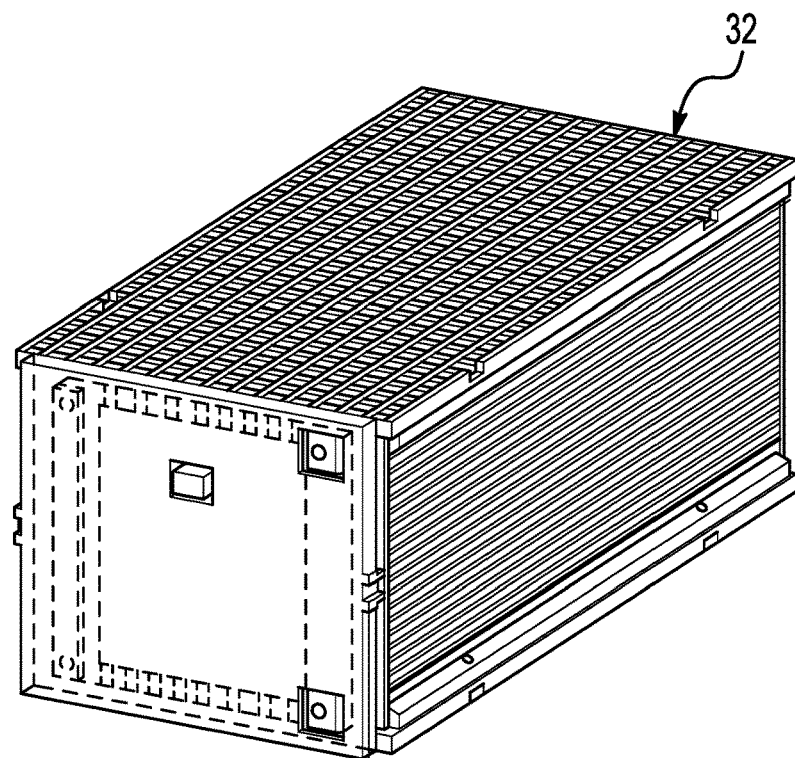
FIG. 2 is an isometric view of the battery module of FIG. 1.

Referring to FIGS. 1-10, a battery system 20 having a fluid supply system 30 and a battery module 32 in accordance with an exemplary embodiment is provided.

The fluid supply system 30 is provided to supply a fluid to the battery module 32 for cooling cylindrical battery cells within the battery module 32. The fluid supply system 30 includes a fluid supply device 40 and conduits 42, 44. The conduit 42 is coupled to and between the fluid supply device 40 and an inlet port 640 of the battery module 20. Further, the conduit 44 is coupled to and between the fluid supply device 40 and an outlet port 1640 of the battery module 20. During operation, the fluid supply device 40 pumps fluid through the conduit 42 and into the inlet port 640. The fluid is routed through the battery module 32 to cool the cylindrical battery cells therein and then out of the outlet port 1640 and through the conduit 44 back to the fluid supply device 30.

Figure 8:
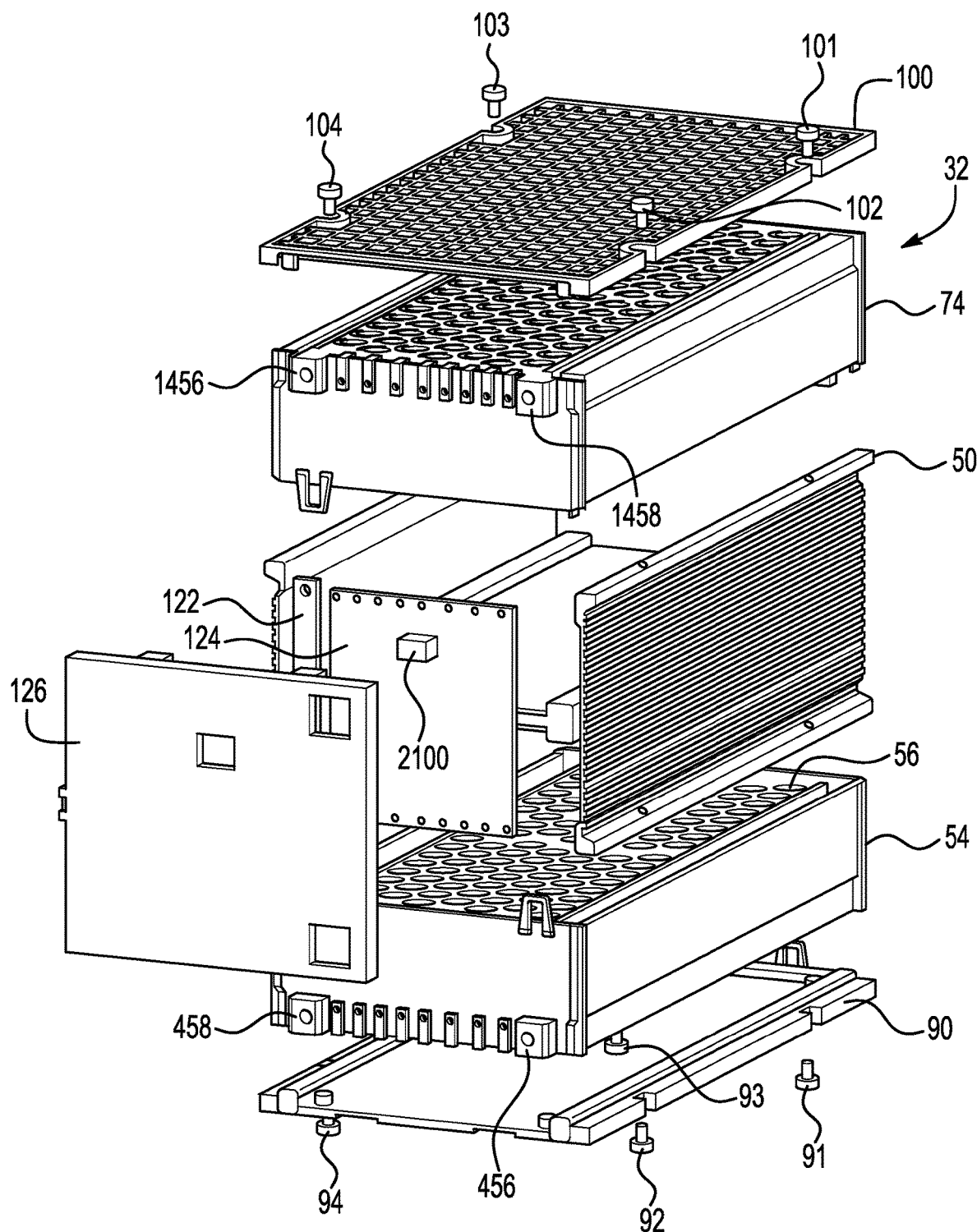
FIG. 8 is an exploded view of the battery module of FIG. 1.
Figure 9:
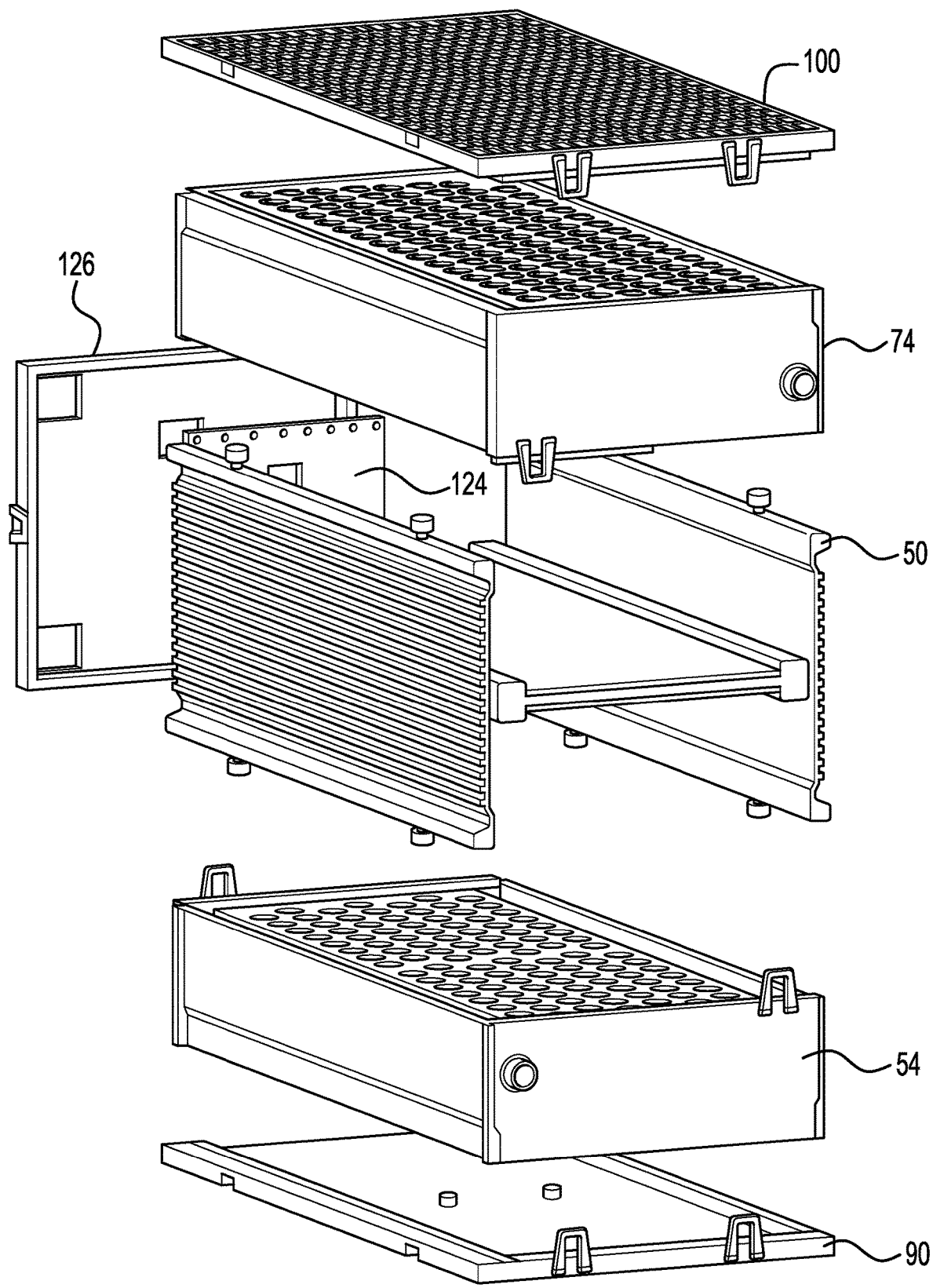
FIG. 9 is another exploded view of the battery module of FIG. 1.
Figure 24:
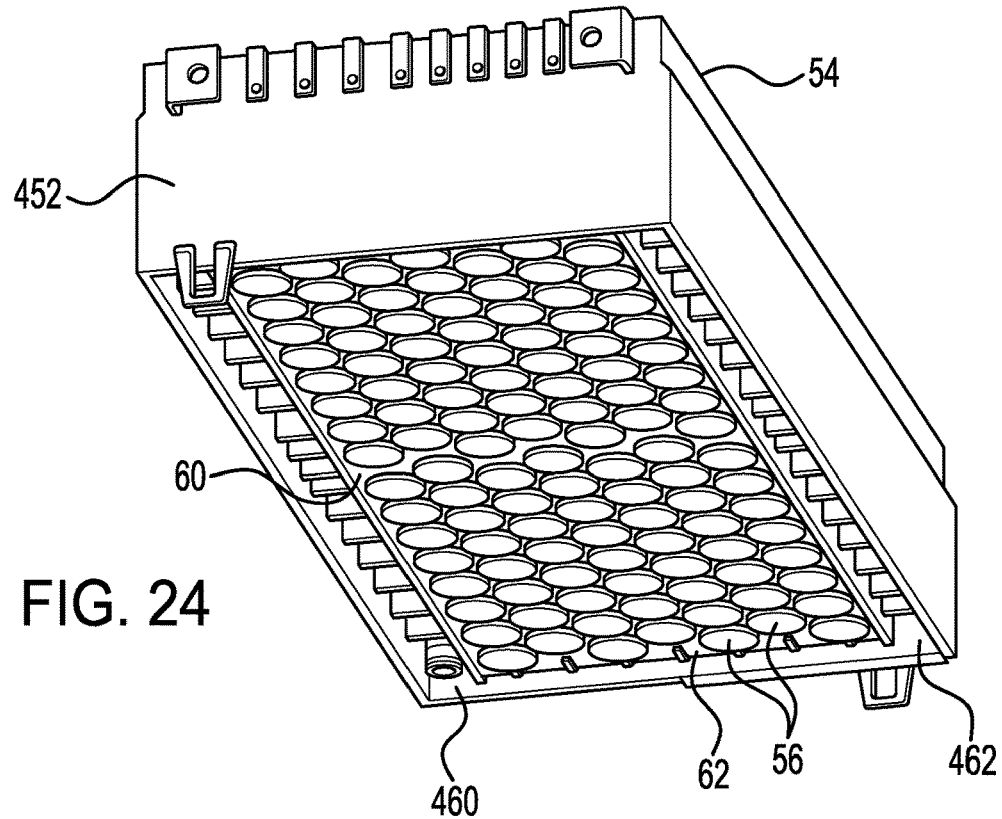
FIG. 24 is an isometric view of the first retention housing of FIG. 23 holding a first plurality of cylindrical battery cells, and first and second retaining plates therein.
Figure 42:
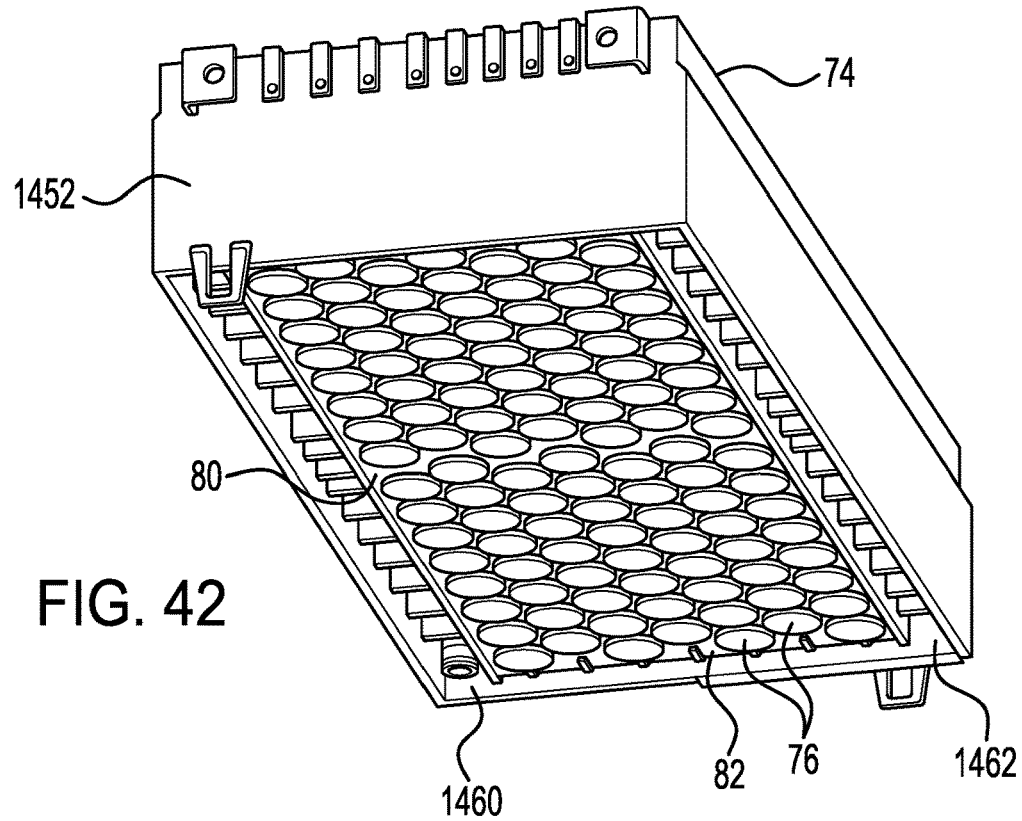
FIG. 42 is an isometric view of the second retention housing of FIG. 41 holding a second plurality of cylindrical battery cells, and third and fourth retaining plates therein.

Referring to FIGS. 8 and 9, the battery module 32 is provided to output an operational voltage. The battery module 32 includes a battery cell retention frame 50, a first retention housing 54, a first plurality of cylindrical battery cells 56, first and second retaining plates 60, 62 (shown in FIG. 24), a second retention housing 74, a second plurality of cylindrical battery cells 76 (shown in FIG. 42), third and fourth retaining plates 80, 82 (shown in FIG. 42), a first outer plate 90, bolts 91, 92, 93, 94, a second outer plate 100, bolts 101, 102, 103, 104, a circuit board 120, an electrical bus bar 122, a circuit board 124, and a cover plate 126.

Referring to FIGS. 1-10, an advantage of the battery module 32 is that the battery module 32 utilizes the first and second retention housings 54, 74 to hold the battery cell retention frame 50 therein that can be either air cooled or fluid cooled. In particular, the first and second retention housings 54, 74 have an inlet port 640 and an outlet port 1640, respectively, for routing fluid through the battery cell retention frame 50 for cooling cylindrical battery cells thereon. Alternately, the battery cell retention frame can be air cooled for cooling the cylindrical battery cells. Also, the first and second retention housings 54, 74 provide improved structural integrity to the battery module 32.

Battery Cell Retention Frame

Referring to FIGS. 11-22, the battery cell retention frame 50 is provided to hold and to cool the first plurality of cylindrical battery cells 56 and the second plurality of cylindrical battery cells 76 thereon. The battery cell retention frame 50 includes a central cooling plate member 140, a first exterior plate 141, a second exterior plate 142, a first thermally conductive layer 151, and a second thermally conductive layer 152. An advantage of the battery cell retention frame 50 is that frame 50 can hold and cool the first and second plurality of cylindrical battery cells 56, 76 on opposite sides of the central cooling plate member 50 while supporting and protecting the battery cells 56, 76 with the first and second exterior plates 141, 142. In an exemplary embodiment, the central cooling plate member 140, the first exterior plate 141, and the second exterior plate 142 are constructed of a metal such as aluminum for example. The first and second thermally conductive layers 151 and 152 are constructed of a thermally conductive material that is not electrically conductive.

Central Cooling Plate Member

Figure 19:
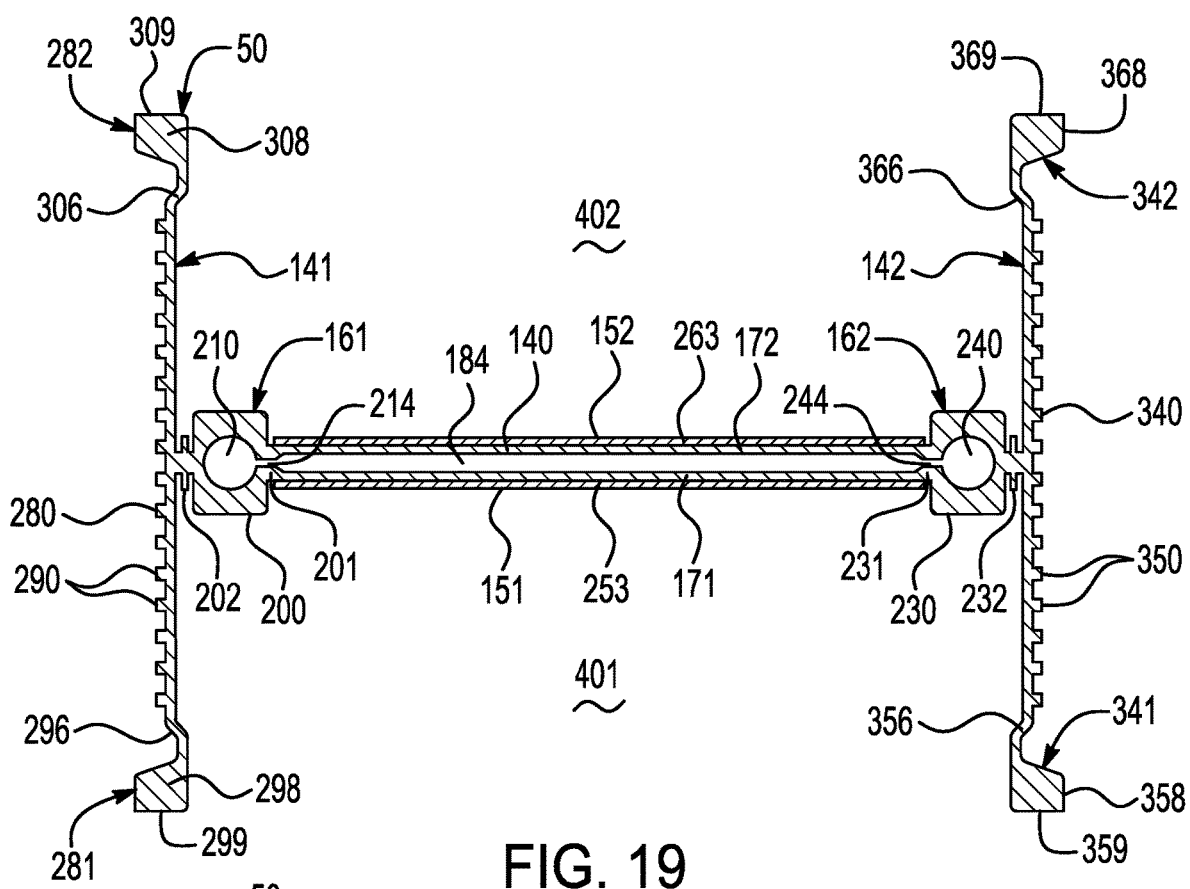
FIG. 19 is a cross-sectional view of the battery cell retention frame of FIG. 13 taken along lines 19-19 in FIG. 13.
Figure 20:
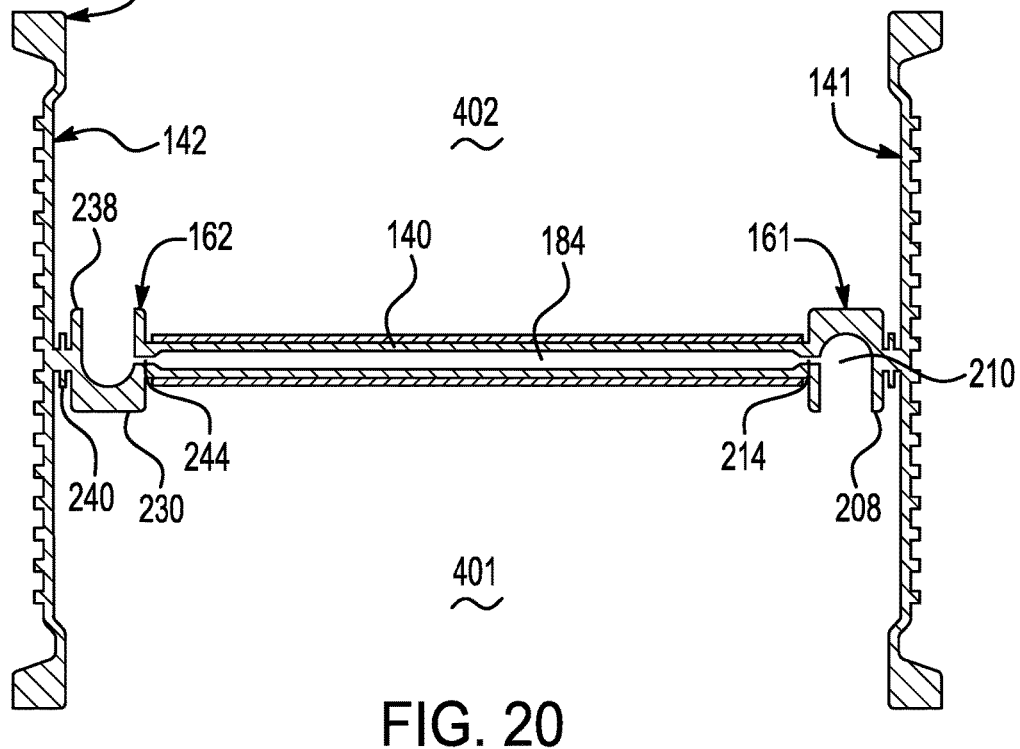
FIG. 20 is a cross-sectional view of the battery cell retention frame of FIG. 13 taken along lines 20-20 in FIG. 13.
Figure 21:
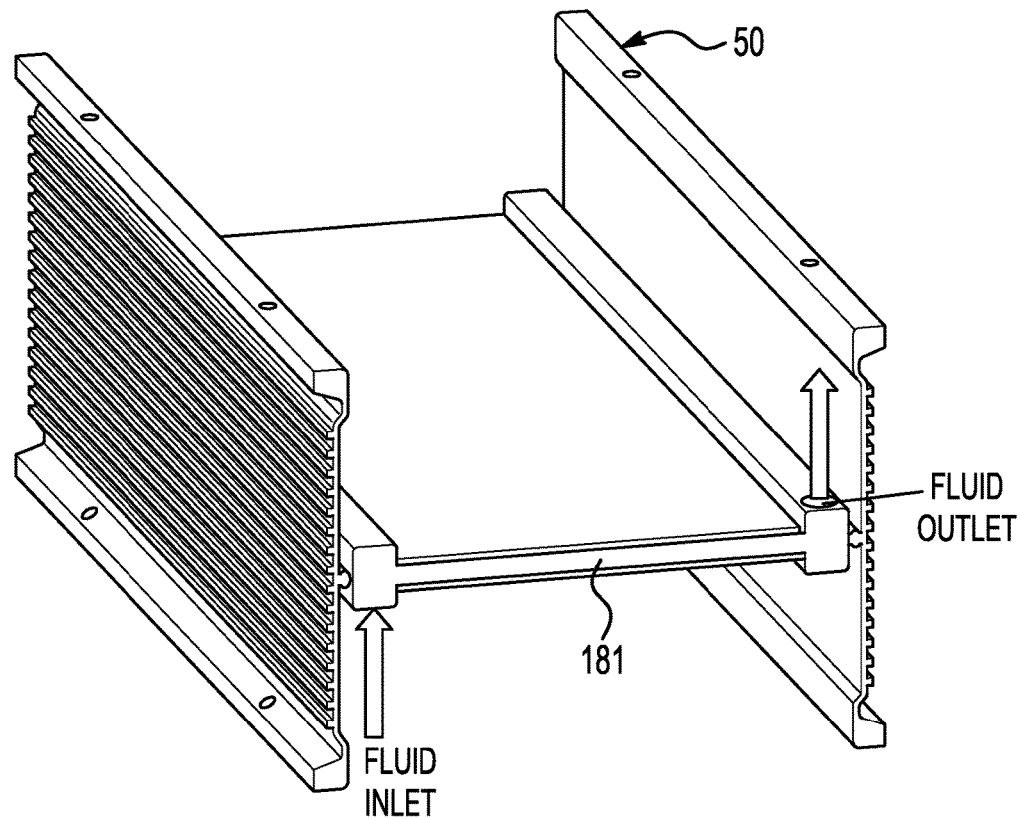
FIG. 21 is an isometric view of the battery cell retention frame of FIG. 11 illustrating where fluid enters and exits the battery cell retention frame.
Figure 22:
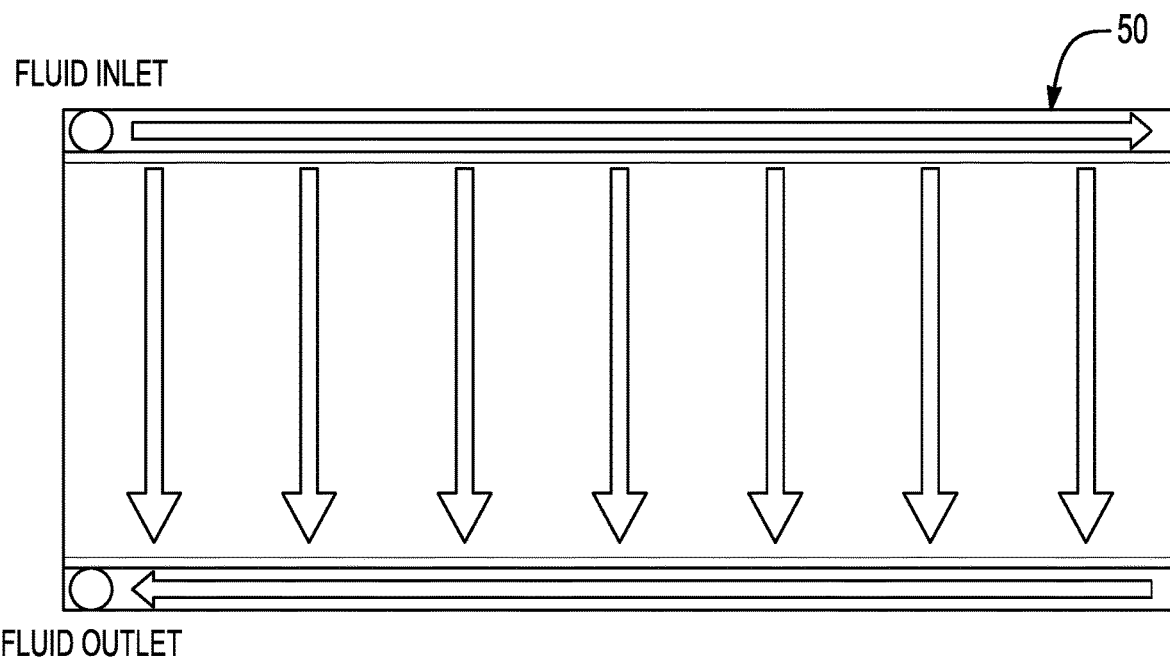
FIG. 22 is a top view of the battery cell retention frame of FIG. 11 illustrating where fluid traverses across the battery cell retention frame in an internal cooling channel.

Referring to FIGS. 19 and 20, the central cooling plate member 140 includes a first manifold portion 161, a second manifold portion 162, a first intermediate wall 171, a second intermediate wall 172, a first end plate 181, a second end plate 182, and an internal cooling channel 184.

First Manifold Portion

Referring to FIGS. 14 and 18-20, the first manifold portion 161 includes a first end 191 (shown in FIG. 18), a second end 192, a central body portion 200, a first extension portion 201, and a second extension portion 202.

Central Body Portion

Figure 18:
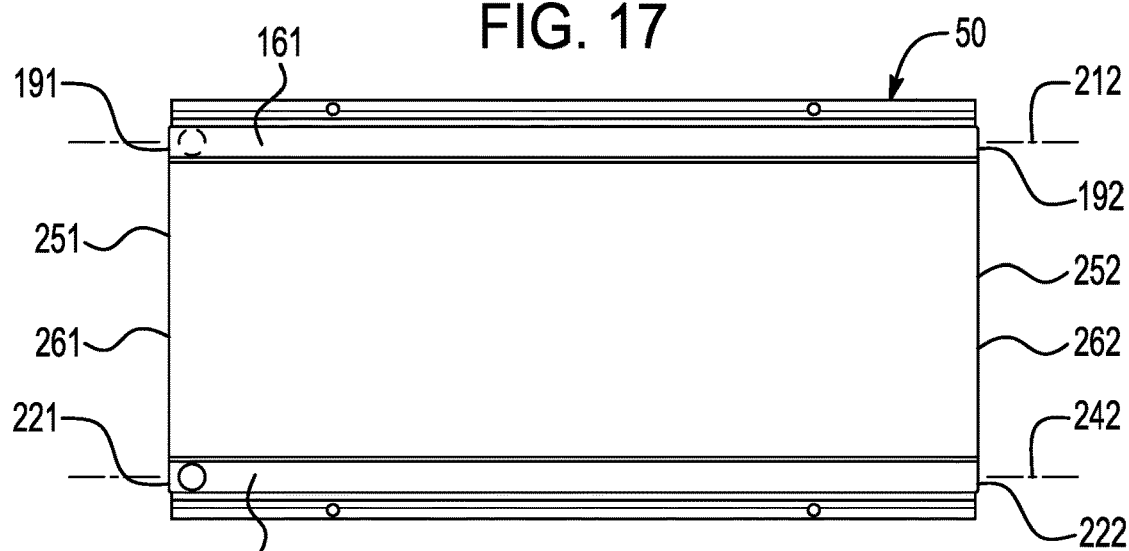
FIG. 18 is a top view of the battery cell retention frame of FIG. 11.

The central body portion 200 extends along a longitudinal axis 212 (shown in FIG. 18). The central body portion 200 includes an inlet aperture 208 (shown in FIGS. 14 and 20) and a longitudinal aperture 210 (shown in FIG. 19). The inlet aperture 208 extends through a bottom surface of the central body portion 200 and fluidly communicates with the longitudinal aperture 210. The longitudinal aperture 210 extends along the longitudinal axis 212 from the first end 191 to the second end 192.

First and Second Extension Portions

The first and second extension portions 201, 202 are coupled to opposite sides of the central body portion 200. The first extension portion 201 has a flow aperture 214 extending therethrough that fluidly communicates with the longitudinal aperture 210 of the central body portion 200 and the internal cooling channel 184. The flow aperture 214 has a vertical height that is less than a diameter of the longitudinal aperture 210. The second extension portion 202 is coupled to and between the central body portion 200 and the first exterior plate 141.

Second Manifold Portion

The second manifold portion 162 includes a first end 221 (shown in FIG. 18), a second end 222, a central body portion 230, a first extension portion 231, and a second extension portion 232.

Central Body Portion

The central body portion 230 extends along a longitudinal axis 242 (shown in FIG. 18). The central body portion 230 includes an outlet aperture 238 and a longitudinal aperture 240. The outlet aperture 238 extends through a top surface of the central body portion 230 and fluidly communicates with the longitudinal aperture 240. The longitudinal aperture 240 extends along the longitudinal axis 242 from the first end 221 to the second end 222.

First and Second Extension Portions

The first and second extension portions 231, 232 are coupled to opposite sides of the central body portion 230. The first extension portion 231 has a flow aperture 244 extending therethrough that fluidly communicates with the longitudinal aperture 240 of the central body portion 230 and the internal cooling channel 184. The flow aperture 244 has a vertical height that is less than a diameter of the longitudinal aperture 240. The second extension portion 232 is coupled to and between the central body portion 230 and the second exterior plate 142.

First and Second Intermediate Walls

Referring to FIGS. 18-20, the first and second intermediate walls 171, 172 are disposed between and coupled to the first and second manifold portions 161, 162. The first and second intermediate walls 171, 172 define the internal cooling channel 184 therebetween that fluidly communicates with the first and second manifold portions 161, 162. The first intermediate wall 171 includes a first end 251 (shown in FIG. 18), a second end 252, and an outer surface 253. Further, the second intermediate wall 172 includes a first end 261 (shown in FIG. 18), a second end 262, and an outer surface 263.

First End Plate

Figure 11:
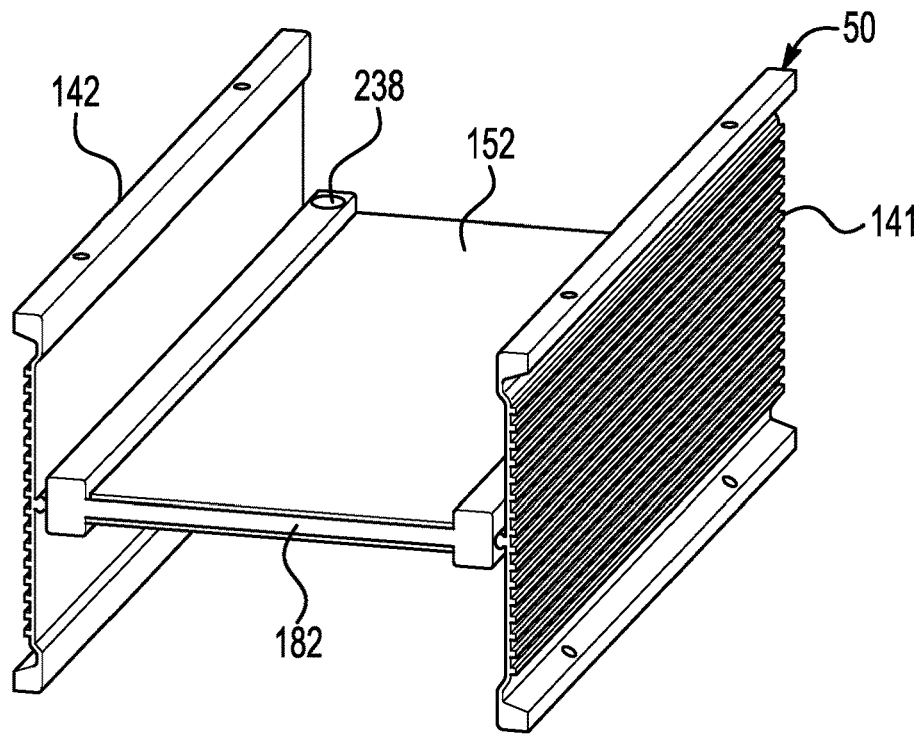
FIG. 11 is an isometric view of a battery cell retention frame utilized in the battery module of FIG. 1.
Figure 12:
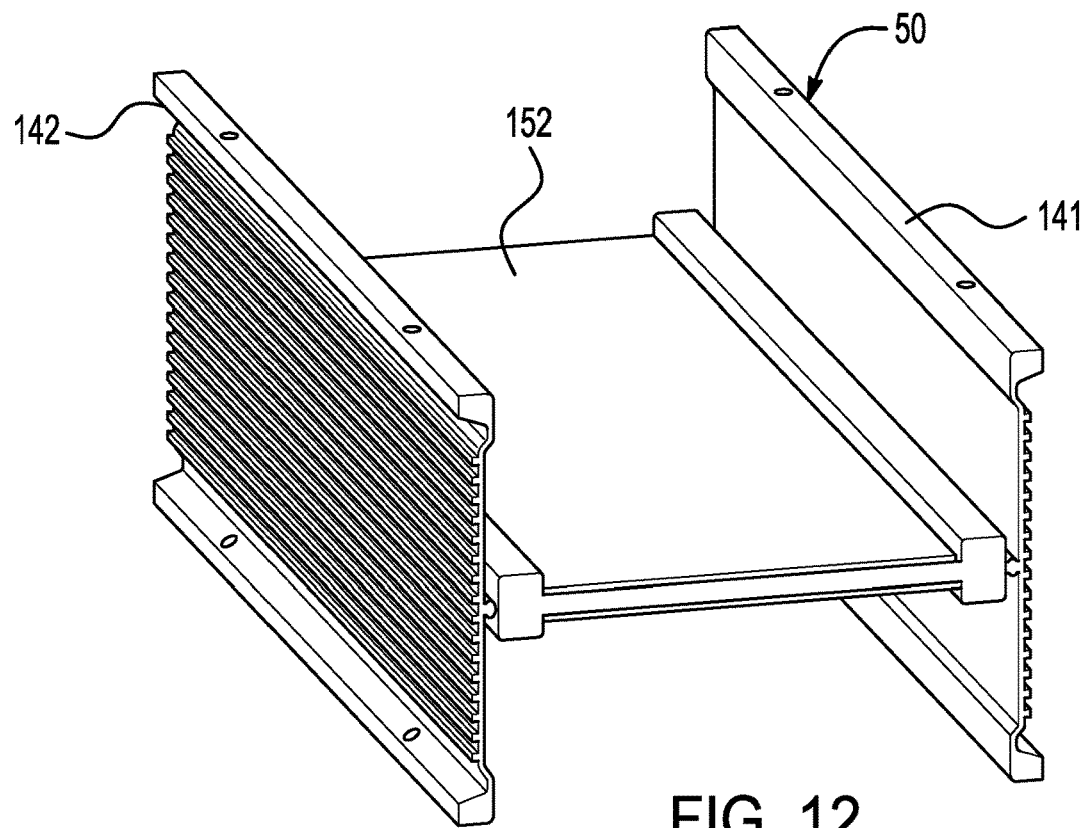
FIG. 12 is another isometric view of the battery cell retention frame of FIG. 11.
Figure 13:
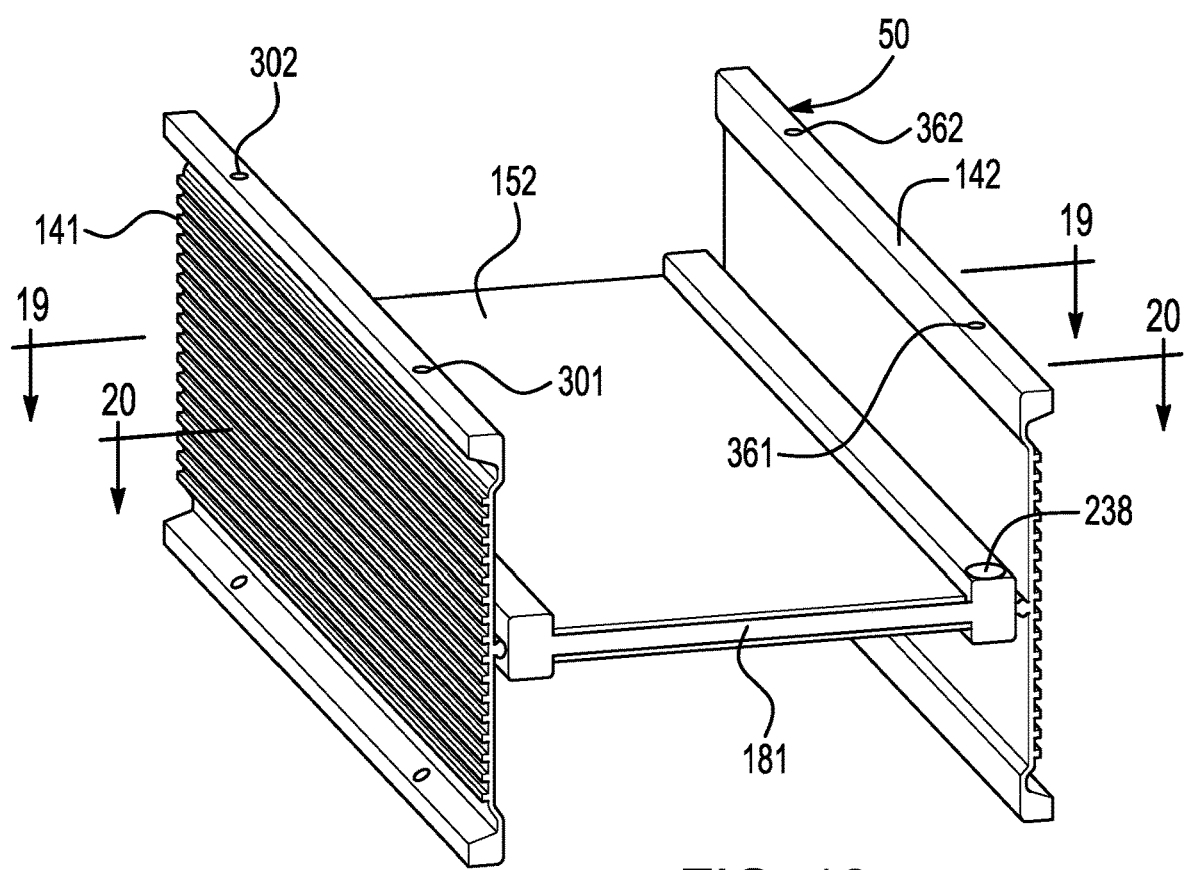
FIG. 13 is another isometric view of the battery cell retention frame of FIG. 11.
Figure 14:
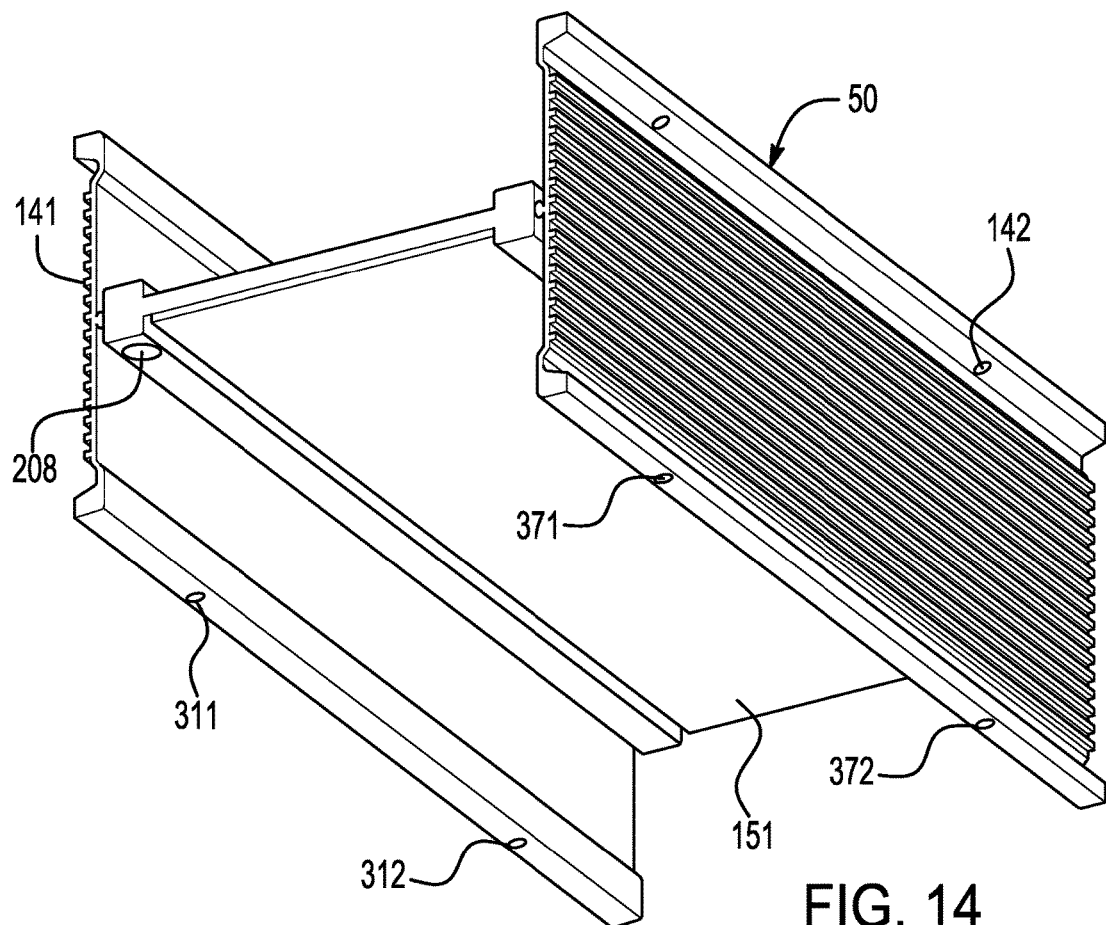
FIG. 14 is another isometric view of the battery cell retention frame of FIG. 11.
Figure 15:
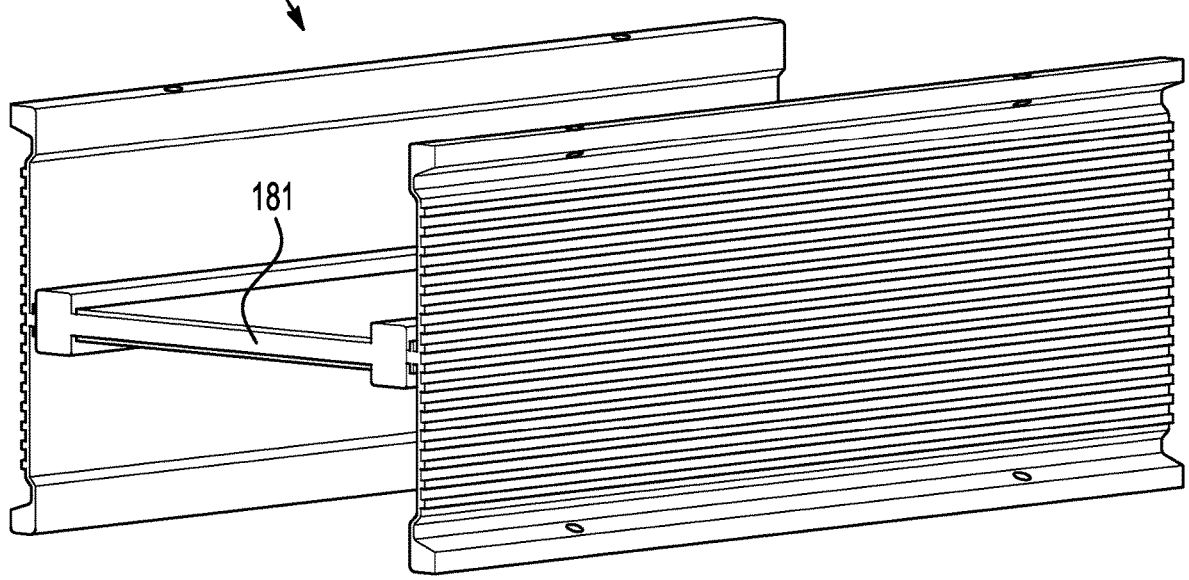
FIG. 15 is an enlarged isometric view of the battery cell retention frame of FIG. 11.
Figure 16:
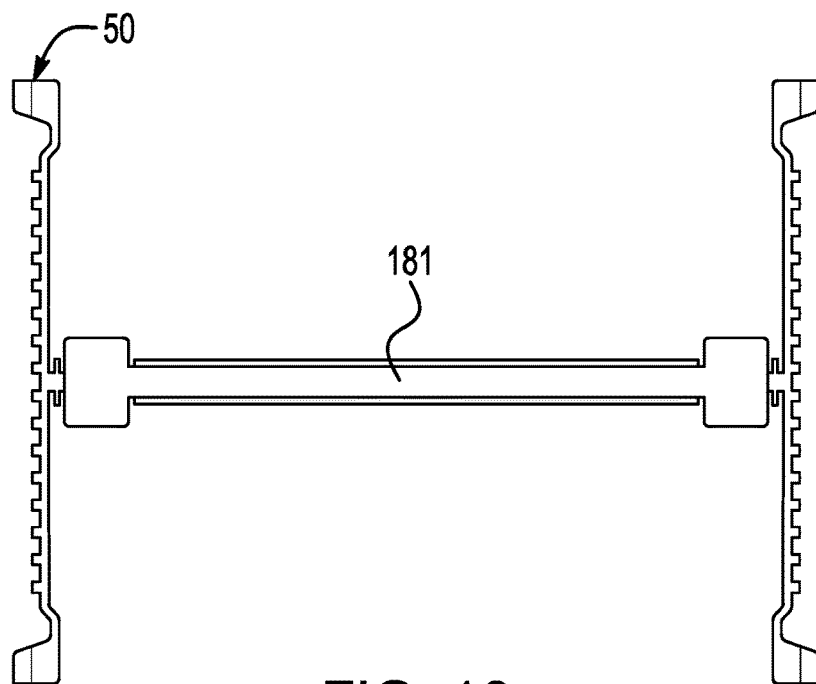
FIG. 16 is a front view of the battery cell retention frame of FIG. 11.
Figure 17:
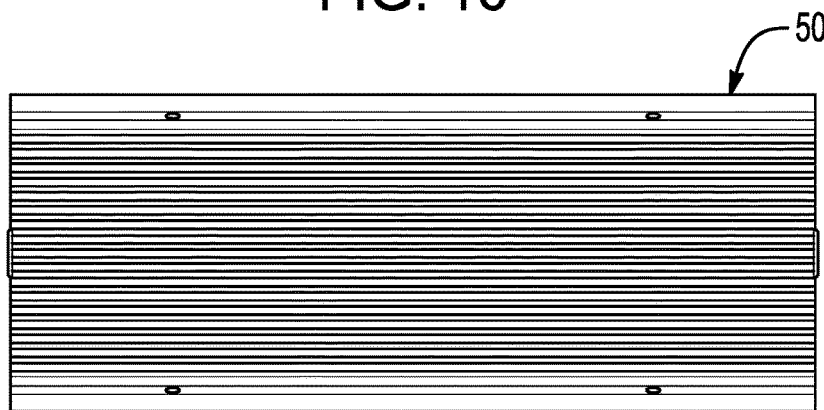
FIG. 17 is a side view of the battery cell retention frame of FIG. 11.

Referring to FIGS. 11, 13 and 18, the first end plate 181 is provided to enclose an end of the battery cell retention frame 50. In particular, the first end plate 181 is coupled to a first end 251 (shown in FIG. 18) of the first intermediate wall 171, a first end 261 of the second intermediate wall 172, a first end 191 of the first manifold portion 161, and a first end 221 of the second manifold portion 162.

Second End Plate

The second end plate 182 is provided to enclose another end of the battery cell retention frame 50. In particular, the second end plate 182 is coupled to a second end 252 (shown in FIG. 18) of the first intermediate wall 171, a second end 262 of the second intermediate wall 172, a second end 192 of the first manifold portion 161, and a second end 222 of the second manifold portion 162.

Internal Cooling Channel

Referring to FIGS. 19 and 20, the internal cooling channel 184 has a vertical height that is greater than a vertical height of the flow aperture 214 of the first extension portion 201 of the first manifold portion 161. Further, the internal cooling channel 184 has a vertical height that is greater than a vertical height of the flow aperture 244 in the first extension portion 231 of the second manifold portion 162.

First Thermally Conductive Layer

Figure 10:
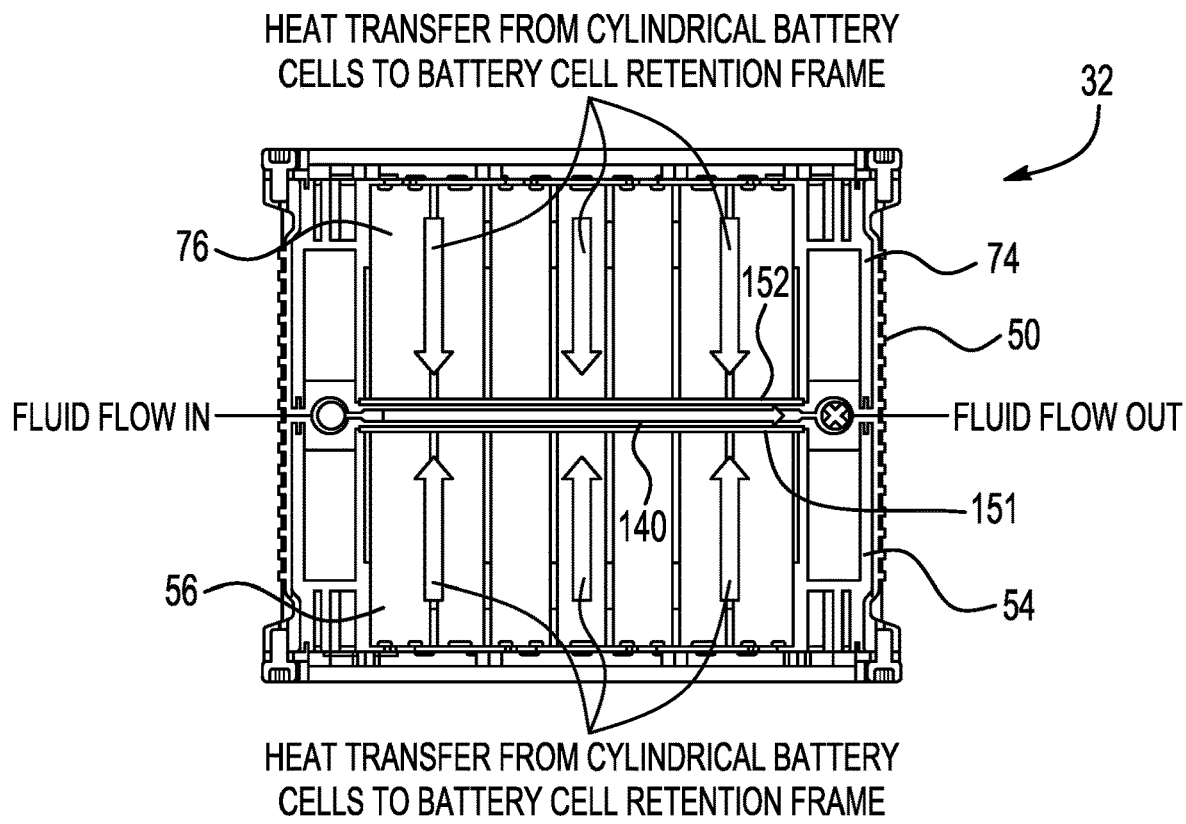
FIG. 10 is a cross-sectional view of the battery module of FIG. 3 taken along lines 10-10 in FIG. 3 that illustrates the heat transfer from cylindrical battery cells into a battery cell retention frame.

Referring to FIGS. 10, 19 and 20, the first thermally conductive layer 151 is provided to conduct heat energy from the first plurality of cylindrical battery cells 56 to the central cooling plate member 140. The first thermally conductive layer 151 is disposed on the first outer surface 253 of the first intermediate wall 171.

Second Thermally Conductive Layer

The second thermally conductive layer 152 is provided to conduct heat energy from the second plurality of cylindrical battery cells 76 to the central cooling plate member 140. The second thermally conductive layer 152 is disposed on the outer surface 263 of the second intermediate wall 172.

First and Second Exterior Plates

Referring to FIGS. 19 and 20, the first and second exterior plates 141, 142 are coupled to the first and second manifold portions 161, 162, respectively, of the central cooling plate member 140 and extend perpendicular to the central cooling plate member 140. The first and second intermediate walls 171, 172 have first and second outer surfaces 253, 263, respectively, disposed opposite to one another and between the first and second exterior plates 141, 142.

First Exterior Plate

The first exterior plate 141 is provided to radiate heat energy from the central cooling plate member 140 to ambient atmosphere and to protect the first and second plurality of cylindrical battery cells 56, 76. The first exterior plate 141 includes a central exterior plate portion 280, a first rail portion 281, and a second rail portion 282.

The first and second rail portions 281, 282 extend longitudinally and are coupled to first and second ends, respectively, of the central exterior plate portion 280. The central exterior plate portion 280 has a corrugated outer surface 290.

The first rail portion 281 includes a curved portion 296 (shown in FIG. 19), and a head portion 298 having an end surface 299. The curved portion 296 is coupled to and between the head portion 298 and the central exterior plate portion 280. The first rail portion 281 further includes apertures 301, 302 (shown in FIG. 13) extending into the end surface 299.

The second rail portion 282 includes a curved portion 306, and a head portion 308 having an end surface 309. The curved portion 306 is coupled to and between the head portion 308 and the central exterior plate portion 280. The second rail portion 282 further includes apertures 311, 312 (shown in FIG. 13) extending into the end surface 309.

Second Exterior Plate

The second exterior plate 142 is provided to radiate heat energy from the central cooling plate member 140 to ambient atmosphere and to protect the first and second plurality of cylindrical battery cells 56, 76. The second exterior plate 142 includes a central exterior plate portion 340, a first rail portion 341, and a second rail portion 342.

The first and second rail portions 341, 342 extend longitudinally and are coupled to first and second ends, respectively, of the central exterior plate portion 340. The central exterior plate portion 340 has a corrugated outer surface 350.

The first rail portion 341 includes a curved portion 356 (shown in FIG. 19), and a head portion 358 having an end surface 359. The curved portion 356 is coupled to and between the head portion 358 and the central exterior plate portion 340. The first rail portion 341 further includes apertures 361, 362 (shown in FIG. 13) extending into the end surface 359.

The second rail portion 342 includes a curved portion 366, and a head portion 368 having an end surface 369. The curved portion 366 is coupled to and between the head portion 368 and the central exterior plate portion 340. The second rail portion 342 further includes apertures 371, 372 (shown in FIG. 13) extending into the end surface 369.

Regions

The first and second exterior plates 141, 142 and the first intermediate wall 171 define a region 401 for receiving the first plurality of cylindrical battery cells 56 therein. Further, the first and second exterior plates 141, 142 and the thermally conductive layer 152 define a region 402 for receiving the second plurality of cylindrical battery cells 76 therein.

First Retention Housing

Referring to FIGS. 19 and 23-38, the first retention housing 54 holds the first plurality of cylindrical battery cells 56 therein and on and against the first thermally conductive layer 151 (shown in FIG. 19) such that the battery cells 56 thermally communicate through the layer 151 with the first intermediate wall 171. The first retention housing 54 is disposed within the region 401 (shown in FIG.

Figure 23:
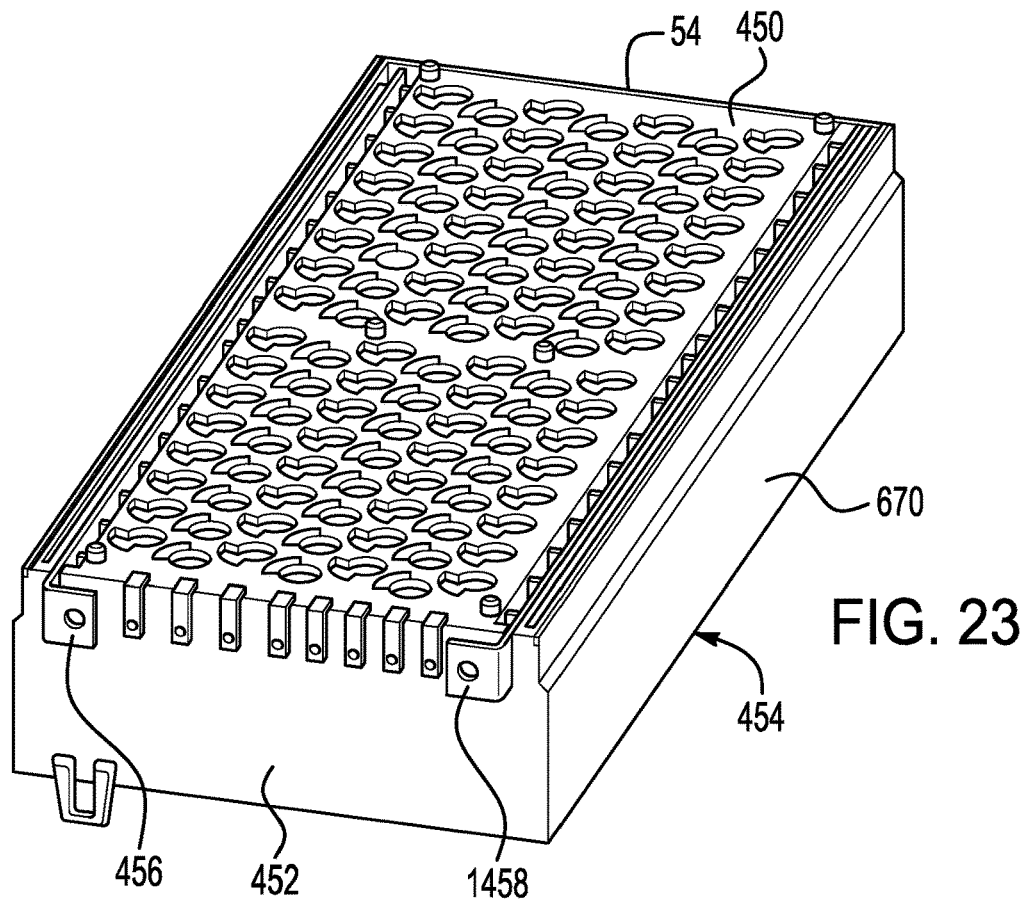
FIG. 23 is an isometric view of a first retention housing utilized in the battery module of FIG. 1.
Figure 25:
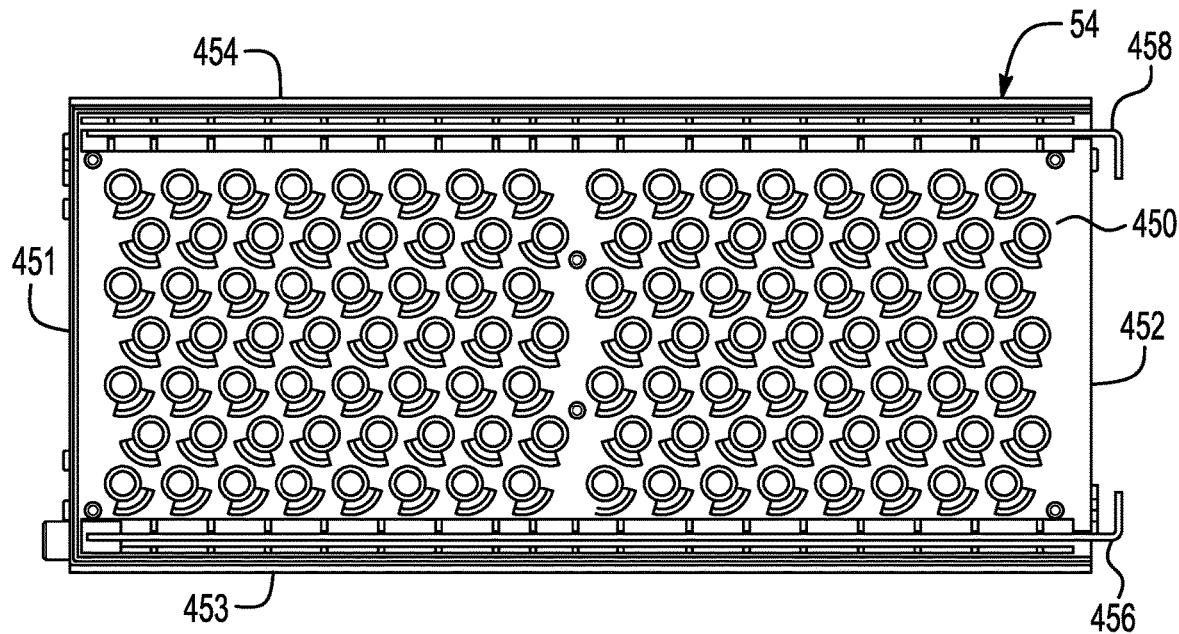
FIG. 25 is a top view of the first retention housing of FIG. 23.
Figure 26:
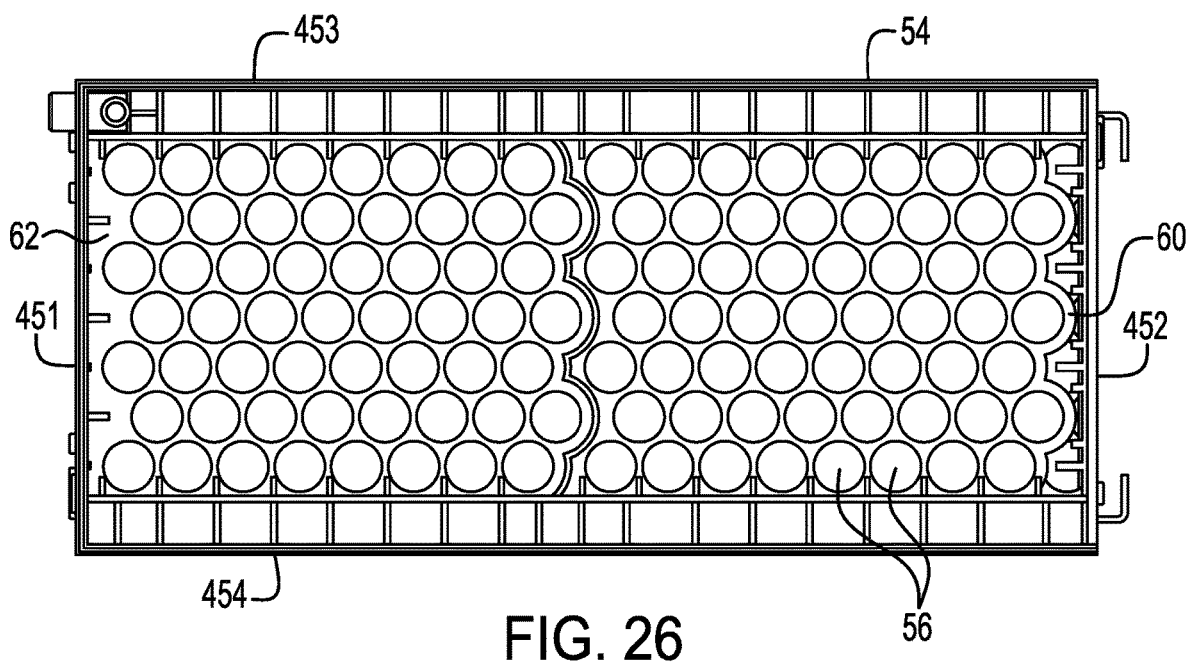
FIG. 26 is a bottom view of the first retention housing, the first plurality of cylindrical battery cells, and the first and second retaining plates of FIG. 24.

19) defined by the first intermediate wall 171 and the first and second exterior plates 141, 142. Referring to FIGS. 23 and 25, the first retention housing 54 has an end wall 450, a first side wall 451, a second side wall 452, a third side wall 453, a fourth side wall 454, an electrical bus bar 456, and an electrical bus bar 458. The first and second side walls 451, 452 extend substantially parallel to one another. Further, the third and fourth side walls 453, 454 extend substantially parallel to one another and perpendicular to the first and second side walls 451, 452. In an exemplary embodiment, the end wall 450 and the first, second, third, and fourth side walls 451, 452, 453, 454 are constructed of plastic. Further, the electrical bus bars 456 and 458 are constructed of copper.

End Wall

The end wall 450 is coupled to the first, second, third, and fourth side walls 451, 452, 453, 454 to define an interior region 460 (shown in FIG. 24) and an open end 462.

Figure 34:
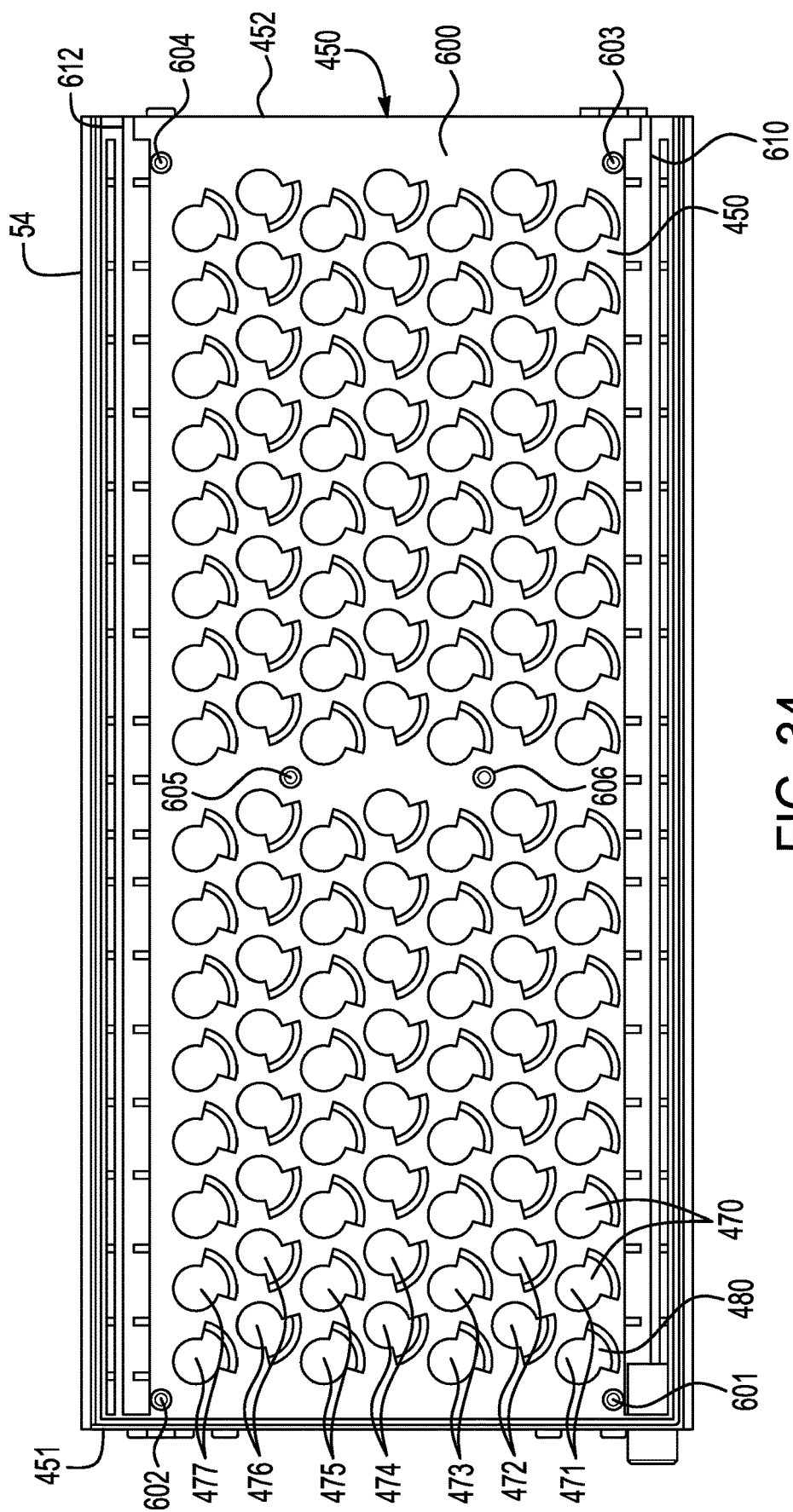
FIG. 34 is an enlarged top view of the first retention housing of FIG. 32.

Referring to FIG. 34, the end wall 450 includes a wall portion 600 with a plurality of apertures 470 extending therethrough. Each aperture of the plurality of apertures 470 is associated with a cylindrical battery cell of the first plurality of cylindrical battery cells 56. The plurality of apertures 470 includes a first row of apertures 471, a second row of apertures 472, a third row of apertures 473, a fourth row of apertures 474, a fifth row of apertures 475, a sixth row of apertures 476, and a seventh row of apertures 477.

Figure 35:
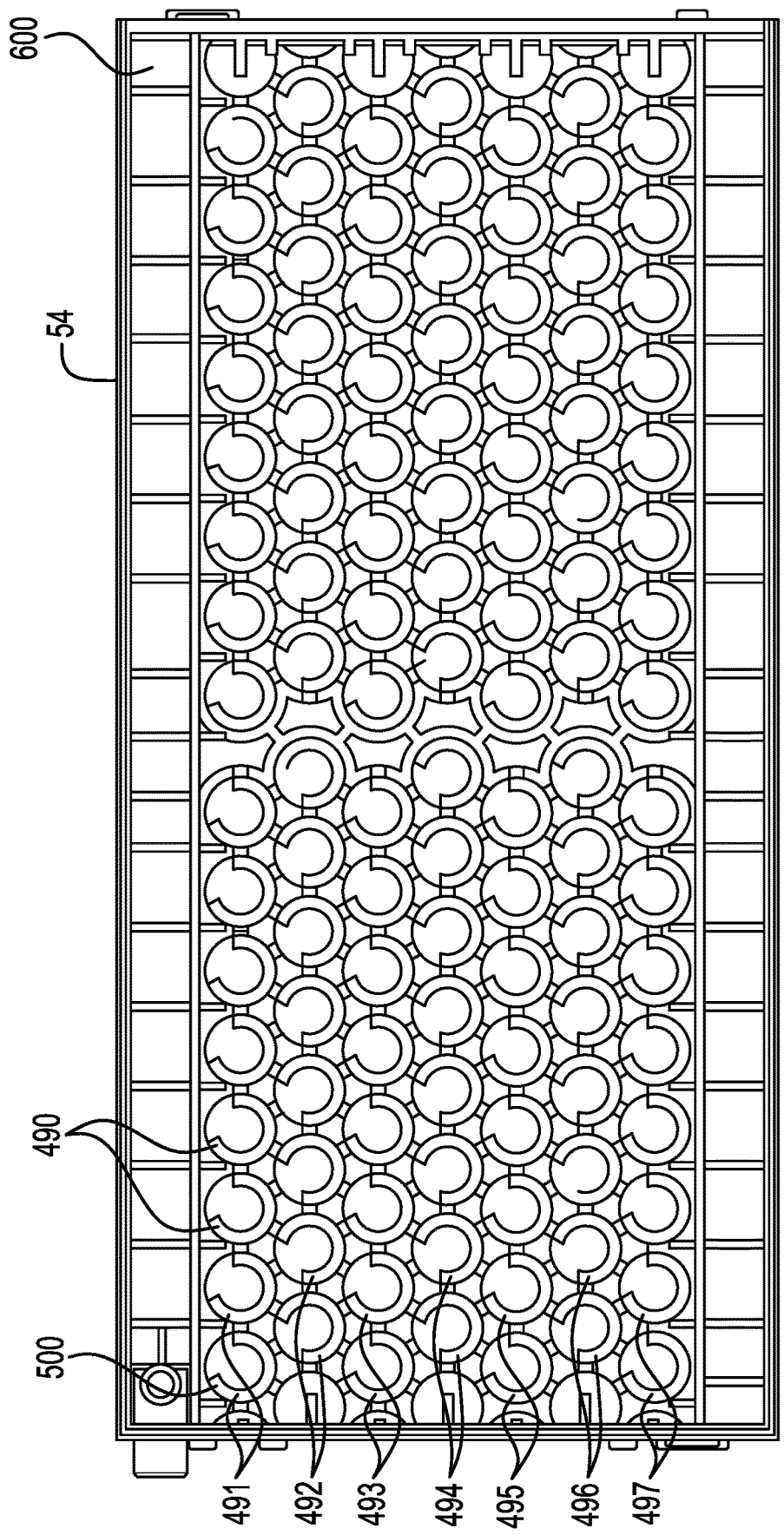
FIG. 35 is an enlarged bottom view of the first retention housing of FIG. 32.
Figure 36:
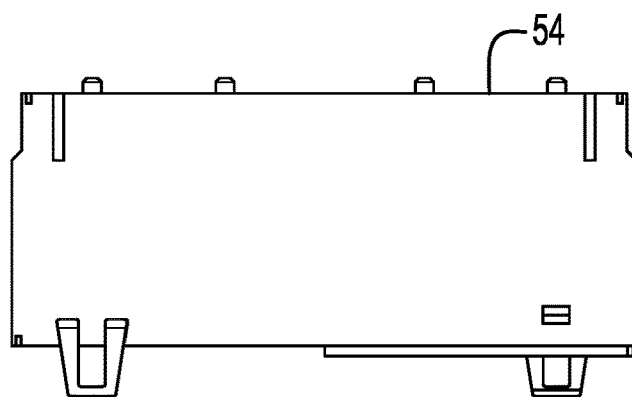
FIG. 36 is a side view of the first retention housing of FIG. 32.
Figure 37:
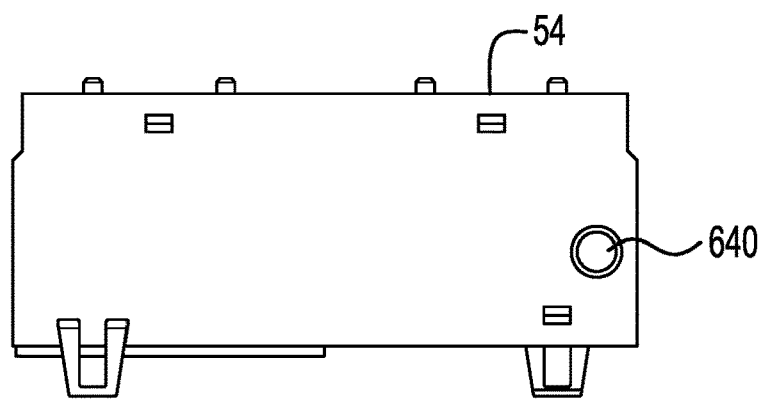
FIG. 37 is another side view of the first retention housing of FIG. 32.

Referring to FIGS. 34 and 35, the end wall 450 includes a plurality of alignment tabs 490 extending from the wall portion 600 into the interior region 460 (shown in FIG. 24) of the first retention housing 54 for receiving the first plurality of cylindrical battery cells 56 therein that align with the plurality of apertures 470. The plurality of alignment tabs 490 include a first row of alignment tabs 491, a second row of alignment tabs 492, a third row of alignment tabs 493, a fourth row of alignment tabs 494, a fifth row of alignment tabs 495, a sixth row of alignment tabs 496, and a seventh row of alignment tabs 497. The first, second, third, fourth, fifth, sixth, seventh plurality of alignment tabs 491, 492, 493, 494, 495, 496, 497 are aligned with the first, second, third, fourth, fifth, sixth, seventh plurality of apertures 471, 472, 473, 474, 475, 476, 477, respectively. Further, each alignment tab of the plurality of alignment tabs 490 is associated with a respective cylindrical battery cell of the first plurality of cylindrical battery cells 56 and a respective aperture of the plurality of apertures 470. For example, the alignment tab 500 in the first row of alignment tabs 491 is aligned with the aperture 480 in the first row of apertures 471 and holds the cylindrical battery cell 800 (shown in FIG. 39).

Referring to FIG. 34, the end wall 450 further includes tab members 601, 602, 603, 604, 605, 606 extending upwardly from the wall portion 600 for alignment with the first outer plate 90 (shown in FIG. 8). Further, the end wall 450 includes grooves 610, 612 extending into the wall portion 600 for receiving the electrical bus bars 456, 458 (shown in FIG. 25) therein.

First Side Wall

Referring to FIGS. 25 and 29, the first side wall 451 is coupled to the end wall 450 and the third and fourth side walls 453, 454 and extends in a first direction perpendicular to the end wall 450. The first side wall 451 includes a wall portion 628, a retaining clip member 630, and tab members 632, 634, 636, and an inlet port 640.

Referring to FIGS. 29 and 47, the retaining clip 630 is coupled to the wall portion 628 and extends in a first direction from the wall portion 628. The tab member 632 extends outwardly from the wall portion 628. The retaining clip member 630 is coupled to the tab member 1632 (shown in FIG. 47) for coupling the first retention housing 54 to the second retention housing 74. The tab member 632 is coupled to the retaining clip member 1630 (shown in FIG. 47) for coupling the first retention housing 54 to the second retention housing 74.

Figure 59:
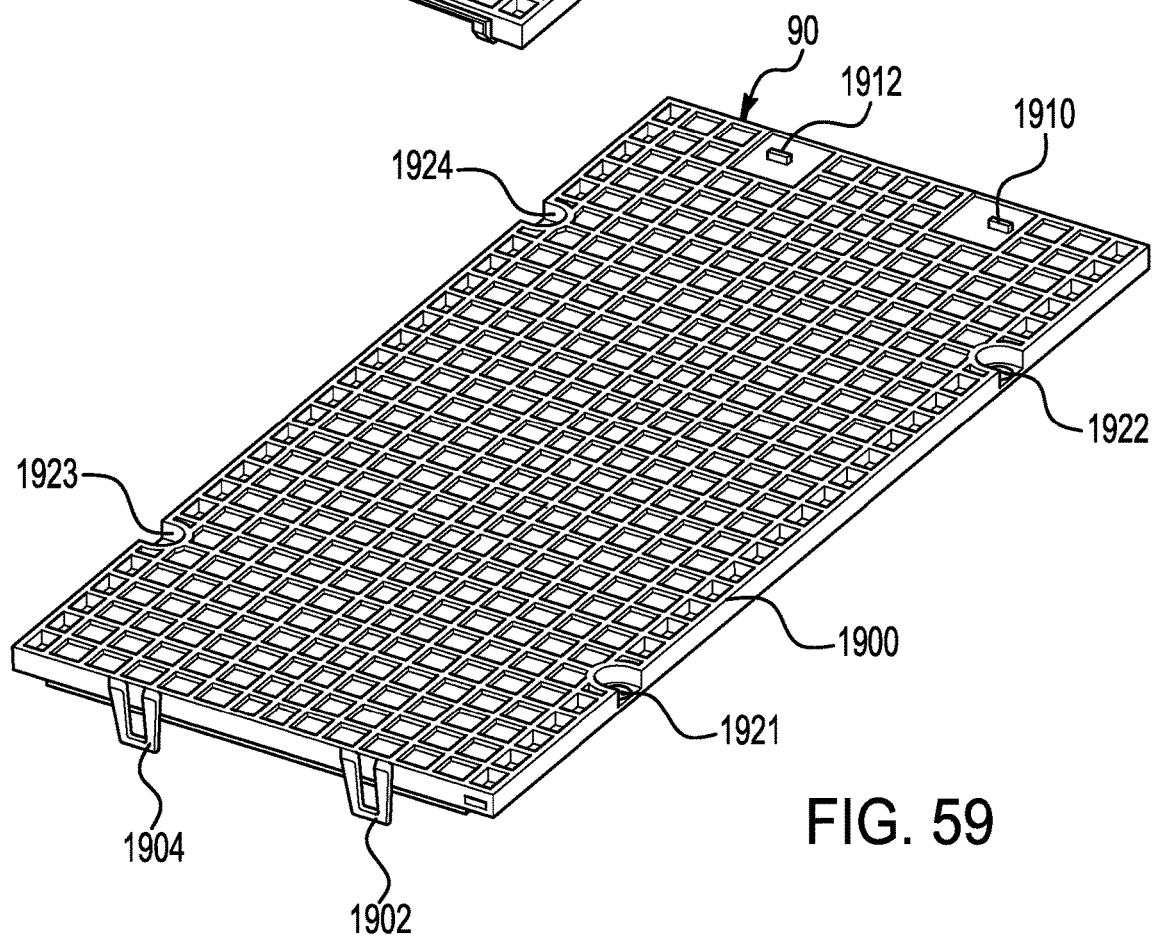
FIG. 59 is another isometric view of the first outer plate of FIG. 58.
Figure 60:
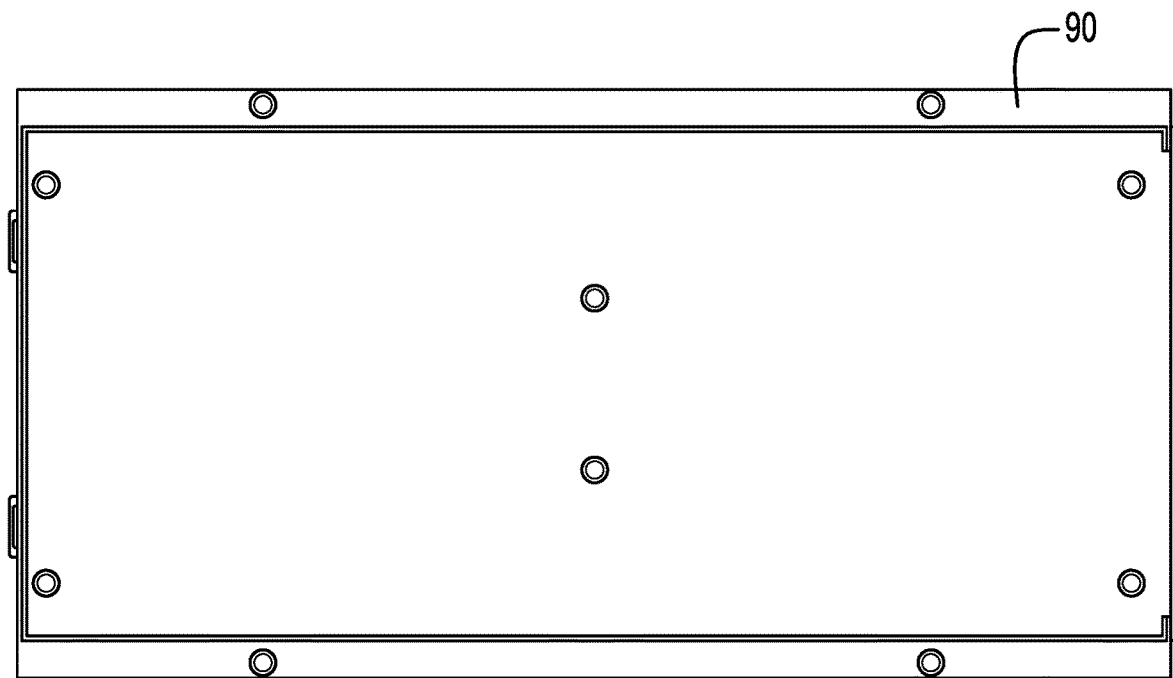
FIG. 60 is a bottom view of the first outer plate of FIG. 58.
Figure 61:
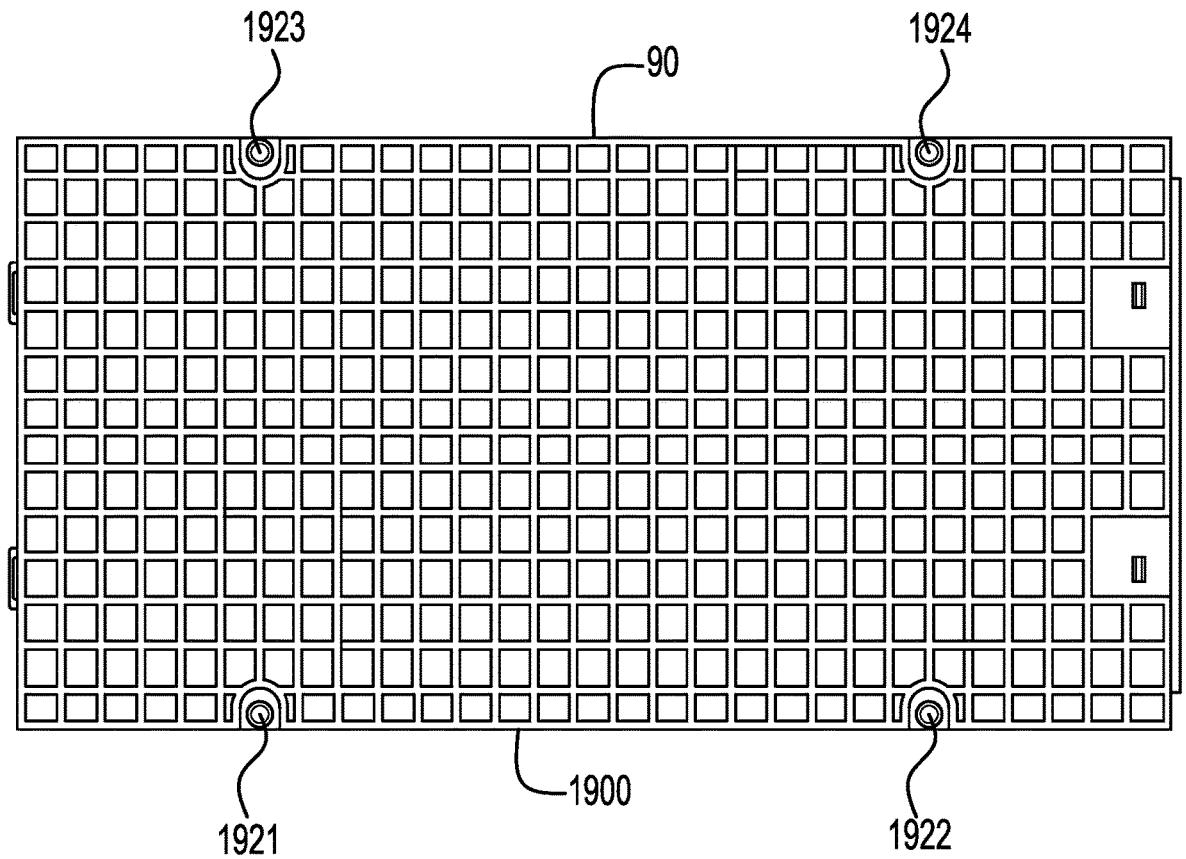
FIG. 61 is a top view of the first outer plate of FIG. 58.
Figure 62:
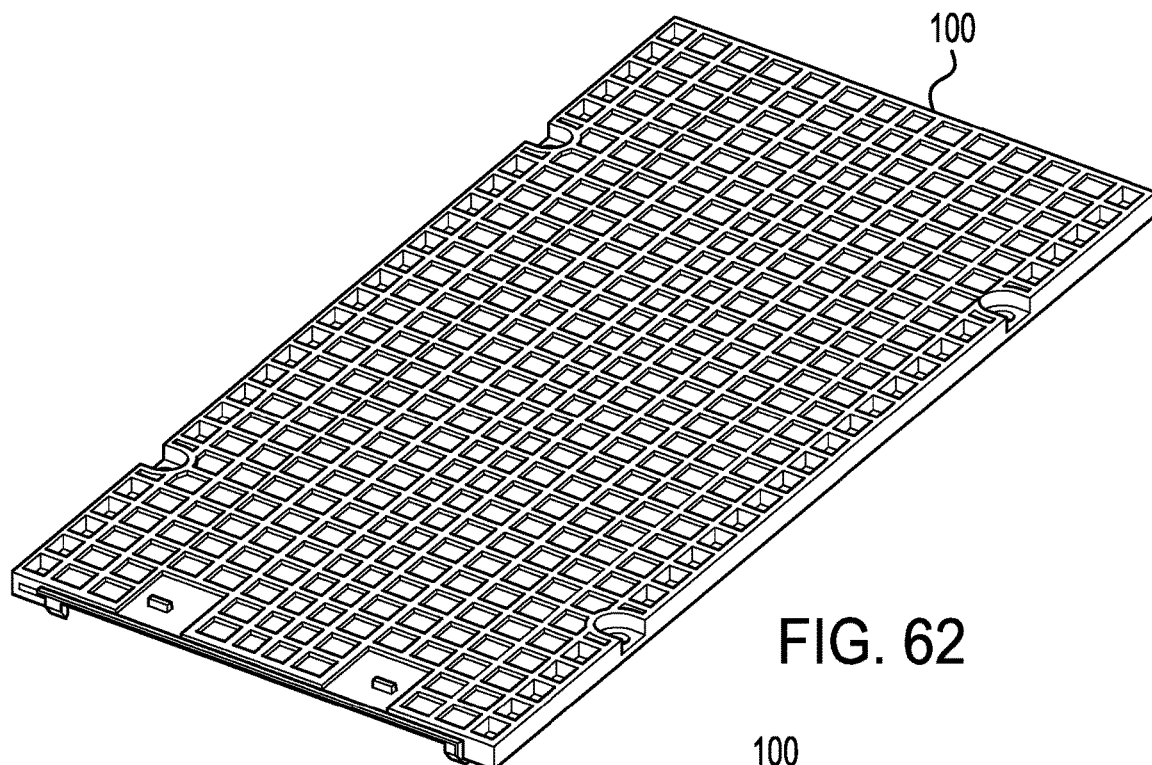
FIG. 62 is an isometric view of a second outer plate utilized in the battery module of FIG. 1.

Referring to FIGS. 29 and 59, the tab member 634 is coupled to the retaining clip member 1904 (shown in FIG. 59) of the first outer plate 90 for coupling the first outer plate 90 to the first retention housing 54. Further, the tab member 636 is coupled to the retaining clip member 1902 (shown in FIG. 59) of the first outer plate 90 for coupling the first outer plate 90 to the first retention housing 54.

Figure 38:
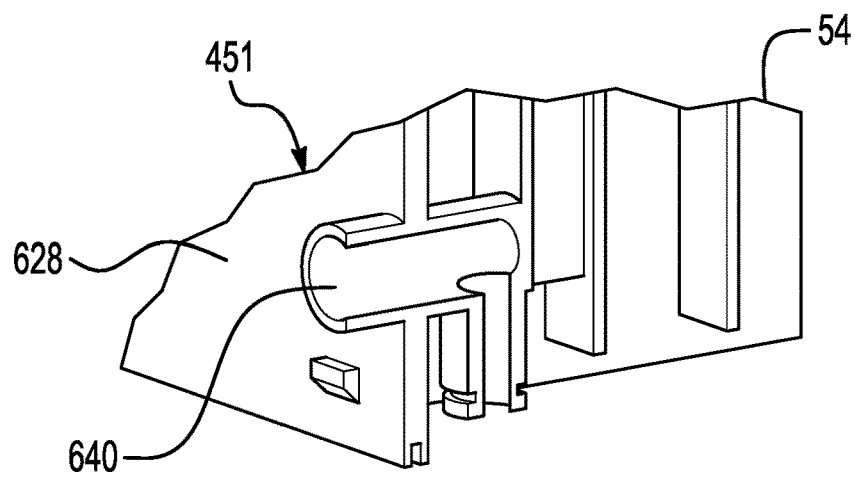
FIG. 38 is partial cut-a-way view of the first retention housing of FIG. 37 illustrating an inlet port.

Referring to FIG. 38, the first side wall 451 has an inlet port 640 coupled to the wall portion 628 that fluidly communicates with the inlet aperture 208 (shown in FIG. of the first manifold portion 161 of the central cooling plate member 140 of the battery cell retention frame 50. The inlet port 640 is routed at a 90° angle within an interior region 460 (shown in FIG. 24) of the first retention housing 54.

Second Side Wall

Referring to FIGS. 25 and 28, the second side wall 452 is coupled to the end wall 450 and the third and fourth side walls 453, 454 and extends in a first direction perpendicular to the end wall 450. The second side wall 452 includes a wall portion 648, a retaining clip member 650, and tab member 652.

Referring to FIGS. 28 and 46, the retaining clip 650 is coupled to the wall portion 648 and extends in a first direction from the wall portion 648. The tab member 652 extends outwardly from the wall portion 648. The retaining clip member 650 is coupled to the tab member 1652 (shown in FIG. 46) for coupling the first retention housing 54 to the second retention housing 74. The tab member 652 is coupled to the retaining clip member 1650 (shown in FIG. 46) for coupling the first retention housing 54 to the second retention housing 74.

Third Side Wall

Referring to FIGS. 25 and 27, the third side wall 453 is coupled to the end wall 450 and the first and second side walls 451, 452 and extends in a first direction perpendicular to the end wall 450. The third side wall 453 includes a wall portion 660.

Fourth Side Wall

Referring to FIGS. 23 and 25, the fourth side wall 454 is coupled to the end wall 450 and the first and second side walls 451, 452 and extends in a first direction perpendicular to the end wall 450. The fourth side wall 454 includes a wall portion 670.

First Plurality of Cylindrical Battery Cells

Referring to FIGS. 10, 30, 31 and 39, the first plurality of cylindrical battery cells 56 are held within the first retention housing 54 and against the battery cell retention frame 50. The first plurality of cylindrical battery cells 56 includes a first row of battery cells 751, a second row of battery cells 752, a third row of battery cells 753, a fourth row of battery cells 754, a fifth row of battery cells 755, a sixth row of battery cells 756, and a seventh row of battery cells 757.

In an exemplary embodiment, each battery cell of the first row of battery cells 751 are electrically coupled in parallel to one another. Further, each battery cell of the second row of battery cells 752 are electrically coupled in parallel to one another. Further, each battery cell of the third row of battery cells 753 are electrically coupled in parallel to one another. Further, each battery cell of the fourth row of battery cells 754 are electrically coupled in parallel to one another. Further, each battery cell of the fifth row of battery cells 755 are electrically coupled in parallel to one another. Further, each battery cell of the sixth row of battery cells 756 are electrically coupled in parallel to one another. Further, each battery cell of the seventh row of battery cells 757 are electrically coupled in parallel to one another. Further, the first, second, third, fourth, fifth, sixth, seventh rows of battery cells 756 are electrically coupled in series to one another. Still further, each negative terminal of the battery cells in the first row of battery cells 751 are electrically coupled to the electrical bus bar 456 (shown in FIG. 31). Still further, each negative terminal of the battery cells in the seventh row of battery cells 757 are electrically coupled to the electrical bus bar 458 (shown in FIG. 31).

Referring to FIGS. 39 and 40, since each of the cylindrical battery cells in the first plurality of cylindrical battery cells 56 have an identical structure, only the structure of the cylindrical battery cell 800 will be described in greater detail for purposes of simplicity. The cylindrical battery cell 800 includes an outer side surface 802, a bottom surface 804, a positive electrode 806, and the negative electrode 808. The positive electrode 806 is surrounded by the negative electrode 808. Further, the bottom surface 804 contacts the first thermally conductive layer 151 (shown in FIG. 19) of the battery cell retention frame 50 such that heat energy from the cylindrical battery cell 800 is transferred to the first thermally conductive layer 151.

First and Second Retaining Plates

Referring to FIGS. 30, 31, 34 and 39, the first and second retaining plates 60, 62 are coupled to the first, second, third, fourth side walls 451, 452, 453, 454 of the first retention housing 54 to hold the first plurality of clinical battery cells 56 within the interior region 460 (shown in FIG. 24) of the first retention housing 54. In an exemplary embodiment, the first and second retaining plates 60, 62 are constructed of plastic.

Figure 30:
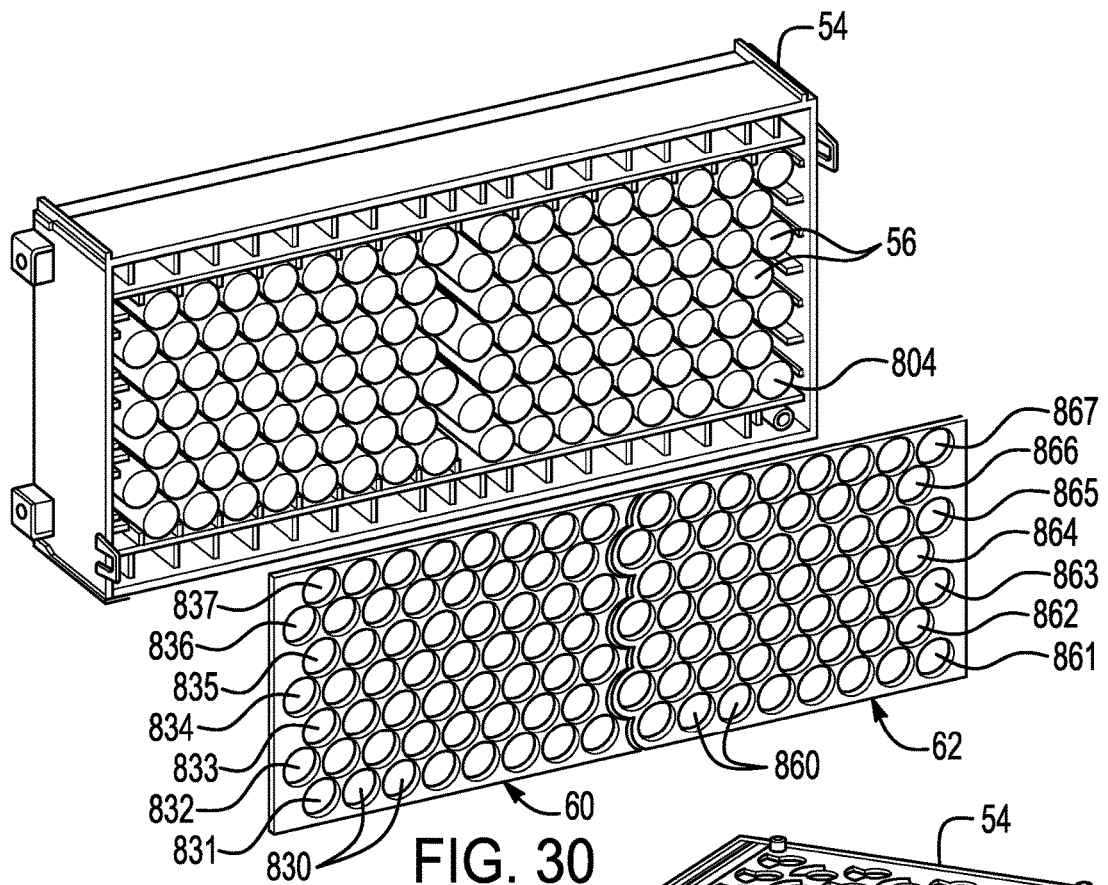
FIG. 30 is a partial exploded view of the first retention housing of FIG. 23, the first plurality of cylindrical battery cells, and the first and second retaining plates.
Figure 31:
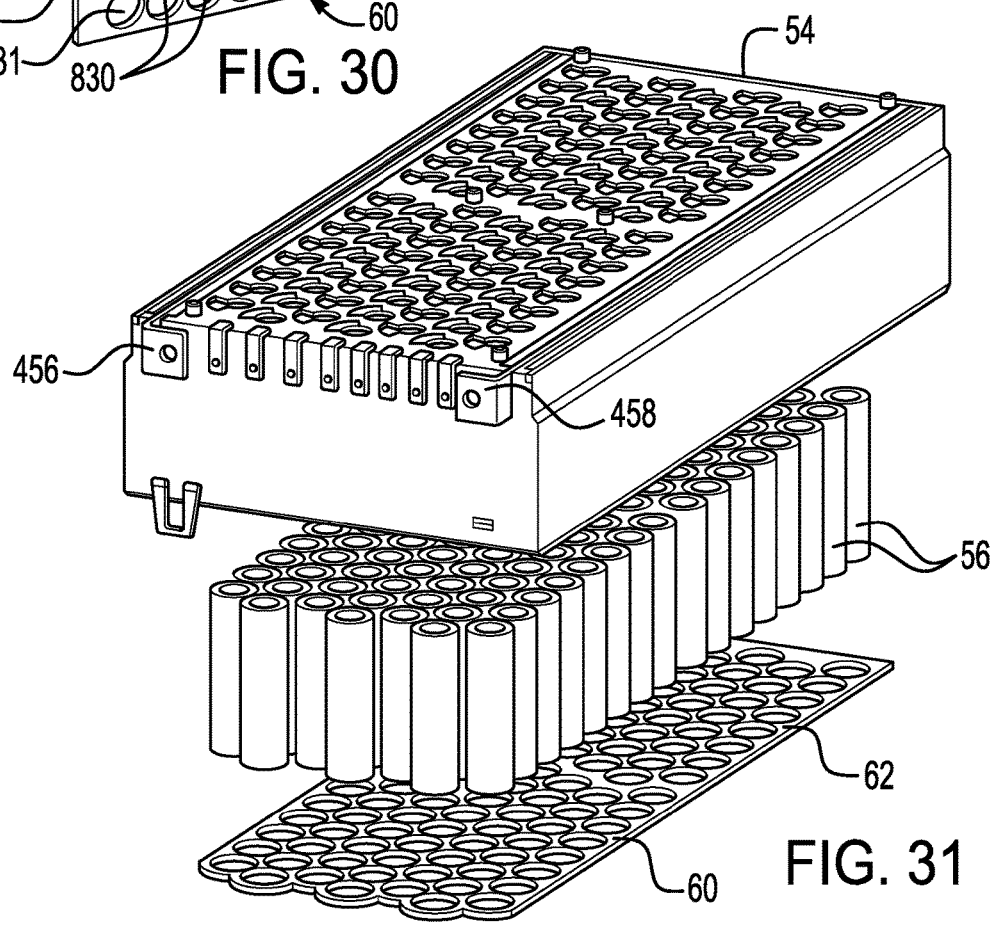
FIG. 31 is another partial exploded view of the first retention housing, the first plurality of cylindrical battery cells, and the first and second retaining plates of FIG. 30.
Figure 32:
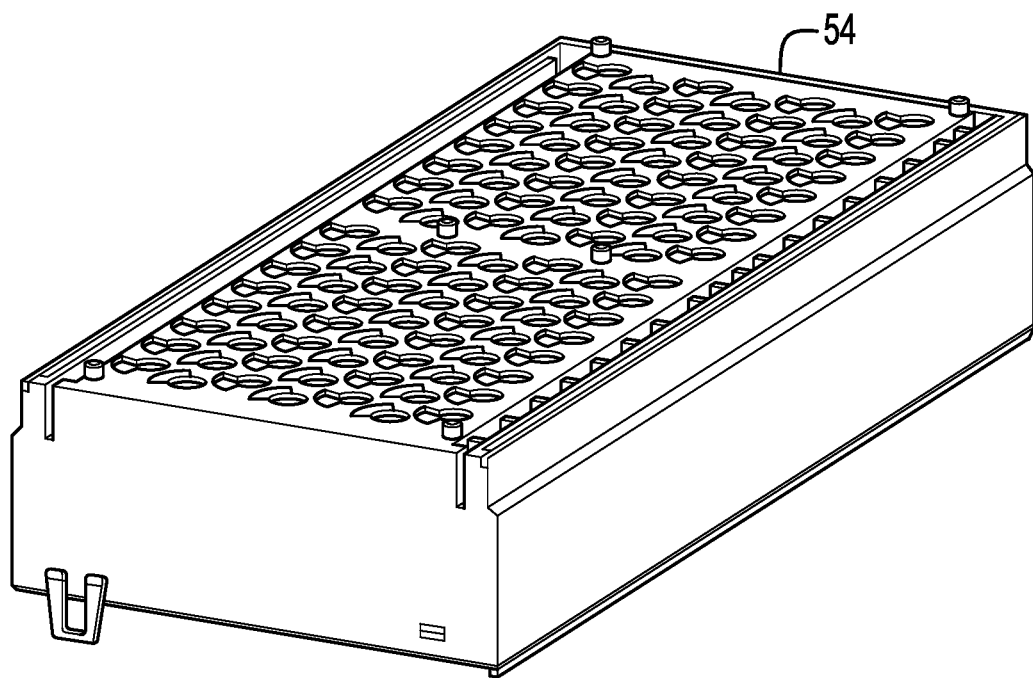
FIG. 32 is an isometric view of the first retention housing of FIG. 23 without first and second electrical bus bars therein.
Figure 33:
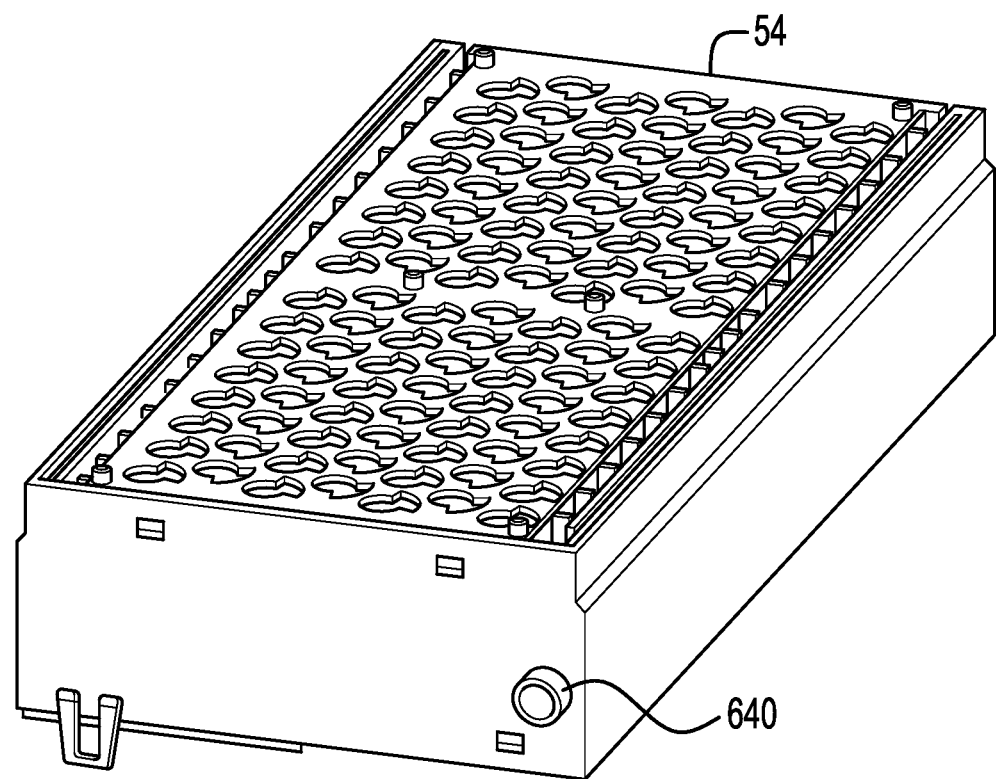
FIG. 33 is another isometric view of the first retention housing of FIG. 32.

Referring to FIG. 30, the first retaining plate 60 includes a plurality of apertures 830 extending therethrough. The plurality of apertures 830 includes a first row of apertures 831, a second row of apertures 832, a third row of apertures 833, a fourth row of apertures 834, a fifth row of apertures 835, a sixth row of apertures 836, and a seventh row of apertures 837. Each aperture of the first plurality of apertures 830 is sized to allow a bottom surface of a respective cylindrical battery cell to contact the first thermally conductive layer 151 while holding the cylindrical battery cell within the interior region 460 (shown in FIG. 24) of the first retention housing 54.

The second retaining plate 62 includes a plurality of apertures 860 extending therethrough. The plurality of apertures 860 includes a first row of apertures 861, a second row of apertures 862, a third row of apertures 863, a fourth row of apertures 864, a fifth row of apertures 865, a sixth row of apertures 866, and a seventh row of apertures 867—which align with the first row of apertures 831, the second row of apertures 832, the third row of apertures 833, the fourth row of apertures 834, the fifth row of apertures 835, the sixth row of apertures 836, and the seventh row of apertures 837, respectively. Each aperture of the plurality of apertures 860 is sized to allow a bottom surface of a respective cylindrical battery cell to contact the first thermally conductive layer 151 while holding the cylindrical battery cell within the interior region 460 of the first retention housing 54.

Referring to FIGS. 30 and 39, the first row of apertures 831 of the first retaining plate 60, and the first row of apertures 861 of the second retaining plate 62 align with the first row of battery cells 751. Further, the second row of apertures 832 of the first retaining plate 60, and the second row of apertures 862 of the second retaining plate 62 align with the second row of battery cells 752. Further, the third row of apertures 833 of the first retaining plate 60, and the third row of apertures 863 of the second retaining plate 62 align with the third row of battery cells 753. Further, the fourth row of apertures 834 of the first retaining plate 60, and the fourth row of apertures 864 of the second retaining plate 62 align with the fourth row of battery cells 754. Further, the fifth row of apertures 835 of the first retaining plate 60, and the fifth row of apertures 865 of the second retaining plate 62 align with the fifth row of battery cells 755. Further, the sixth row of apertures 836 of the first retaining plate 60, and the sixth row of apertures 866 of the second retaining plate 62 align with the sixth row of battery cells 756. Further, the seventh row of apertures 837 of the first retaining plate 60, and the seventh row of apertures 867 of the second retaining plate 62 align with the seventh row of battery cells 757.

Second Retention Housing

Figure 41:
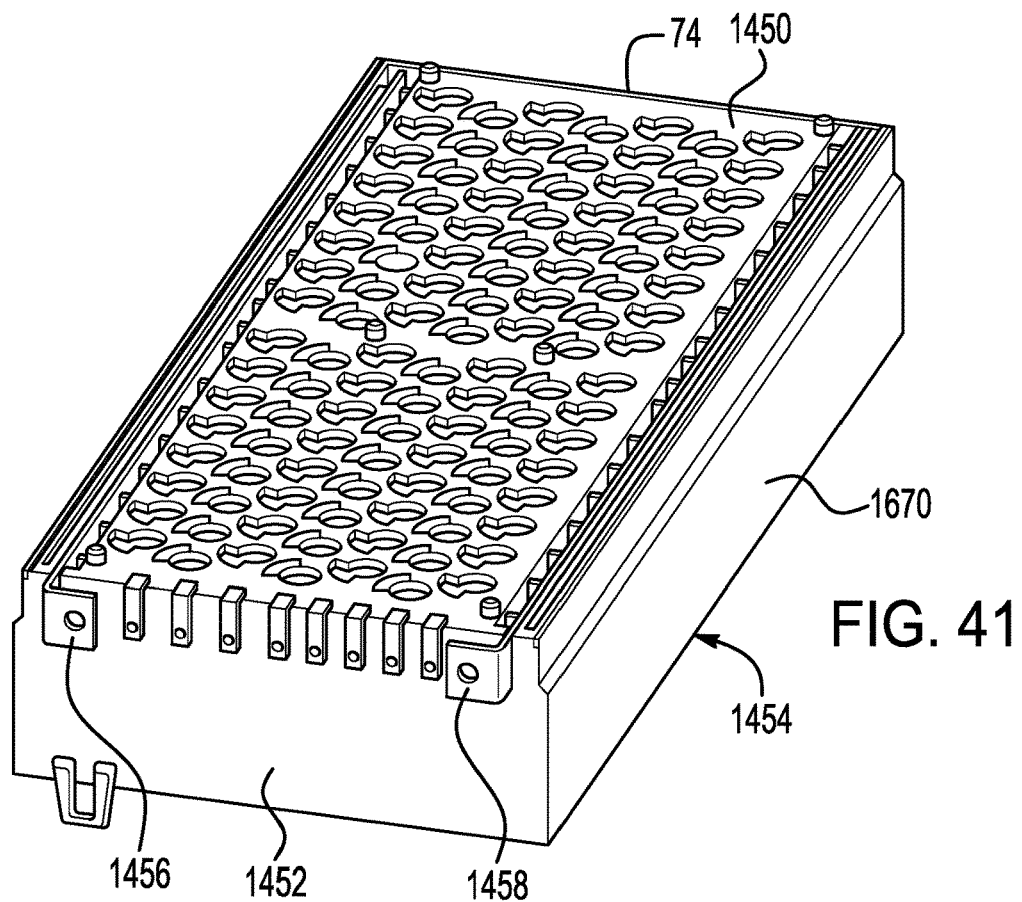
FIG. 41 is an isometric view of a second retention housing utilized in the battery module of FIG. 1.
Figure 43:
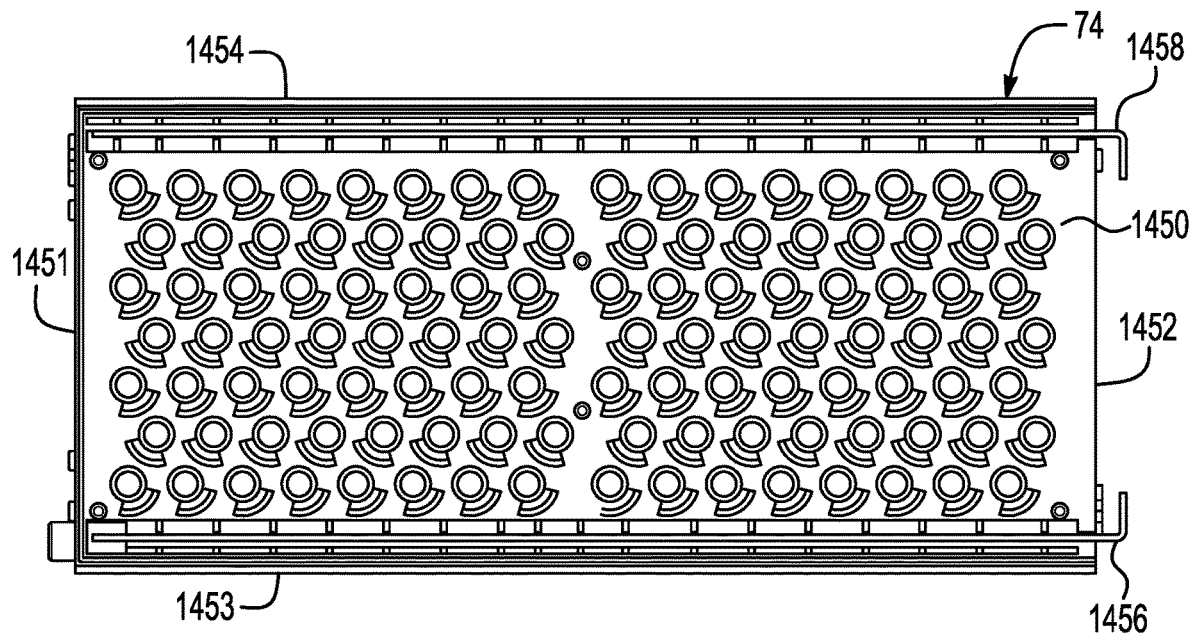
FIG. 43 is a top view of the second retention housing of FIG. 41.
Figure 44:
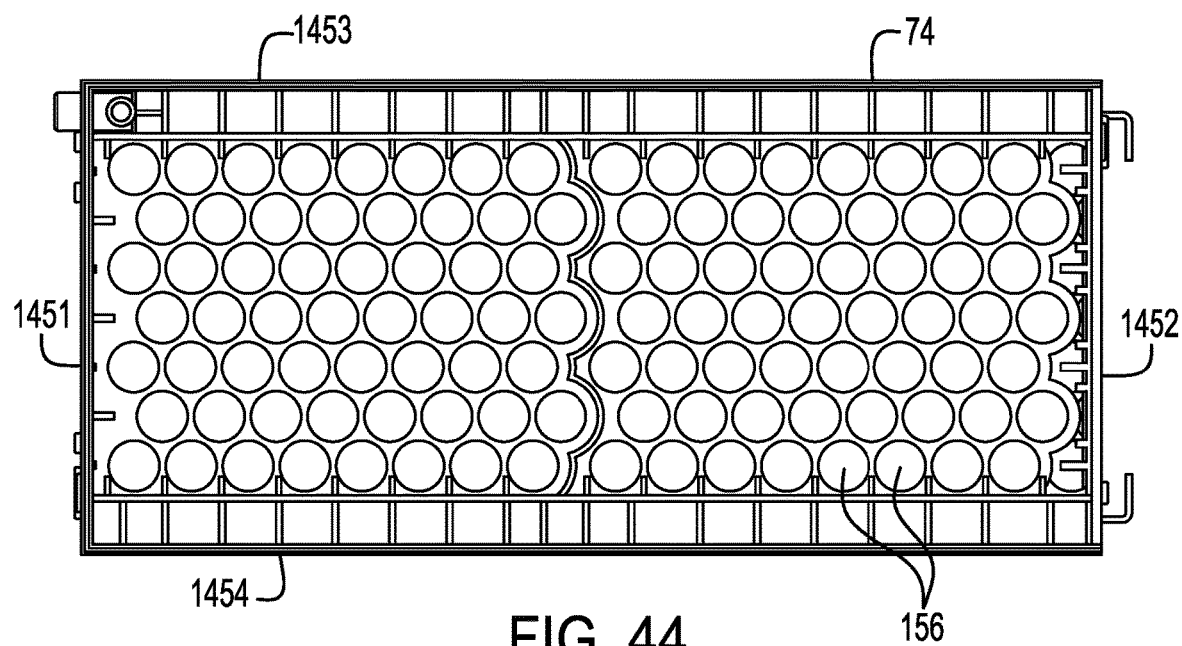
FIG. 44 is a bottom view of the second retention housing, the second plurality of cylindrical battery cells, and the third and fourth retaining plates of FIG. 42.

Referring to FIGS. 19 and 41-56, the second retention housing 74 holds the second plurality of cylindrical battery cells 76 therein and on and against the second thermally conductive layer 152 (shown in FIG. 19) such that the battery cells 76 thermally communicate through the layer 152 with the second intermediate wall 172. The second retention housing 74 has an identical structure as the first retention housing 54. The second retention housing 74 is disposed within the region 402 (shown in FIG. 19) defined by the second intermediate wall 172 and the first and second exterior plates 141, 142. Referring to FIGS. 41 and 43, the second retention housing 74 has an end wall 1450, a first side wall 1451, a second side wall 1452, a third side wall 1453, a fourth side wall 1454, an electrical bus bar 1456, and an electrical bus bar 1458. The first and second side walls 1451, 1452 extend substantially parallel to one another. Further, the third and fourth side walls 1453, 1454 extend substantially parallel to one another and perpendicular to the first and second side walls 1451, 1452. In an exemplary embodiment, the end wall 1450 and the first, second, third, and fourth side walls 1451, 1452, 1453, 1454 are constructed of plastic. Further, the electrical bus bars 1456 and 1458 are constructed of copper.

End Wall

The end wall 1450 is coupled to the first, second, third, and fourth side walls 1451, 1452, 1453, 1454 to define an interior region 1460 (shown in FIG. 42) and an open end 1462.

Figure 52:
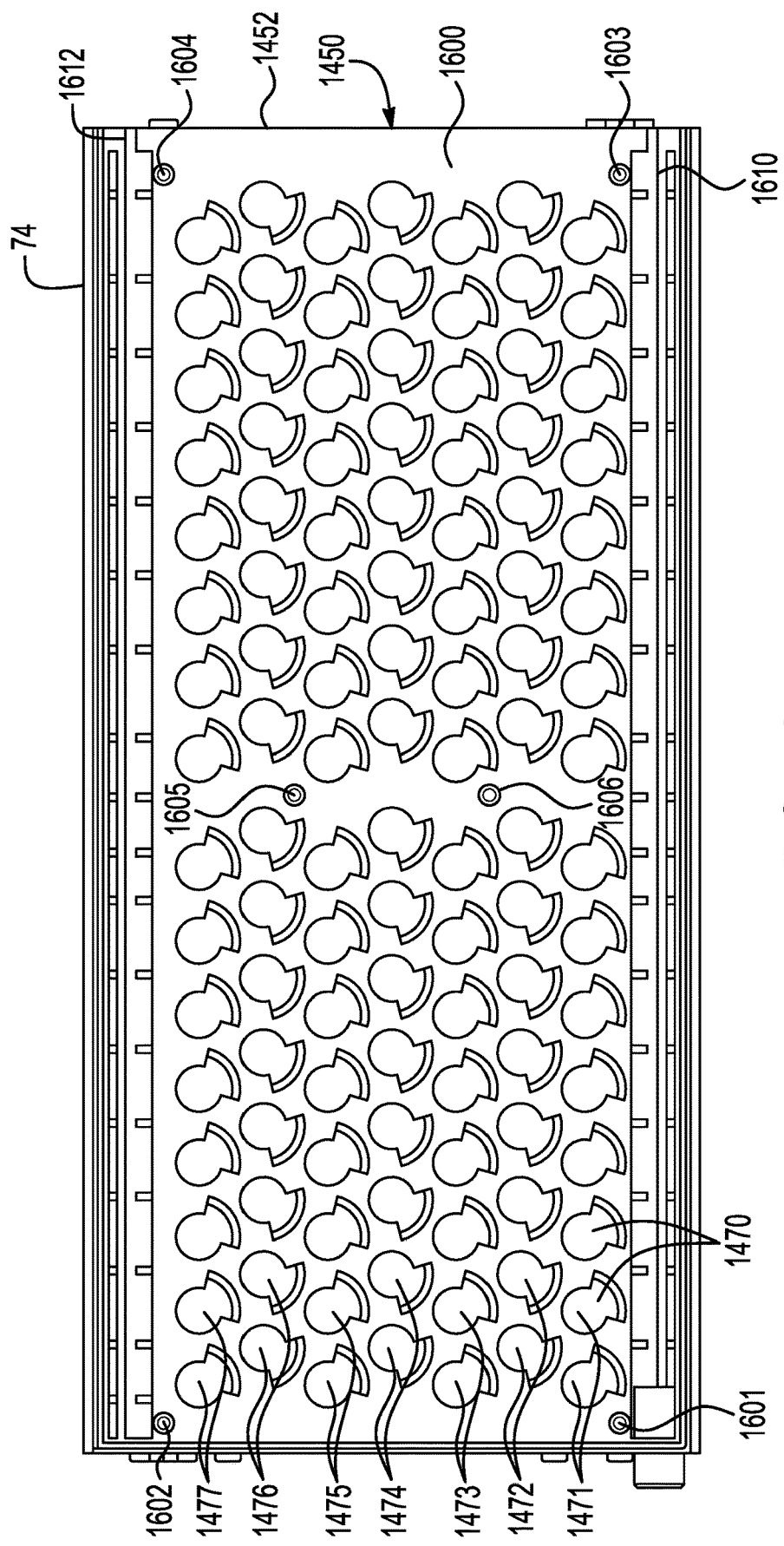
FIG. 52 is an enlarged top view of the second retention housing of FIG. 50.

Referring to FIG. 52, the end wall 1450 includes a wall portion 1600 with a plurality of apertures 1470 extending therethrough. Each aperture of the plurality of apertures 1470 is associated with a cylindrical battery cell of the second plurality of cylindrical battery cells 756. The plurality of apertures 1470 includes a first row of apertures 1471, a second row of apertures 1472, a third row of apertures 1473, a fourth row of apertures 1474, a fifth row of apertures 1475, a sixth row of apertures 1476, and a seventh row of apertures 1477.

Figure 53:
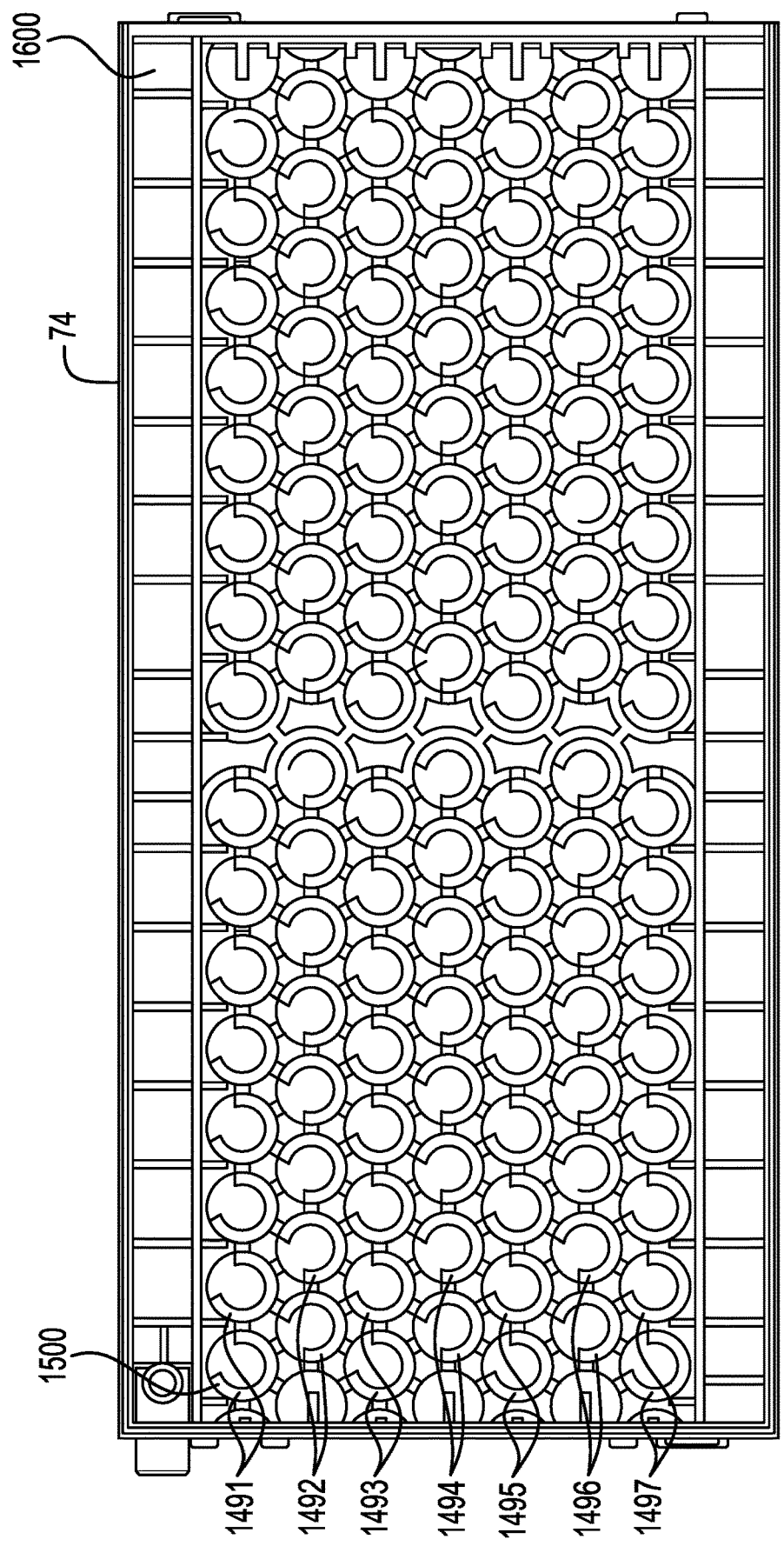
FIG. 53 is an enlarged bottom view of the second retention housing of FIG. 50.
Figure 54:
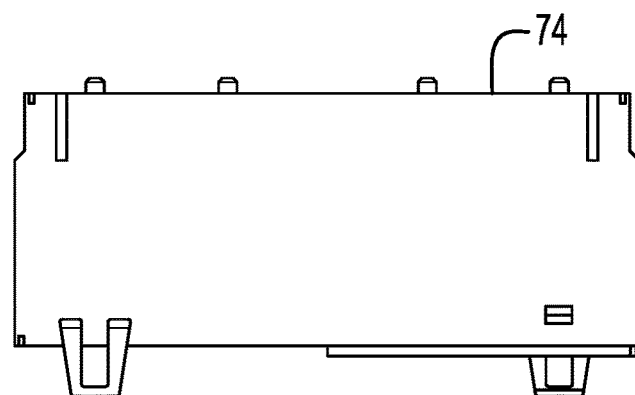
FIG. 54 is a side view of the second retention housing of FIG. 50.
Figure 55:
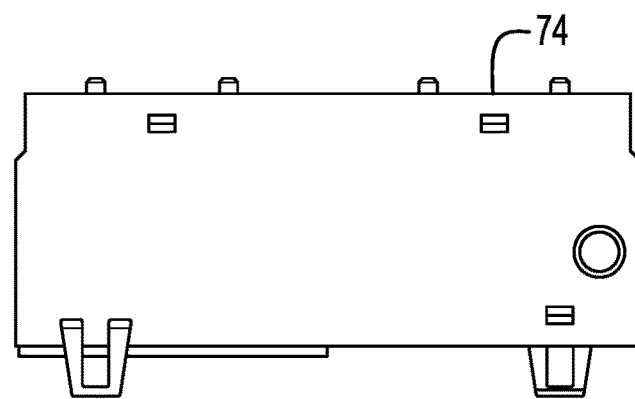
FIG. 55 is another side view of the second retention housing of FIG. 50.

Referring to FIGS. 52 and 53, the end wall 1450 includes a plurality of alignment tabs 1490 extending from the wall portion 1600 into the interior region 1460 (shown in FIG. 42) of the second retention housing 74 for receiving the second plurality of cylindrical battery cells 76 therein that align with the plurality of apertures 1470. The plurality of alignment tabs 1490 include a first row of alignment tabs 1491, a second row of alignment tabs 1492, a third row of alignment tabs 1493, a fourth row of alignment tabs 1494, a fifth row of alignment tabs 1495, a sixth row of alignment tabs 1496, and a seventh row of alignment tabs 1497. The first, second, third, fourth, fifth, sixth, seventh plurality of alignment tabs 1491, 1492, 1493, 1494, 1495, 1496, 1497 are aligned with the first, second, third, fourth, fifth, sixth, seventh plurality of apertures 1471, 1472, 1473, 1474, 1475, 1476, 1477, respectively. Further, each alignment tab of the plurality of alignment tabs 1490 is associated with a respective cylindrical battery cell of the second plurality of cylindrical battery cells 76 and a respective aperture of the plurality of apertures 1470. For example, the alignment tab 1500 in the first row of alignment tabs 1491 is aligned with the aperture 1480 in the first row of apertures 1471 and holds the cylindrical battery cell 1800 (shown in FIG. 57).

Referring to FIG. 52, the end wall 1450 further includes tab members 1601, 1602, 1603, 1604, 1605, 1606 extending upwardly from the wall portion 1600 for alignment with the second outer plate 100 (shown in FIG. 8). Further, the end wall 1450 includes grooves 1610, 1612 extending into the wall portion 1600 for receiving the electrical bus bars 1456, 1458 (shown in FIG. 41) therein.

First Side Wall

Referring to FIGS. 43 and 47, the first side wall 1451 is coupled to the end wall 1450 and the third and fourth side walls 1453, 1454 and extends in a first direction perpendicular to the end wall 1450. The first side wall 1451 includes a wall portion 1628, a retaining clip member 1630, and tab members 1632, 1634, 1636, and an outlet port 1640.

Referring to FIGS. 29 and 47, the retaining clip 1630 is coupled to the wall portion 1628 and extends in a first direction from the wall portion 1628. The tab member 1632 extends outwardly from the wall portion 1628. The retaining clip member 1630 is coupled to the tab member 632 (shown in FIG. 29) for coupling the second retention housing 74 to the first retention housing 54. The tab member 1632 is coupled to the retaining clip member 630 (shown in FIG. 29) for coupling the second retention housing 74 to the first retention housing 54.

Figure 63:
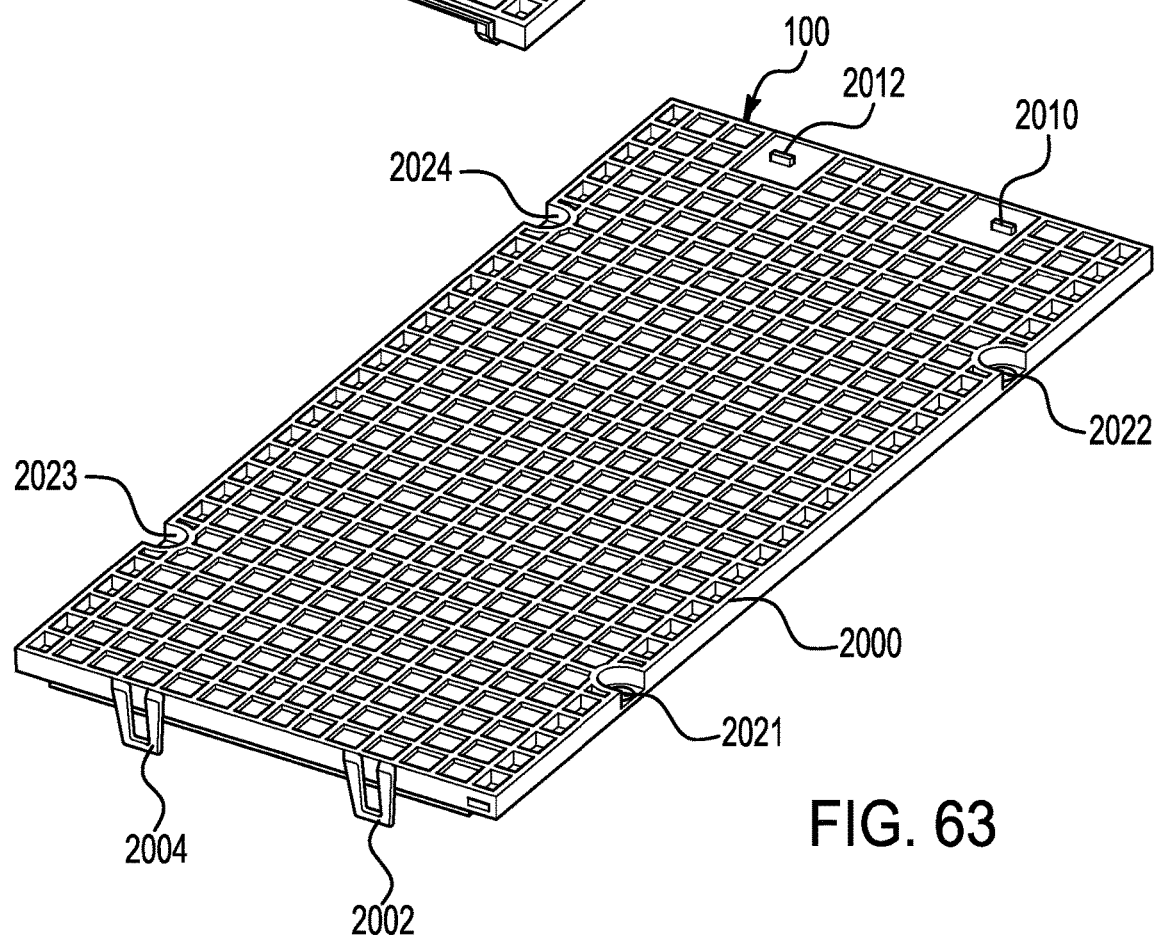
FIG. 63 is another isometric view of the second outer plate of FIG. 62.
Figure 64:
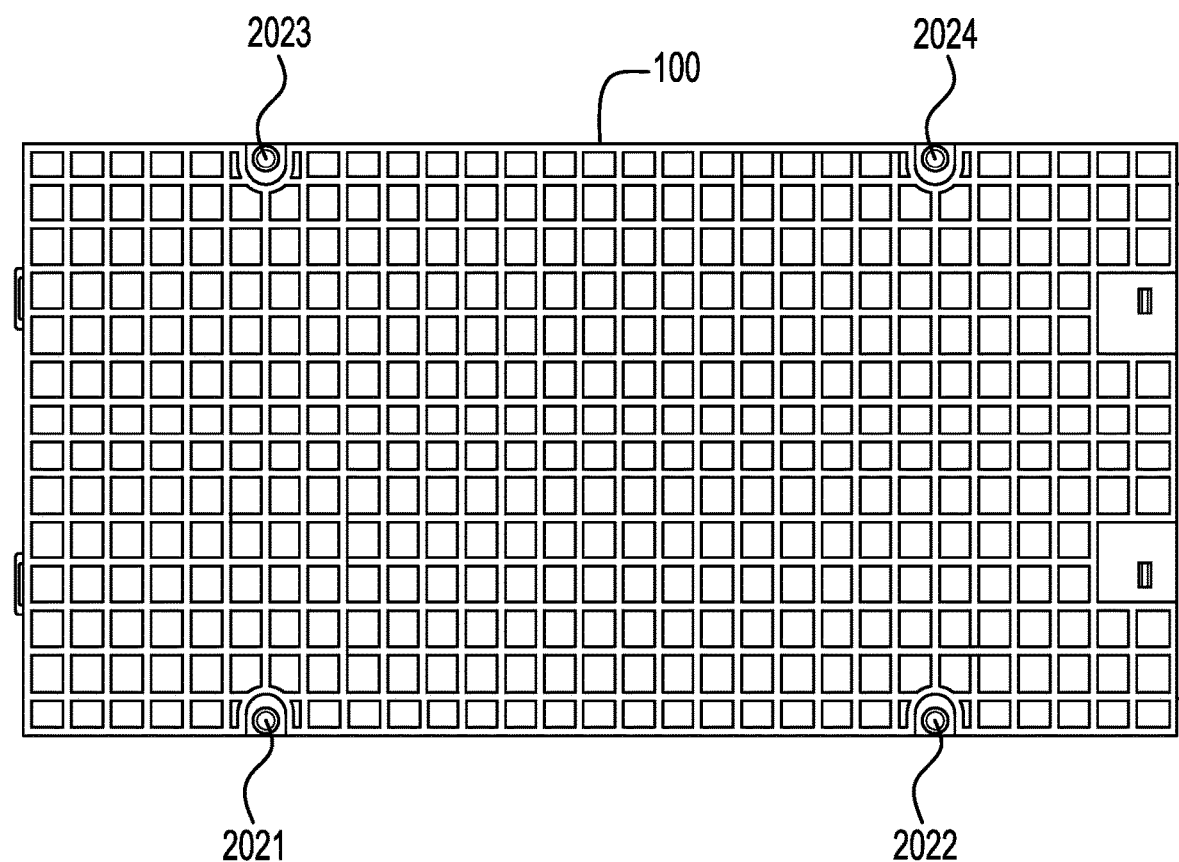
FIG. 64 is a bottom view of the second outer plate of FIG. 62.
Figure 65:
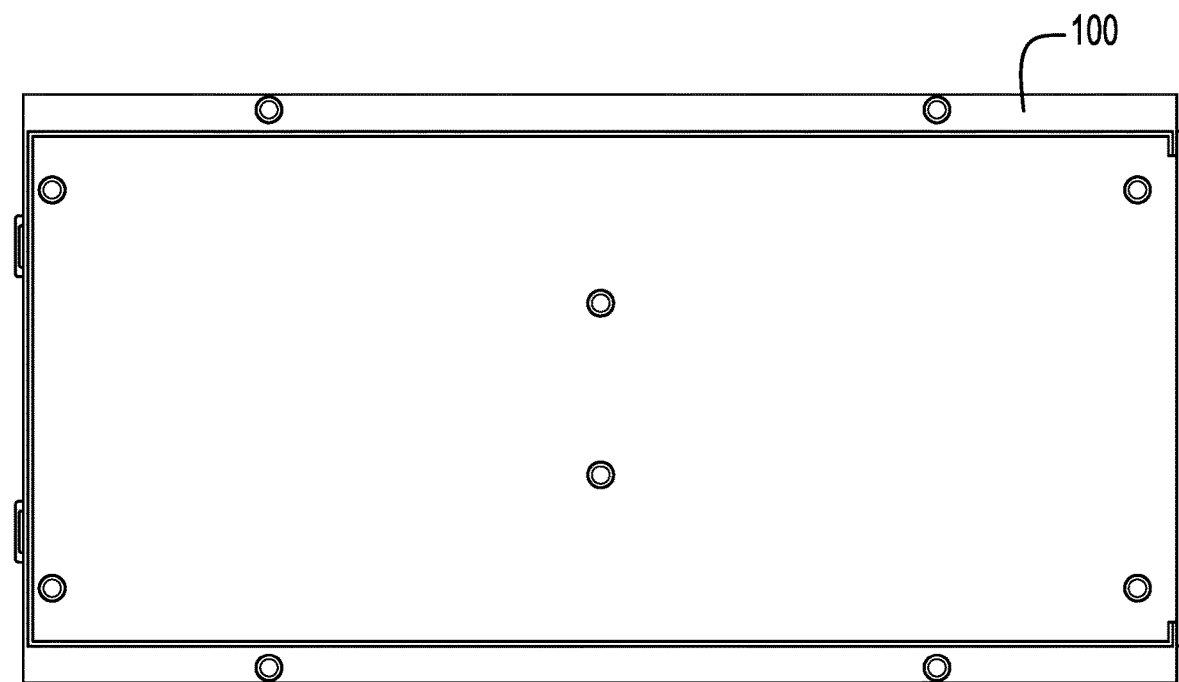
FIG. 65 is a top view of the second outer plate of FIG. 62.

Referring to FIGS. 47 and 63, the tab member 1634 is coupled to the retaining clip member 2004 (shown in FIG. 63) of the second outer plate 100 for coupling the second outer plate 100 to the second retention housing 74. Further, the tab member 1636 is coupled to the retaining clip member 2002 (shown in FIG. 63) of the second outer plate 100 for coupling the second outer plate 100 to the second retention housing 74.

Figure 56:
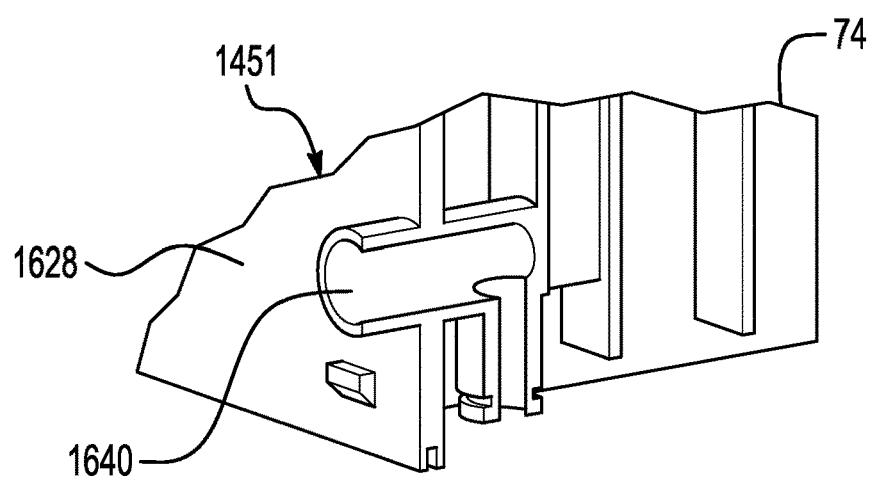
FIG. 56 is partial cut-a-way view of the second retention housing of FIG. 55 illustrating an outlet port.

Referring to FIG. 56, the first side wall 1451 has an outlet port 1640 coupled to the wall portion 1628 that fluidly communicates with the outlet aperture 238 (shown in FIG. 20) of the second manifold portion 162 of the central cooling plate member 140 of the battery cell retention frame 50. The outlet port 1640 is routed at a 90° angle within an interior region 1460 (shown in FIG. 42) of the second retention housing 74.

Second Side Wall

Referring to FIGS. 43 and 46, the second side wall 1452 is coupled to the end wall 1450 and the third and fourth side walls 1453, 1454 and extends in a first direction perpendicular to the end wall 1450. The second side wall 1452 includes a wall portion 1648, a retaining clip member 1650, and tab member 1652.

Referring to FIGS. 28 and 46, the retaining clip 1650 is coupled to the wall portion 1648 and extends in a first direction from the wall portion 1648. The tab member 1652 extends outwardly from the wall portion 1648. The retaining clip member 1650 is coupled to the tab member 652 (shown in FIG. 28) for coupling the second retention housing 74 to the first retention housing 54. The tab member 1652 is coupled to the retaining clip member 650 (shown in FIG. 28) for coupling the second retention housing 74 to the first retention housing 54.

Third Side Wall

Referring to FIGS. 43 and 45, the third side wall 1453 is coupled to the end wall 1450 and the first and second side walls 1451, 1452 and extends in a first direction perpendicular to the end wall 1450. The third side wall 1453 includes a wall portion 1660.

Fourth Side Wall

Referring to FIGS. 41 and 43, the fourth side wall 1454 is coupled to the end wall 1450 and the first and second side walls 1451, 1452 and extends in a first direction perpendicular to the end wall 1450. The fourth side wall 1454 includes a wall portion 1670.

Second Plurality of Cylindrical Battery Cells

Referring to FIGS. 10, 48, 49 and 57, the second plurality of cylindrical battery cells 76 are held within the second retention housing 74 and against the battery cell retention frame 50. The second plurality of cylindrical battery cells 76 includes a first row of battery cells 1751, a second row of battery cells 1752, a third row of battery cells 1753, a fourth row of battery cells 1754, a fifth row of battery cells 1755, a sixth row of battery cells 1756, and a seventh row of battery cells 1757.

In an exemplary embodiment, each battery cell of the first row of battery cells 1751 are electrically coupled in parallel to one another. Further, each battery cell of the second row of battery cells 1752 are electrically coupled in parallel to one another. Further, each battery cell of the third row of battery cells 1753 are electrically coupled in parallel to one another. Further, each battery cell of the fourth row of battery cells 1754 are electrically coupled in parallel to one another. Further, each battery cell of the fifth row of battery cells 1755 are electrically coupled in parallel to one another. Further, each battery cell of the sixth row of battery cells 1756 are electrically coupled in parallel to one another. Further, each battery cell of the seventh row of battery cells 1757 are electrically coupled in parallel to one another. Further, the first, second, third, fourth, fifth, sixth, seventh rows of battery cells 1756 are electrically coupled in series to one another. Still further, each negative terminal of the battery cells in the first row of battery cells 1751 are electrically coupled to the electrical bus bar 1456 (shown in FIG. 49). Still further, each negative terminal of the battery cells in the seventh row of battery cells 1757 are electrically coupled to the electrical bus bar 1458 (shown in FIG. 49).

Figure 57:
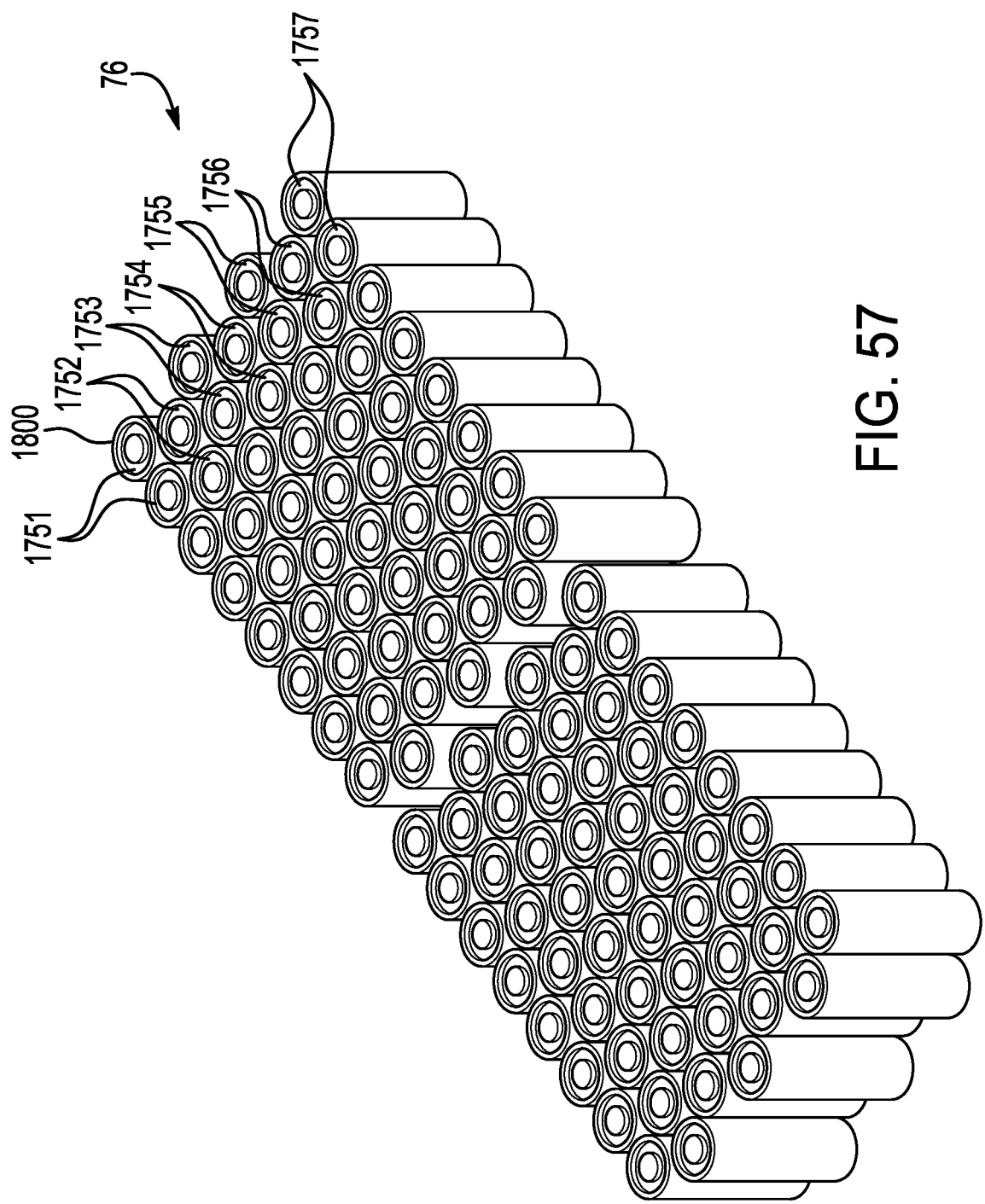
FIG. 57 is schematic of a second plurality of cylindrical battery cells utilized in the battery module of FIG. 1.
Figure 58:
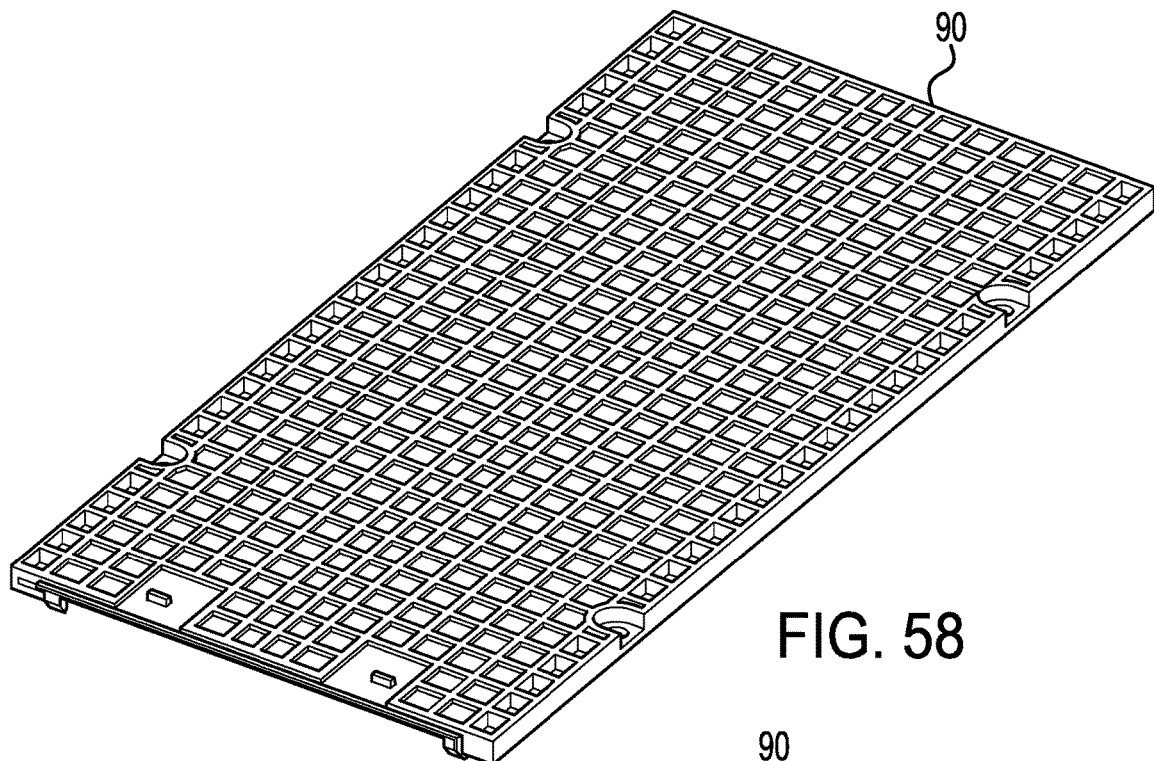
FIG. 58 is an isometric view of a first outer plate utilized in the battery module of FIG. 1.

Referring to FIGS. 40 and 57, each of the cylindrical battery cells in the second plurality of cylindrical battery cells 76 have an identical structure as the cylindrical battery cell 800 previously described herein and have a bottom surface that contacts the second thermally conductive layer 152 (shown in FIG. 19) of the battery cell retention frame 50.

Third and Fourth Retaining Plates

Referring to FIGS. 48, 49, 52 and 57, the third and fourth retaining plates 80, 82 are coupled to the first, second, third, fourth side walls 1451, 1452, 1453, 1454 of the second retention housing 74 to hold the second plurality of clinical battery cells 76 within the interior region 1460 (shown in FIG. 42) of the second retention housing 74. In an exemplary embodiment, the third and fourth retaining plates 80, 82 are constructed of plastic.

Figure 48:
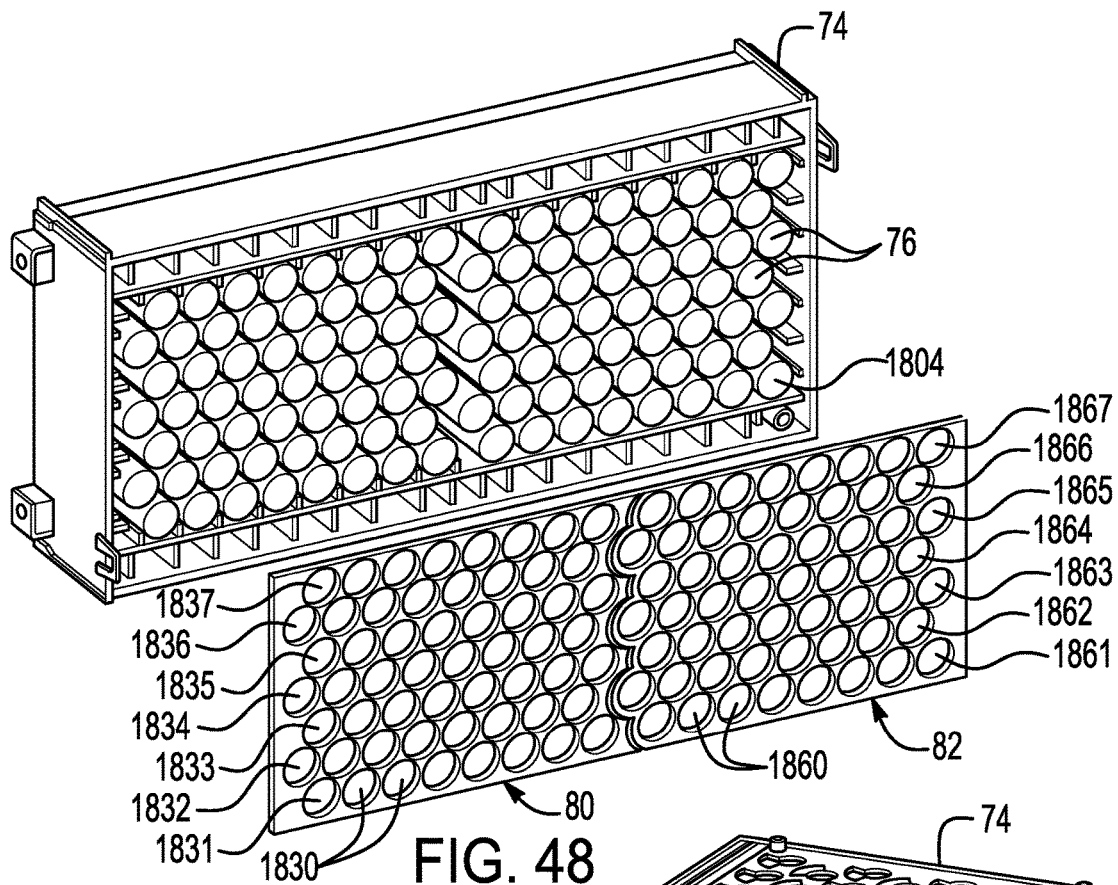
FIG. 48 is a partial exploded view of the second retention housing of FIG. 41, the second plurality of cylindrical battery cells, and the third and fourth retaining plates.
Figure 49:
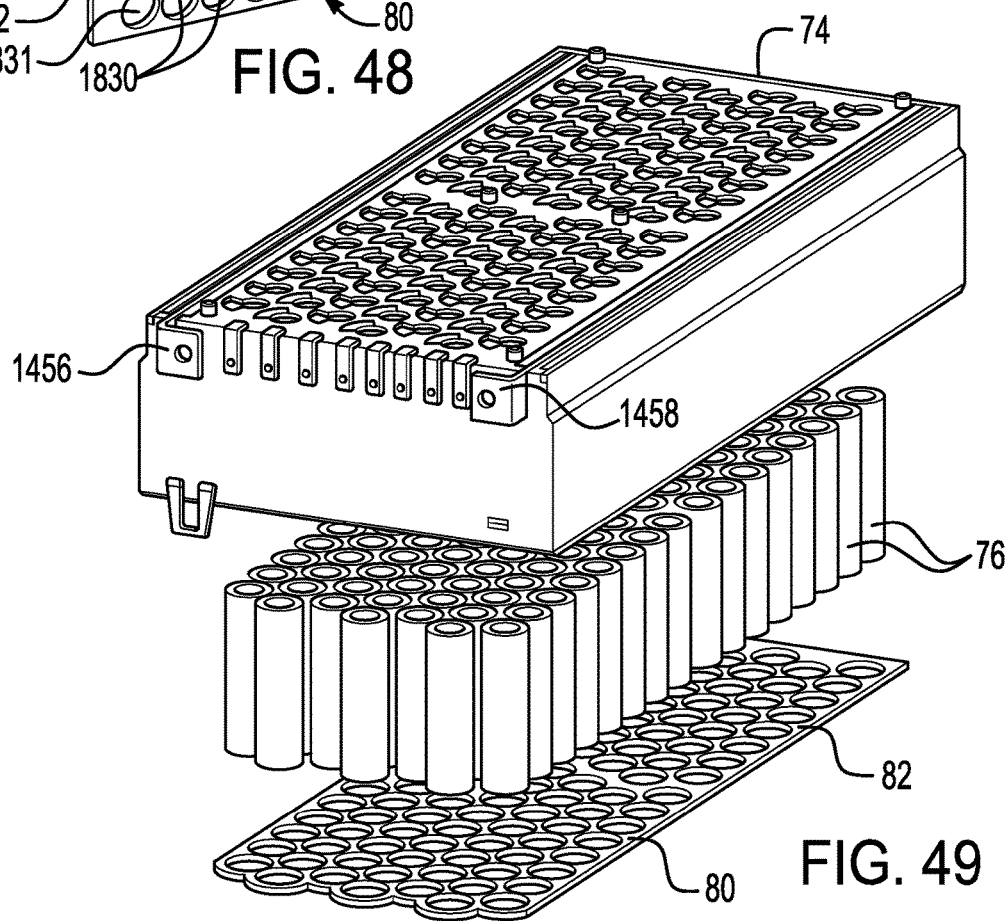
FIG. 49 is another partial exploded view of the second retention housing, the second plurality of cylindrical battery cells, and the third and fourth retaining plates of FIG. 48.
Figure 50:
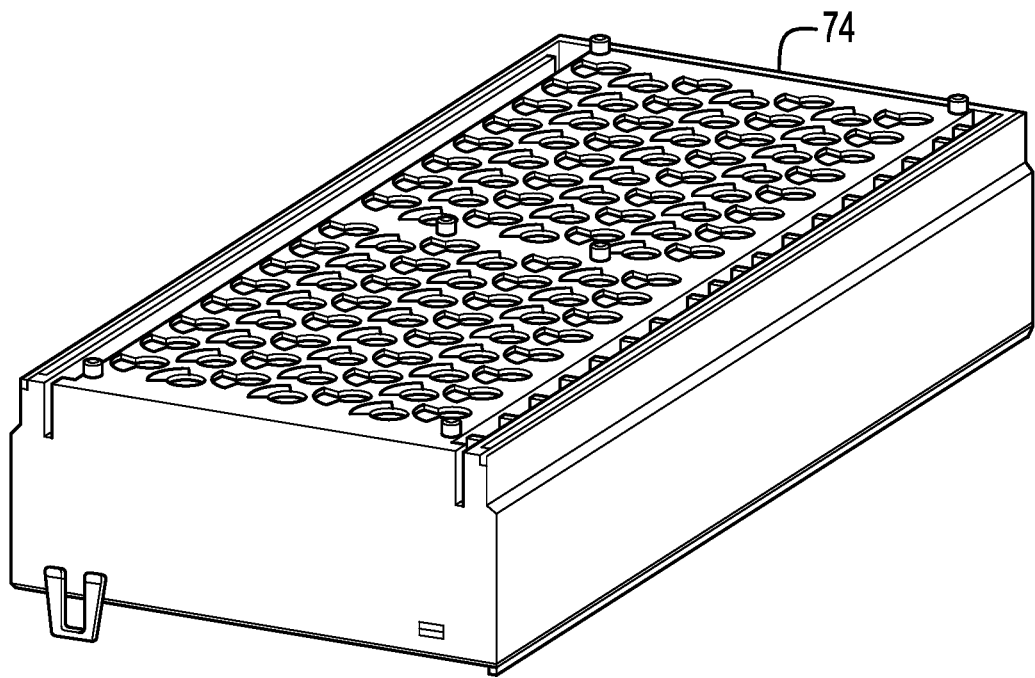
FIG. 50 is an isometric view of the second retention housing of FIG. 41 without first and second electrical bus bars therein.
Figure 51:
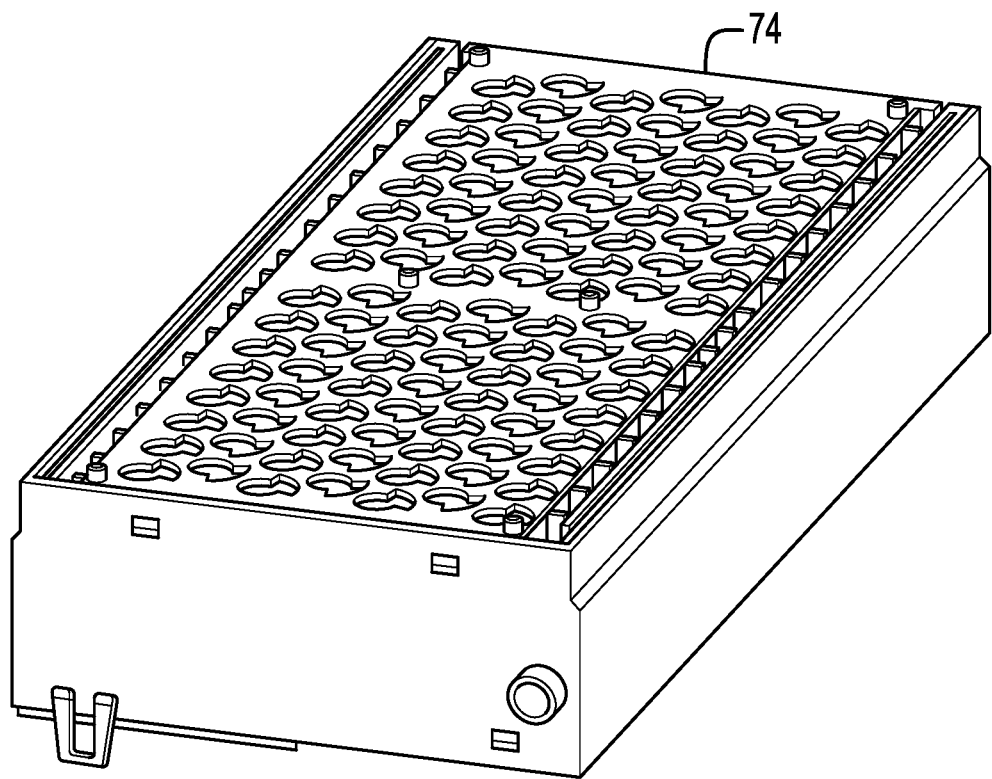
FIG. 51 is another isometric view of the second retention housing of FIG. 50.

Referring to FIG. 48, the third retaining plate 80 includes a plurality of apertures 1830 extending therethrough. The plurality of apertures 1830 includes a first row of apertures 1831, a second row of apertures 1832, a third row of apertures 1833, a fourth row of apertures 1834, a fifth row of apertures 1835, a sixth row of apertures 1836, and a seventh row of apertures 1837. Each aperture of the first plurality of apertures 1830 is sized to allow a bottom surface of a respective cylindrical battery cell to contact the second thermally conductive layer 152 while holding the cylindrical battery cell within the interior region 1460 of the second retention housing 74.

The fourth retaining plate 82 includes a plurality of apertures 1860 extending therethrough. The plurality of apertures 1860 includes a first row of apertures 1861, a second row of apertures 1862, a third row of apertures 1863, a fourth row of apertures 1864, a fifth row of apertures 1865, a sixth row of apertures 1866, and a seventh row of apertures 1867—which align with the first row of apertures 1831, the second row of apertures 1832, the third row of apertures 1833, the fourth row of apertures 1834, the fifth row of apertures 1835, the sixth row of apertures 1836, and the seventh row of apertures 1837, respectively. Each aperture of the plurality of apertures 1860 is sized to allow a bottom surface of a respective cylindrical battery cell to contact the second thermally conductive layer 152 while holding the cylindrical battery cell within the interior region 1460 (shown in FIG. 42) of the second retention housing 74.

Referring to FIGS. 48 and 57, the first row of apertures 1831 of the third retaining plate 80, and the first row of apertures 1861 of the fourth retaining plate 82 align with the first row of battery cells 1751. Further, the second row of apertures 1832 of the third retaining plate 80, and the second row of apertures 1862 of the fourth retaining plate 82 align with the second row of battery cells 1752. Further, the third row of apertures 1833 of the third retaining plate 80, and the third row of apertures 1863 of the fourth retaining plate 82 align with the third row of battery cells 1753. Further, the fourth row of apertures 1834 of the third retaining plate 80, and the fourth row of apertures 1864 of the fourth retaining plate 82 align with the fourth row of battery cells 1754. Further, the fifth row of apertures 1835 of the third retaining plate 80, and the fifth row of apertures 1865 of the fourth retaining plate 82 align with the fifth row of battery cells 1755. Further, the sixth row of apertures 1836 of the third retaining plate 80, and the sixth row of apertures 1866 of the fourth retaining plate 82 align with the sixth row of battery cells 1756. Further, the seventh row of apertures 1837 of the third retaining plate 80, and the seventh row of apertures 1867 of the fourth retaining plate 82 align with the seventh row of battery cells 1757.

First Outer Plate

Referring to FIGS. 8, 14, 29 and 58-61, a first outer plate 90 is coupled to the first retention housing 54 and the first and second exterior plates 141, 142 of the battery cell retention frame 50. The first outer plate 90 includes a plate portion 1900 and retaining clip members 1902, 1904. Referring to FIG. 59, the plate portion 1900 has tab members 1910 and 1912 extending outwardly from the plate portion 1900. Further, the plate portion 1900 has apertures 1921, 1922, 1923, 1924 extending therethrough. The retaining clip members 1902, 1904 are coupled to the plate portion 1900 extend in a first direction from the plate portion 1900. In an exemplary embodiment, the first outer plate 90 is constructed of plastic.

Referring to FIGS. 29 and 59, the retaining clip member 1902 is coupled to the tab member 636 (shown in FIG. 29) of the first retention housing 54. Further, the retaining clip member 1904 is coupled to the tab member 634 (shown in FIG. 29) of the first retention housing 54.

Figure 68:
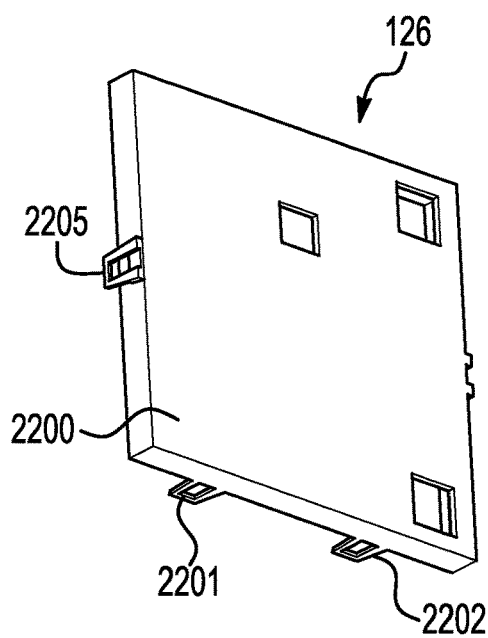
FIG. 68 is another isometric view of the cover plate of FIG. 67.

Referring to FIGS. 59 and 68, the tab member 1912 is coupled to a retaining clip member 2202 (shown in FIG. 68) of the cover plate 126. Further, the tab member 1910 is coupled to a retaining clip member 2201 (shown in FIG. 68) of the cover plate 126.

Referring to FIGS. 8, 13, 14 and 59, the bolt 91 (shown in FIG. 8) extends through the aperture 1921 in the first outer plate 90, and into the aperture 311 (shown in FIG. 14) of the first exterior plate 141 of the battery cell retention frame 50, to couple the first outer plate 90 to the battery cell retention frame 50.

Further bolt 92 (shown in FIG. 8) extends through the aperture 1922 in the first outer plate 90, and into the aperture 312 (shown in FIG. 14) of the first exterior plate 141 of the battery cell retention frame 50, to couple the first outer plate 90 to the battery cell retention frame 50.

Further bolt 93 (shown in FIG. 8) extends through the aperture 1923 in the first outer plate 90, and into the aperture 371 (shown in FIG. 14) of the second exterior plate 142 of the battery cell retention frame 50, to couple the first outer plate 90 to the battery cell retention frame 50.

Further bolt 94 (shown in FIG. 8) extends through the aperture 1924 in the first outer plate 90, and into the aperture 372 (shown in FIG. 14) of the second exterior plate 142 of the battery cell retention frame 50, to couple the first outer plate 90 to the battery cell retention frame 50.

Second Outer Plate

Referring to FIGS. 8, 13, 47 and 62-64, a second outer plate 100 is coupled to the second retention housing 74 and the first and second exterior plates 141, 142 of the battery cell retention frame 50. The second outer plate 100 includes a plate portion 2000 and retaining clip members 2002, 2004. The plate portion 2000 has tab members 2010 and 2012 extending outwardly from the plate portion 2000. Further, the plate portion 2000 has apertures 2021, 2022, 2023, 2024 extending therethrough. The retaining clip members 2002, 2004 are coupled to the plate portion 2000 and extend in a first direction from the plate portion 2000. In an exemplary embodiment, the second outer plate 100 is constructed of plastic.

Referring to FIGS. 47 and 63, the retaining clip member 2002 is coupled to the tab member 1636 (shown in FIG. 47) of the second retention housing 74. Further, the retaining clip member 2004 is coupled to the tab member 1634 (shown in FIG. 47) of the second retention housing 74.

Figure 67:
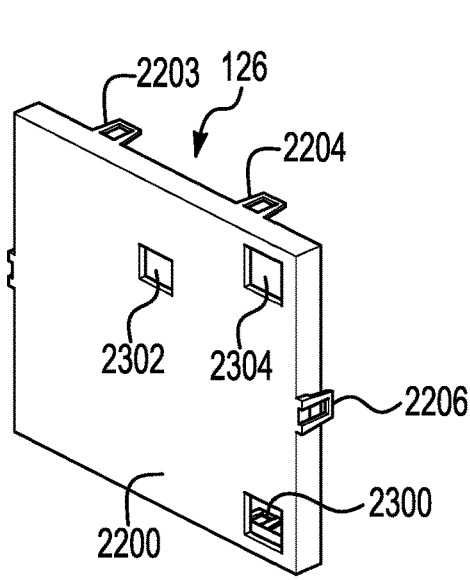
FIG. 67 is an isometric view of a cover plate utilized in the battery module of FIG. 1.

Referring to FIGS. 63 and 67, the tab member 2012 is coupled to a retaining clip member 2204 (shown in FIG. 67) of the cover plate 126. Further, the tab member 2010 is coupled to a retaining clip member 2203 (shown in FIG. 67) of the cover plate 126.

Referring to FIGS. 8, 13 and 63, the bolt 101 (shown in FIG. 8) extends through the aperture 2023 of the second outer plate 100, and into the aperture 301 (shown in FIG. 13) of the first exterior plate 141 of the battery cell retention frame 50, to couple the second outer plate 100 to the battery cell retention frame 50.

Further bolt 102 (shown in FIG. 8) extends through the aperture 2024 in the second outer plate 100, and into the aperture 302 (shown in FIG. 11) of the first exterior plate 141 of the battery cell retention frame 50, to couple the second outer plate 100 to the battery cell retention frame 50.

Further bolt 103 (shown in FIG. 8) extends through the aperture 2021 in the second outer plate 100, and into the aperture 361 (shown in FIG. 13) of the second exterior plate 142 of the battery cell retention frame 50, to couple the second outer plate 100 to the battery cell retention frame 50.

Further bolt 104 (shown in FIG. 8) extends through the aperture 2022 in second outer plate 100, and into the aperture 362 (shown in FIG. 13) of the second exterior plate 142 of the battery cell retention frame 50, to couple the second outer plate 100 to the battery cell retention frame 50.

Circuit Board

Figure 66:
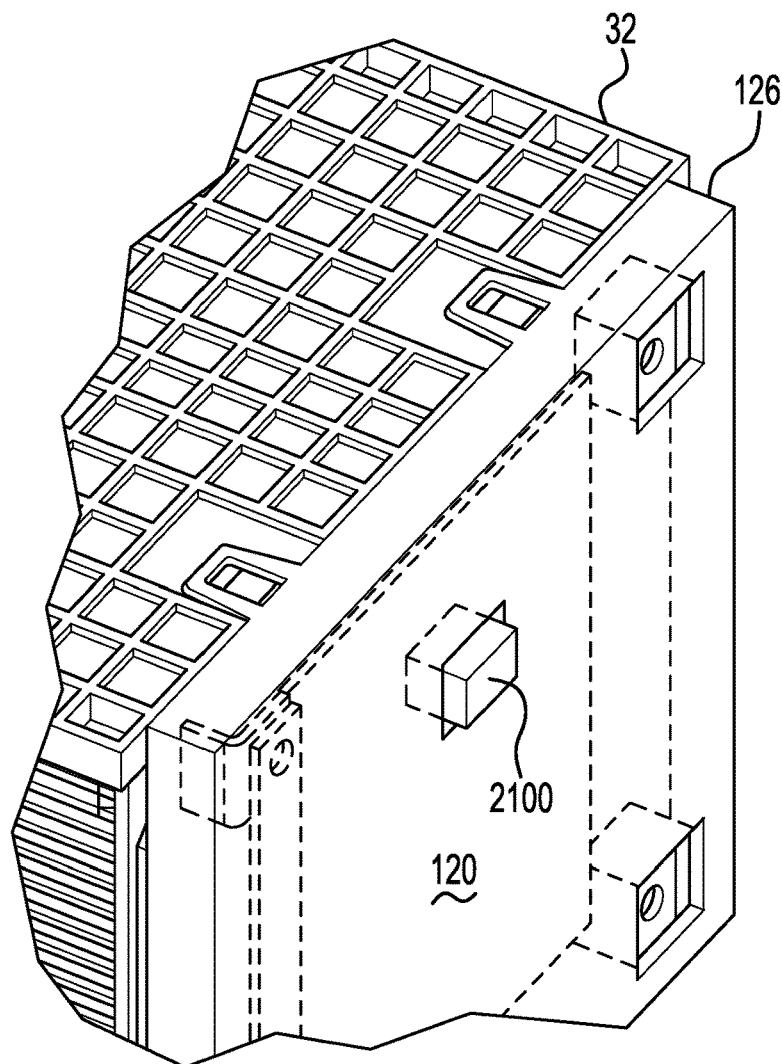
FIG. 66 is an enlarged schematic of a portion of the battery module of FIG. 1.

Referring to FIGS. 8 and 66, the circuit board 120 includes a battery management controller 2100 (shown in FIG. 8) that is electrically coupled to the first and second plurality of cylindrical battery cells 56, 76 to monitor the operation of the battery cells 56, 76. The circuit board 120 is coupled to an end of the first retention housing 54 and the second retention housing 74.

Electrical Bus Bar

Referring to FIG. 8, the electrical bus bar 122 is provided to electrically couple together the first plurality of cylindrical battery cells 56 and the second plurality of battery cells 76. In particular, the electrical bus bar 122 is electrically coupled to the electrical bus bar 458 (which is electrically coupled to the battery cells 56) and to the electrical bus bar 1456 (which is electrically coupled to the battery cells 76).

Cover Plate

Referring to FIGS. 8 and 66-68, the cover plate 126 is attached to the first and second outer plates 90, 100 to cover the circuit board 120. The cover plate 126 includes a plate portion 2200, and retaining clip members 2201, 2202, 2203, 2204, 2205, 2206 extending in a first direction from the plate portion 2200. The retaining clip members 2201, 2202 engage the tab members 1912, 1910 (shown in FIG. 59), respectively, of the first outer plate 90. The retaining clip members 2203, 2204 engage the tab members 2010, 2012 (shown in FIG. 63), respectively, of the second outer plate 100. The retaining clip members 2205, 2206 engage corresponding tab members to couple the cover plate 126 to the first and second retention housings 54, 74. In an exemplary embodiment, the cover plate 126 is constructed of plastic.

Figure 69:
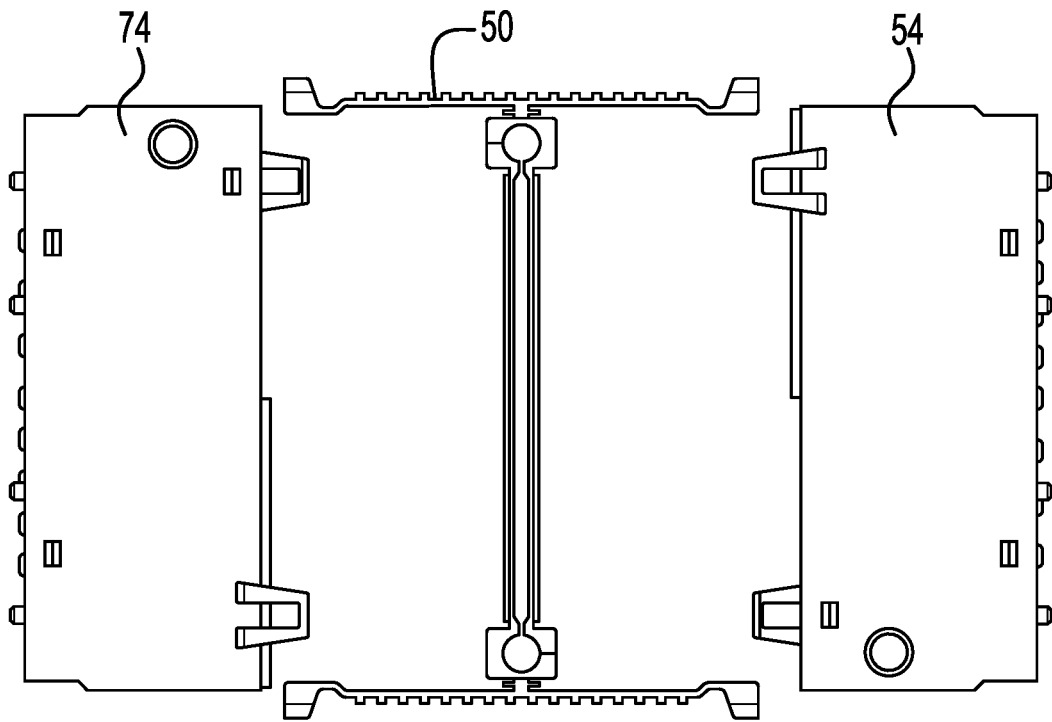
FIG. 69 is a schematic of the first and second retention housings and the battery cell retention frame prior to coupling the components together.
Figure 70:
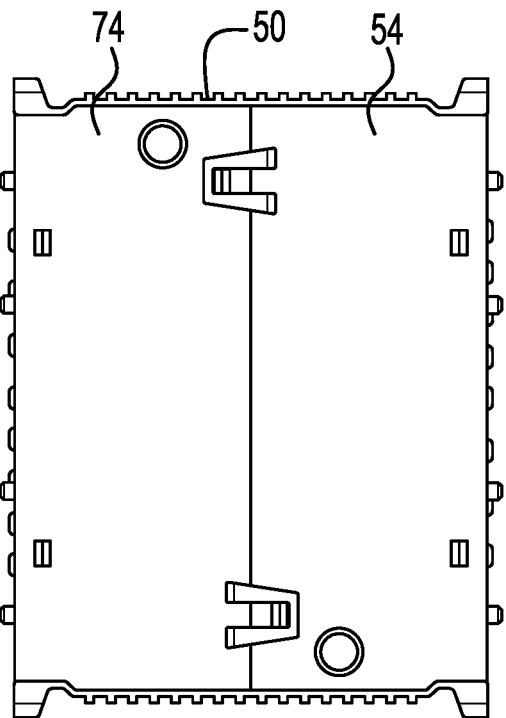
FIG. 70 is a schematic of the first and second retention housings and the battery cell retention frame coupled together.
Figure 71:
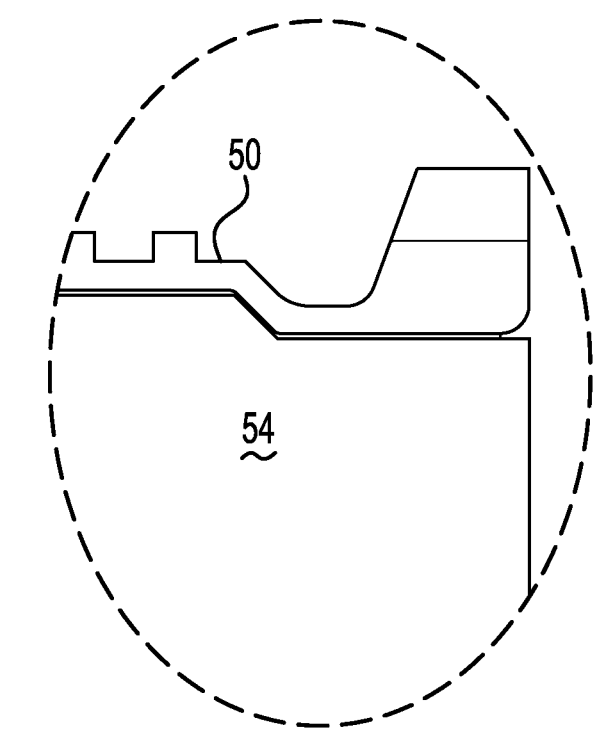
FIG. 71 is an enlarged schematic of a portion of the first retention housing and the battery cell retention frame of FIG. 70.
Figure 72:
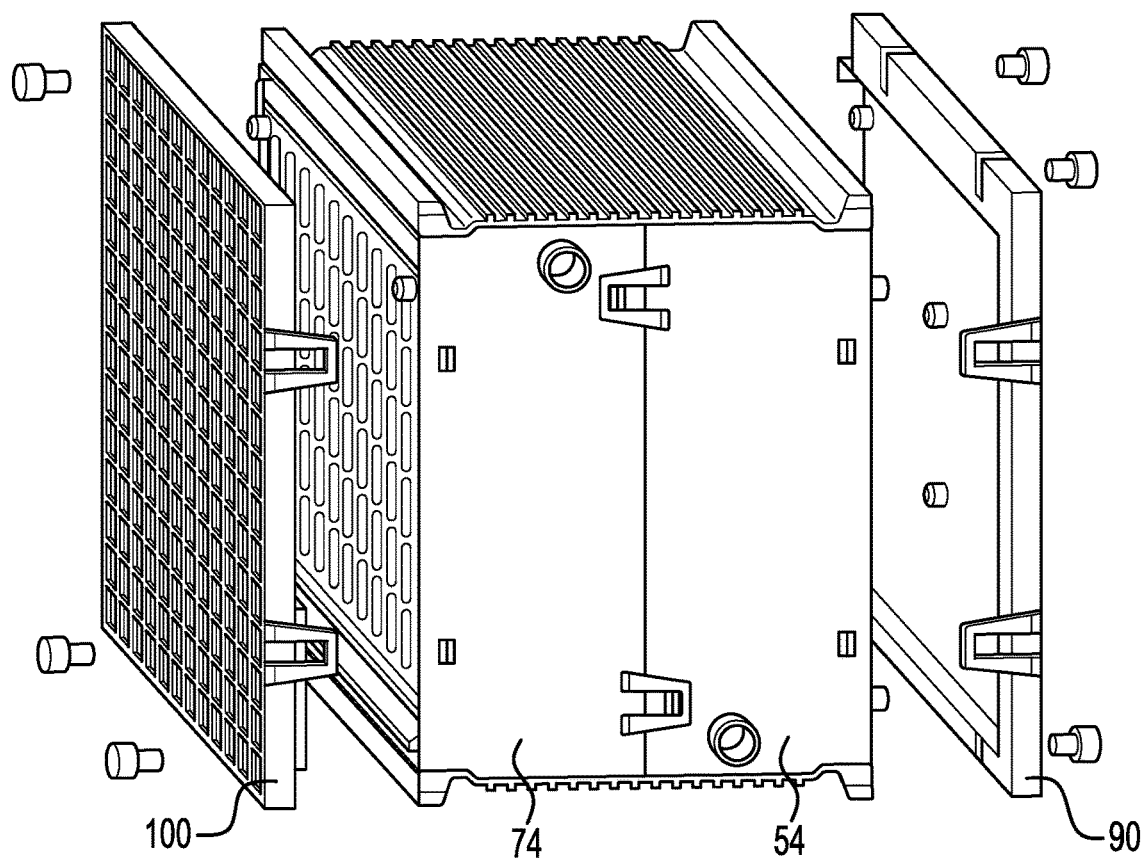
FIG. 72 is a schematic of the first and second retention housings prior to the first and second outer plates being coupled to the first and second retention housings, respectively.
Figure 73:
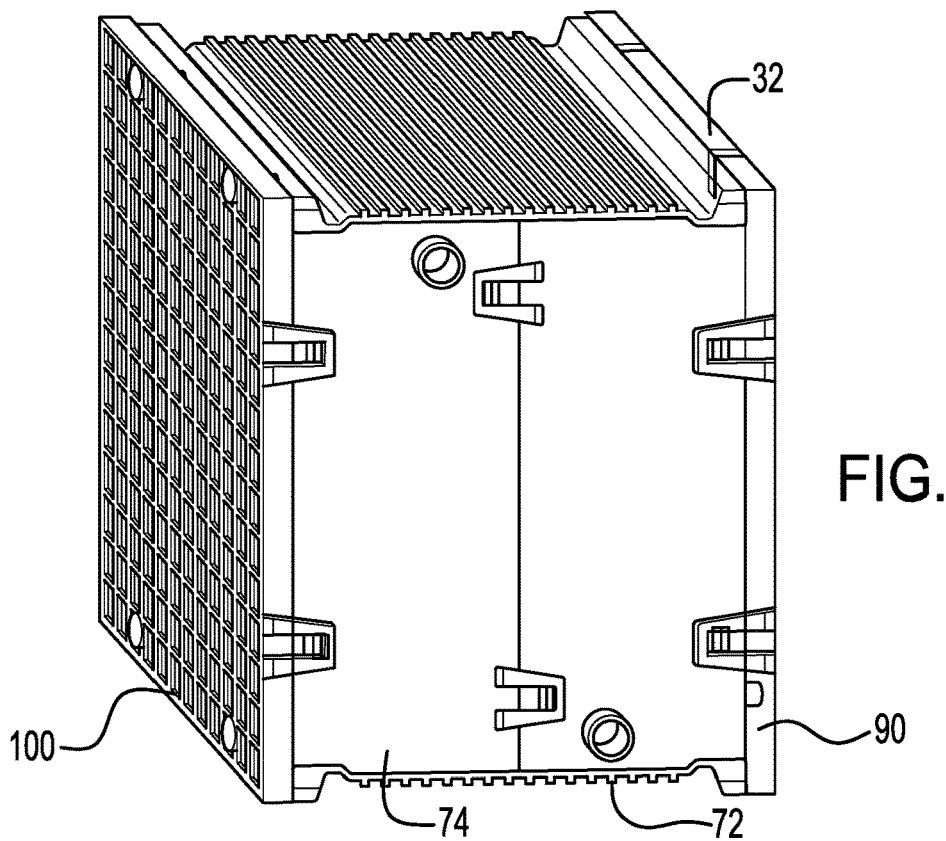
FIG. 73 is a schematic of the first and second outer plates coupled to the first and second retention housings, respectively.

Referring to FIGS. 69-73, a portion of the assembly steps for assembling the battery module 32 are illustrated. As shown in FIG. 69, the first and second retention housings 54, 74 holding the first and second plurality of cylindrical battery cells 56, 76, respectively, therein are moved towards the battery cell retention frame 50. Referring to FIGS. 70 and 71, the first and second retention housings 54, 74 are coupled together and further coupled to the battery cell retention frame 50. Referring to FIG. 72, the first and second outer plates 90, 100 are moved toward the first and second retention housings 54, 74, respectively. Referring to FIG. 73, the first and second outer plates 90, 100 are coupled to the first and second retention housings 54, 74, respectively.

Referring to FIGS. 1, 10 and 20, the operation of the battery system 20 will now be explained in greater detail.

As a general overview, the fluid supply device 40 pumps a fluid through the inlet port 640 of the first retention housing 54 and into the central cooling plate member 140 of the battery cell retention frame 50. The central cooling plate member 140 conducts heat energy from the first and second plurality of cylindrical battery cells 56, 76 into the fluid. The fluid flows from the central cooling plate member 140 and out of the outlet port 1640 of the second retention housing 74 to cool the first and second plurality of cylindrical battery cells 56, 76.

A more detailed explanation of the operation of the battery system 20 will now be provided. The fluid supply device 40 pumps a fluid through the conduit 42 to the inlet port 640 of the battery cell retention frame 50. The fluid flows from the inlet port 640 and into an inlet aperture 208 (shown in FIG. 20) of the first manifold portion 161 and then into the longitudinal aperture 210 of the first manifold portion 161. From the longitudinal aperture 210, the fluid flows through a flow aperture 214 of the first manifold portion 161 and into the internal cooling channel 184. The fluid flows through the internal cooling channel 184 and through a flow aperture 244 of the second manifold portion 162 and into the longitudinal aperture 240 of the second manifold portion 162. From the longitudinal aperture 240, the fluid flows through the outlet aperture 238 of the second manifold portion 162 and the outlet port 1640 and then through the conduit 44 to the fluid supply device 40. Referring to FIG. 10, while the fluid is flowing through the battery cell retention frame 50, heat energy is transferred from the first plurality of cylindrical battery cells 56 and the second plurality of cylindrical battery cells 76 to the battery cell retention frame 50 and into the fluid flowing through the battery cell retention frame 50 to cool the battery cells 56, 76.

Figure 3:
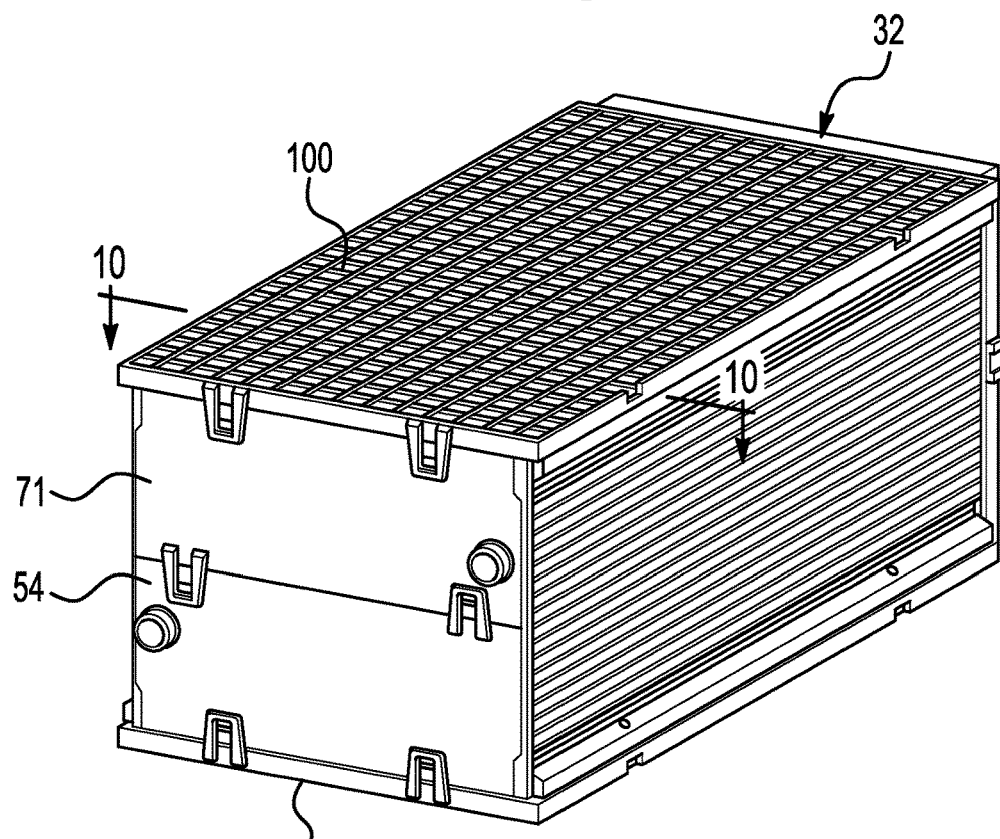
FIG. 3 is another isometric view of the battery module of FIG. 1.
Figure 4:
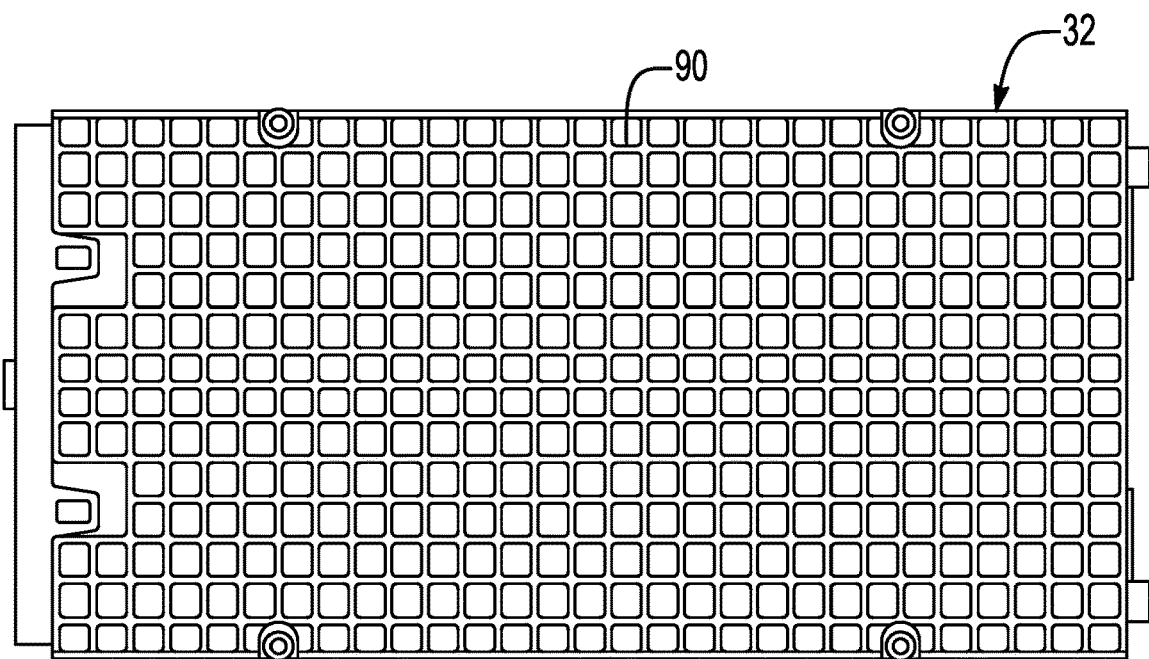
FIG. 4 is a top view of the battery module of FIG. 1.
Figure 5:
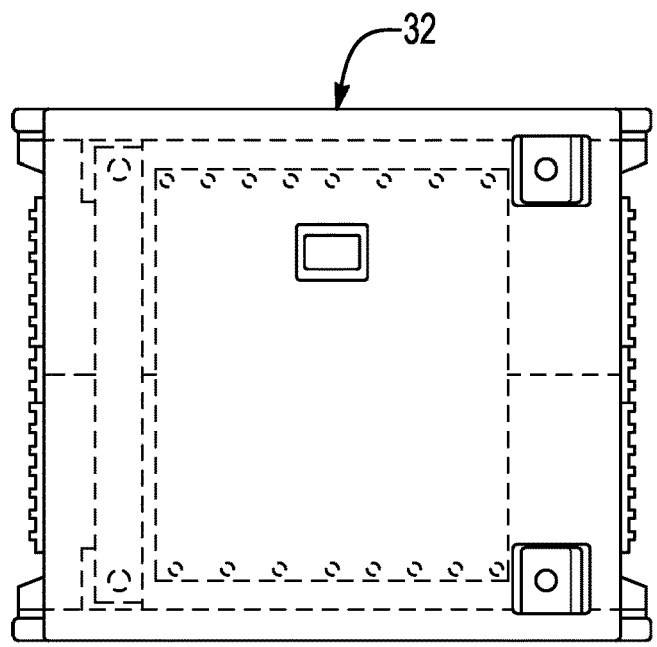
FIG. 5 is a side view of the battery module of FIG. 1.
Figure 6:
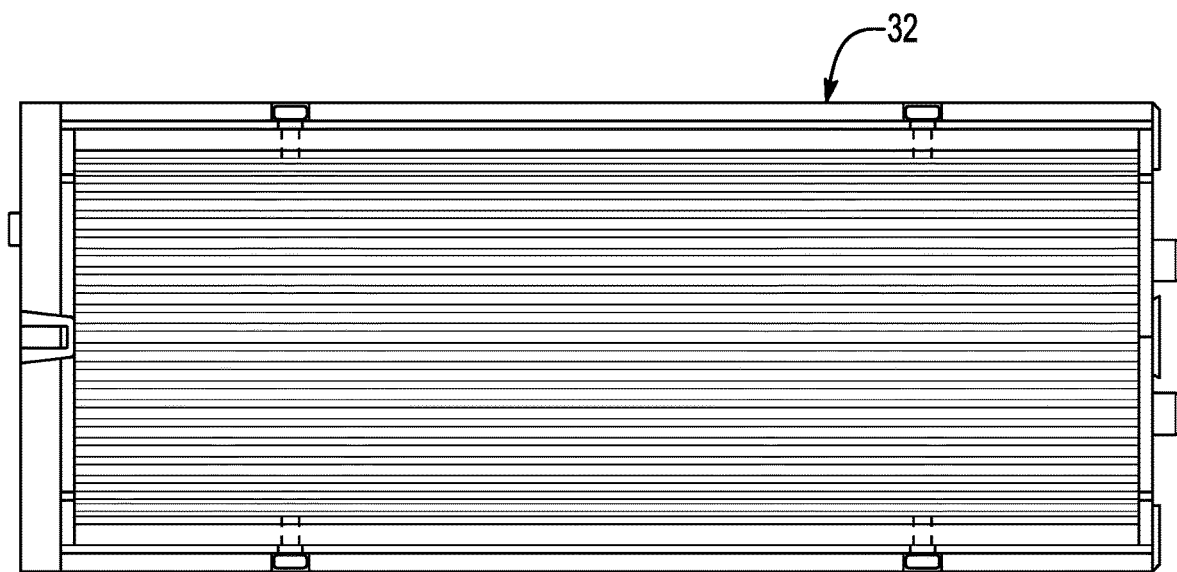
FIG. 6 is a cross-sectional view of the battery module of FIG. 1 taken along lines 6-6 in FIG. 1.
Figure 7:
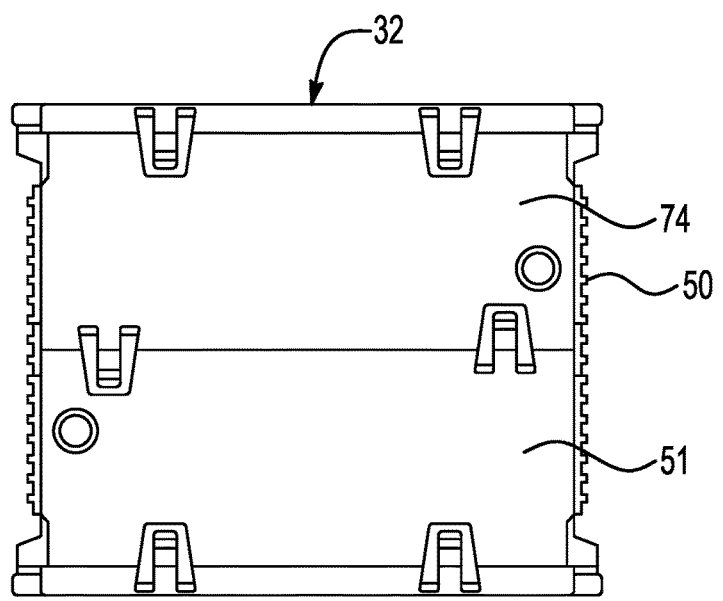
FIG. 7 is another side view of the battery module of FIG. 1.
Figure 74:
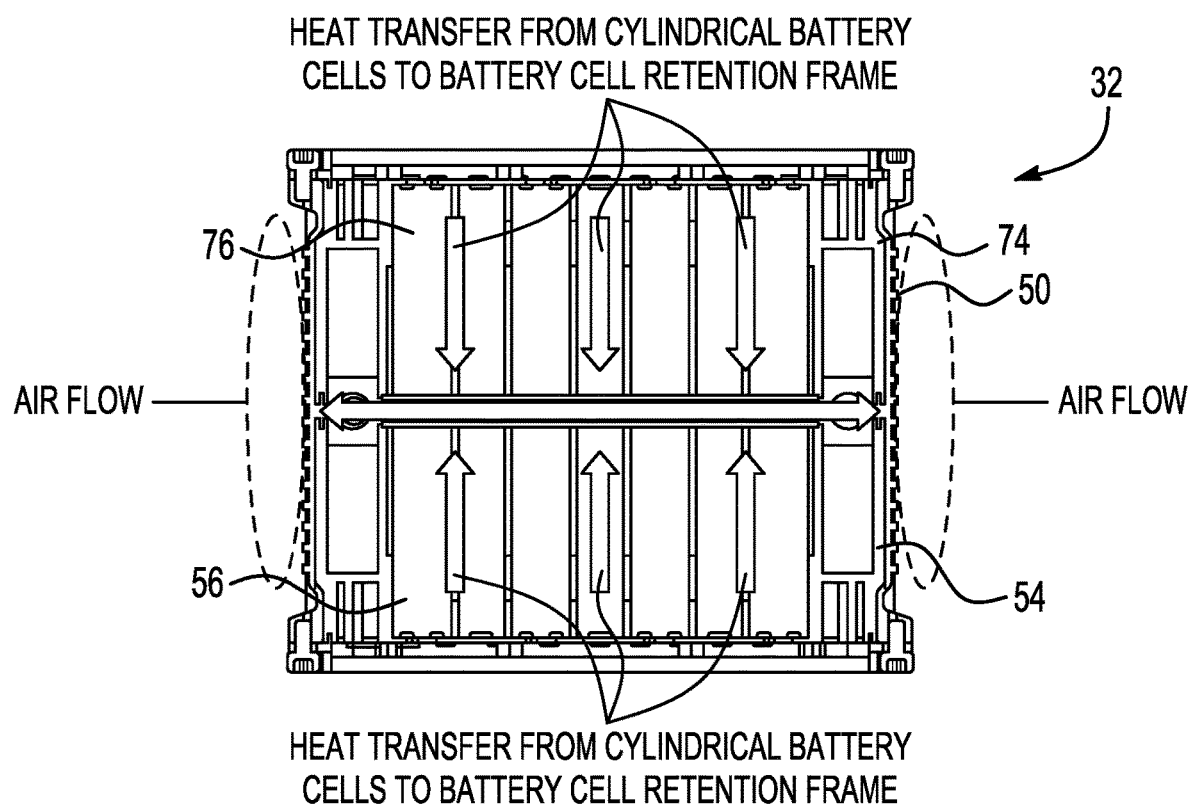
FIG. 74 is a cross-sectional view of the battery module of FIG. 3 taken along lines 10-10 in FIG. 3 that illustrates the heat transfer from cylindrical battery cells into a battery cell retention frame when a fluid supply system is not coupled to the battery module.

Referring to FIGS. 3, 19 and 74, the battery module 32 can cool the first and second plurality of cylindrical battery cells 56, 76 without utilizing the fluid supply system 30. In particular, the central cooling plate member 140 of the battery cell retention frame 50 conducts heat energy from the first and second plurality of cylindrical battery cells 56, 76 through the frame 54 to the first and second exterior plates 141, 142 of the battery cell retention frame 50 to cool the battery cells 56, 76. The first and second exterior plates 141, 142 conduct the heat energy to ambient air proximate to the first and second exterior plates 141, 142.

The battery system 20 having the battery module 32 provides a substantial advantage over other systems. In particular, an advantage of the battery module 32 is that the battery module 32 utilizes the first and second retention housings 54, 74 to hold the battery cell retention frame 50 therein that can be either air cooled or fluid cooled. In particular, the first and second retention housings 54, 74 have an inlet port 640 and an outlet port 1640, respectively, for routing fluid through the battery cell retention frame 50 for cooling cylindrical battery cells thereon. Alternately, the battery cell retention frame 50 can be air cooled for cooling the cylindrical battery cells. Also, the first and second retention housings 54, 74 provide improved structural integrity to the battery module 32.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery module, comprising:
   a battery cell retention frame having a central cooling plate member with a first thermally conductive layer;
   a first retention housing having a first plurality of cylindrical battery cells therein, the first retention housing being disposed in the battery cell retention frame on a first side of the central cooling plate member; and
   a first retaining plate being disposed in the first retention housing between the first retention housing and the central cooling plate member, the first retaining plate having a first plurality of apertures extending therethrough, each aperture of the first plurality of apertures being sized to allow a surface of a respective cylindrical battery cell of the first plurality of cylindrical battery cells to contact the first thermally conductive layer.

2. The battery module of claim 1, further comprising:
a second retention housing being disposed in the battery cell retention frame on a second side of the central cooling plate member, the second retention housing having a second plurality of cylindrical battery cells therein.

3. The battery module of claim 2, wherein:
the central cooling plate member having a second thermally conductive layer disposed parallel to and spaced apart from the first thermally conductive layer.

4. The battery module of claim 3, wherein:
a second retaining plate being disposed in the second retention housing, the second retaining plate having a second plurality of apertures extending therethrough, each aperture of the second plurality of apertures being sized to allow a surface of a respective cylindrical battery cell of the second plurality of cylindrical battery cells to contact the second thermally conductive layer.

5. The battery module of claim 4, wherein:
the first retention housing having an inlet port that fluidly communicates with the central cooling plate member of the battery cell retention frame.

6. The battery module of claim 5, wherein:
the second retention housing having an outlet port that fluidly communicates with the central cooling plate member of the battery cell retention frame.

7. The battery module of claim 1, wherein:
the first retention housing having an end wall, a first side wall, a second side wall, a third side wall, a fourth side wall; the first and second side walls extending parallel to one another, the third and fourth side walls extending substantially parallel to one another and perpendicular to the first and second side walls.

8. The battery module of claim 7, wherein:
the end wall and the first, second, third, and fourth side walls being constructed of plastic.

9. A battery module, comprising:
a battery cell retention frame having a central cooling plate member with a first thermally conductive layer, the central cooling plate member having first and second manifold portions and first and second intermediate walls disposed between and coupled to the first and second manifold portions; the first and second intermediate walls defining an internal cooling channel therebetween that fluidly communicates with the first and second manifold portions, the first thermally conductive layer being coupled to the first intermediate wall;

a first retention housing having a first plurality of cylindrical battery cells therein, the first retention housing being disposed in the battery cell retention frame; and a first retaining plate being disposed in the first retention housing between the first retention housing and the central cooling plate member, the first retaining plate having a first plurality of apertures extending therethrough, each aperture of the first plurality of apertures being sized to allow a surface of a respective cylindrical battery cell of the first plurality of cylindrical battery cells to contact the first thermally conductive layer.

10. The battery module of claim 9, further comprising:
a second retention housing being disposed in the battery cell retention frame on an opposite side of the central cooling plate member from the first retention housing, the second retention housing having a second plurality of cylindrical battery cells therein.

11. The battery module of claim 10, wherein:
the central cooling plate member having a second thermally conductive layer being coupled to the second intermediate wall, the second thermally conductive layer being parallel to and spaced apart from the first thermally conductive layer.

12. The battery module of claim 11, wherein:
a second retaining plate being disposed in the second retention housing, the second retaining plate having a second plurality of apertures extending therethrough, each aperture of the second plurality of apertures being sized to allow a surface of a respective cylindrical battery cell of the second plurality of cylindrical battery cells to contact the second thermally conductive layer.

13. The battery module of claim 12, wherein:
the first retention housing having an inlet port that fluidly communicates with the central cooling plate member of the battery cell retention frame.

14. The battery module of claim 13, wherein:
the second retention housing having an outlet port that fluidly communicates with the central cooling plate member of the battery cell retention frame.

15. The battery module of claim 9, wherein:
the first retention housing having an end wall, a first side wall, a second side wall, a third side wall, a fourth side wall; the first and second side walls extending parallel to one another, the third and fourth side walls extending substantially parallel to one another and perpendicular to the first and second side walls.

16. The battery module of claim 15, wherein:
the end wall and the first, second, third, and fourth side walls being constructed of plastic.

* * * * *